US012553634B2

(12) United States Patent
Lee et al.

(10) Patent No.: US 12,553,634 B2
(45) Date of Patent: Feb. 17, 2026

(54) SCALABLE CONTROL OF HEAT PUMPS WITH LIMITED SMART-HOME DEVICES

(71) Applicant: Cornell University, Ithaca, NY (US)

(72) Inventors: Zachary Lee, Ithaca, NY (US); Ke Zhang, Ithaca, NY (US)

(73) Assignee: Cornell University, Ithaca, NY (US)

( * ) Notice: Subject to any disclaimer, the term of this patent is extended or adjusted under 35 U.S.C. 154(b) by 492 days.

(21) Appl. No.: 18/099,037

(22) Filed: Jan. 19, 2023

(65) Prior Publication Data

US 2023/0228446 A1 Jul. 20, 2023

Related U.S. Application Data

(60) Provisional application No. 63/300,920, filed on Jan. 19, 2022.

(51) Int. Cl.
*F24F 11/64* (2018.01)
*F24F 11/46* (2018.01)
(Continued)

(52) U.S. Cl.
CPC .............. *F24F 11/64* (2018.01); *F24F 11/46* (2018.01); *F24F 11/58* (2018.01); *G05B 19/042* (2013.01); *G05B 2219/2614* (2013.01)

(58) Field of Classification Search
CPC .. F24F 11/64; F24F 11/46; F24F 11/58; F24F 11/62; G05B 19/042; G05B 2219/2614; G05B 13/048; G05B 13/0265
See application file for complete search history.

(56) References Cited

U.S. PATENT DOCUMENTS

2014/0207298 A1 7/2014 Gupta et al.
2015/0316282 A1* 11/2015 Stone ................... G05B 13/048
700/276

(Continued)

FOREIGN PATENT DOCUMENTS

KR 20210001896 A 1/2021
KR 20210107478 A 9/2021
WO 2020231288 A1 11/2020

OTHER PUBLICATIONS

K. J. Chua et al., "Advances in Heat Pump Systems: A Review," Applied Energy, vol. 87, No. 12, Dec. 2010, pp. 3611-3624.

(Continued)

*Primary Examiner* — Mong-Shune Chung
(74) *Attorney, Agent, or Firm* — Ryan, Mason & Lewis, LLP

(57) ABSTRACT

An apparatus in one embodiment comprises at least one processing device. The processing device comprises a processor coupled to a memory, and is configured to obtain information characterizing operation of a heat pump at a particular energy usage location, and to process the obtained information in a reinforcement learning agent to generate at least one control signal for controlling the heat pump, wherein the reinforcement learning agent is implemented at least in part utilizing behavioral cloning of a model predictive control process. In some embodiments, the behavioral cloning of the model predictive control process comprises a constraint-informed parameter grouping (CIPG) phase, a training data generation phase and a model training phase. The apparatus can be implemented, for example, at least in part in a cloud-based processing platform, and/or at least in part in one or more of a smart meter, a smart thermostat, a smart-home controller or other smart-home device.

20 Claims, 12 Drawing Sheets

(51) Int. Cl.
  *F24F 11/58* (2018.01)
  *G05B 19/042* (2006.01)

(56) References Cited

U.S. PATENT DOCUMENTS

| | | |
|---|---|---|
| 2017/0264095 A1 | 9/2017 | Rombouts |
| 2018/0004172 A1 | 1/2018 | Patel et al. |
| 2018/0100662 A1* | 4/2018 | Farahmand ........ G05B 19/0428 |
| 2018/0130130 A1 | 5/2018 | Dechu et al. |
| 2018/0238572 A1 | 8/2018 | Murugesan et al. |
| 2019/0031204 A1 | 1/2019 | Hartmann et al. |
| 2019/0353378 A1* | 11/2019 | Ramamurti ............ G05B 15/02 |
| 2020/0249647 A1 | 8/2020 | Yang et al. |
| 2020/0349484 A1 | 11/2020 | Serven et al. |
| 2020/0379417 A1 | 12/2020 | Zhang et al. |
| 2021/0018206 A1 | 1/2021 | Barooah |
| 2021/0158150 A1 | 5/2021 | Mimaroglu et al. |
| 2021/0190364 A1* | 6/2021 | Lee ...................... G05B 13/027 |
| 2021/0295227 A1 | 9/2021 | Ding et al. |
| 2021/0312547 A1 | 10/2021 | Ding et al. |
| 2021/0326984 A1 | 10/2021 | Kim et al. |
| 2021/0405727 A1* | 12/2021 | Singh ...................... G06F 1/329 |
| 2022/0318707 A1* | 10/2022 | Cella .................... G05D 1/0027 |
| 2023/0168649 A1* | 6/2023 | Huber .................... G06N 5/022 |
| | | 700/28 |

OTHER PUBLICATIONS

B. Alimohammadisagv et al., "Cost-Optimal Thermal Energy Storage System for a Residential Building with Heat Pump Heating and Demand Response Control," Applied Energy, vol. 174, Jul. 15, 2016, pp. 275-287.

Y. Zhao et al., "MPC-based Optimal Scheduling of Grid-Connected Low Energy Buildings with Thermal Energy Storages," Energy and Buildings, vol. 86, Jan. 2015, pp. 415-426.

B. Baeten et al., "A Validated Model for Mixing and Buoyancy in Stratified Hot Water Storage Tanks for Use in Building Energy Simulations," Applied Energy, vol. 172, Jun. 15, 2016, pp. 217-229.

D. S. Callaway, "Tapping the Energy Storage Potential in Electric Loads to Deliver Load Following and Regulation, with Application to Wind Energy," Energy Conversion and Management, vol. 50, No. 5, May 2009, pp. 1389-1400.

N. Mahdavi et al., "Mapping the Effect of Ambient Temperature on the Power Demand of Populations of Air Conditioners," IEEE Transactions on Smart Grid, vol. 9, No. 3, May 2018, pp. 1540-1550.

C. Verhelst et al., "Study of the Optimal Control Problem Formulation for Modulating Air-To-Water Heat Pumps Connected to a Residential Floor Heating System," Energy and Buildings, vol. 45, Feb. 2012, pp. 43-53.

S. Drenker et al., "Nonintrusive Monitoring of Electric Loads," IEEE Computer Applications in Power, vol. 12, No. 4, Oct. 1999, pp. 47-51.

W. J. Cole et al., "Building Energy Model Reduction for Model Predictive Control Using OpenStudio," American Control Conference, Jun. 2013, pp. 449-454.

J. Ma et al., "Demand Reduction in Building Energy Systems Based on Economic Model Predictive Control," Chemical Engineering Science, vol. 67, No. 1, Jan. 1, 2012, pp. 92-100.

Y. Chen et al., "Transfer Learning with Deep Neural Networks for Model Predictive Control of HVAC and Natural Ventilation in Smart Buildings," Journal of Cleaner Production, vol. 254, May 1, 2020, 10 pages.

J. E. Braun et al., "An Inverse Gray-Box Model for Transient Building Load Prediction," HVAC&R Research, vol. 8, No. 1, Jan. 2002, pp. 73-99.

G. Platt et al., "Adaptive HVAC Zone Modeling for Sustainable Buildings," Energy and Buildings, vol. 42, Apr. 2010, pp. 412-421.

N. Somu et al., "A Hybrid Model for Building Energy Consumption Forecasting Using Long Short Term Memory Networks," Applied Energy, vol. 261, Mar. 1, 2020, 20 pages.

Z. Zhang et al., "Whole Building Energy Model for HVAC Optimal Control: A Practical Framework Based on Deep Reinforcement Learning," Energy and Buildings, vol. 199, Sep. 15, 2019, pp. 472-490.

IEA, "Buildings," Tracking Report, https://www.iea.org/reports/buildings, Sep. 2022, 14 pages.

Bloomberg New Energy Finance, "Electric Vehicle Outlook 2020," https://about.bnef.com/electric-vehicle-outlook-2020/, Accessed Jan. 23, 2023, 21 pages.

Pacific Gas & Electric Company, "SmartAC Program," http://bit.ly/2LPd6k5, Accessed Jan. 23, 2023, 3 pages.

D. J. Hammerstrom et al., "Pacific Northwest GridWise Testbed Demonstration Projects, Part I. Olympic Peninsula Project," Pacific Northwest National Laboratory, PNNL-17167, Oct. 2007, 157 pages.

R. Melton et al., "Pacific Northwest Smart Grid Demonstration Project Technology Performance Report, vol. 1: Technology Performance," Battelle Memorial Institute, Pacific Northwest Division, PNW-SGDP-TPR-Vol. 1-Rev.1.0, PNWD-4438, vol. 1, Jun. 2015, 52 pages.

F. Shen et al., "Two-Tier Demand Response with Flexible Demand Swap and Transactive Control for Real-Time Congestion Management in Distribution Networks," International Journal of Electrical Power & Energy Systems, Peer reviewed version, Jul. 2019, 21 pages.

V. Dudjak et al., "Impact of Local Energy Markets on the Distribution Systems: A Comprehensive Review," Applied Energy, Mar. 2021, 25 pages.

M. F. Dynge et al., " Impact of Local Electricity Markets and Peer-to-Peer Trading on Low-Voltage Grid Operations," Applied Energy, vol. 301, Nov. 1, 2021, 14 pages.

J. Guerrero et al., "Decentralized P2P Energy Trading under Network Constraints in a Low-Voltage Network," arXiv:1809.06976v1, Sep. 19, 2018, 10 pages.

E. Reihani et al., "A New Method for Peer-to-Peer Energy Exchange in Distribution Grids," Energies, vol. 13, No. 4, Feb. 12, 2020, 16 pages.

Y. Chen et al., "Swarm Intelligence-based Distributed Stochastic Model Predictive Control for Transactive Operation of Networked Building Clusters," Energy and Buildings, Preprint, May 23, 2019, 23 pages.

M. M. Iqbal et al., "Demand Responsive Appliances Using Polar Bear Optimization Algorithm," IEEE Access, vol. 8, Dec. 9, 2020, pp. 222285-222296.

Z. Yang et al., "Transactive Energy Supported Economic Operation for Multi-Energy Complementary Microgrids," IEEE Transactions on Smart Grid, Peer reviewed version, Jul. 2020, 13 pages.

Q. Huang et al., "Simulation-Based Valuation of Transactive Energy Systems," IEEE Transactions on Power Systems, vol. 34, No. 5, Sep. 2019, pp. 4138-4147.

E. Wilson et al., "Energy Efficiency Potential in the U.S. Single-Family Housing Stock," National Renewable Energy Laboratory Technical Report, NREL/TP-5500-68670, Dec. 2017, 157 pages.

S. Behboodi et al., "Transactive Control of Fast-Acting Demand Response Based on Thermostatic Loads in Real-Time Retail Electricity Markets," Applied Energy, preprint, Jul. 6, 2017, 27 pages.

B. Tranberg et al., "Power Flow Tracing in a Simplified Highly Renewable European Electricity Network," New Journal of Physics, vol. 17, Oct. 2, 2015, 10 pages.

T. Capper et al., "Peer-To-Peer, Community Self-Consumption, and Transactive Energy: A Systematic Literature Review of Local Energy Market Models," Renewable and Sustainable Energy Reviews, vol. 162, Jul. 2022, 24 pages.

T. Yang et al., "A Survey Of Distributed Optimization," Annual Reviews in Control, vol. 47, May 2019, 28 pages.

Y.-J. Kim et al., "Modeling and Analysis of a Variable Speed Heat Pump for Frequency Regulation Through Direct Load Control," IEEE Transactions on Power Systems, vol. 30, No. 1, Jan. 2015, 12 pages.

A. Alessio et al., "A Survey on Explicit Model Predictive Control," Nonlinear Model Predictive Control, Lecture Notes in Control and Information Sciences, vol. 384, 2009, pp. 345-369.

T. Chen et al., "xgboost: eXtreme Gradient Boosting," Package Version: 0.6-4, Jan. 4, 2017, 4 pages.

(56) References Cited

OTHER PUBLICATIONS

J. Nowotarski et al., "Recent Advances in Electricity Price Forecasting: A Review of Probabilistic Forecasting," Renewable and Sustainable Energy Reviews, forthcoming, Sep. 2016, 44 pages.

P. Van Overschee et al., "N4sid: Subspace Algorithms for The Identification of Combined Deterministic-Stochastic Systems," Automatica, Special Issue on Statistical Processing and Control, accepted paper, Feb. 1992, 52 pages.

United States Environmental Protection Agency, "Official U.S. Government Source for Fuel Economy," https://www.fueleconomy.gov/, Accessed Feb. 8, 2023, 2 pages.

E. Wilson et al., "2014 Building America House Simulation Protocols," National Renewable Energy Laboratory Technical Report, NREL/TP-5500-60988, Mar. 2014, 91 pages.

G. S. Oh et al., "Vehicle Energy Dataset (VED), A Large-scale Dataset for Vehicle Energy Consumption Research," arXiv:1905.02081v1, Apr. 19, 2019, 11 pages.

Florida Power & Light Company, "Residential On Call," https://www.fpl.com/save/programs/on-call.html#:~:text=Residential%20On%20Call,%C2%AE&text=This%20program%20gives%20FPL%20the,to%20turn%20off%20your%20appliances, Accessed Feb. 8, 2023, 6 pages.

Pecan Street, "Pecan Street Dataport," https://www.pecanstreet.org/dataport/, Accessed Feb. 8, 2023, 5 pages.

A. Mas-Colell et al., "Microeconomic Theory," Oxford University Press, New York, 1995, 985 pages.

Z. E. Lee et al., "Unintended Consequences of Smart Thermostats in the Transition to Electrified Heating," Applied Energy, vol. 322, Sep. 15, 2022, 8 pages.

W. Ajaz et al., "California's Adoption of Microgrids: A Tale of Symbiotic Regimes and Energy Transitions," Renewable and Sustainable Energy Reviews, vol. 138, Mar. 2021, 10 pages.

J. H. Yoon et al., "Dynamic Demand Response Controller Based on Real-Time Retail Price for Residential Buildings," IEEE Transactions on Smart Grid, vol. 5, No. 1, Jan. 2014, pp. 121-129.

A. Mirakhorli et al., "Model Predictive Control for Building Loads Connected with a Residential Distribution Grid," Applied Energy, vol. 230, Nov. 15, 2018, pp. 627-642.

S. Yin et al., "Decentralized Electricity Market with Transactive Energy—A Path Forward," The Electricity Journal, vol. 32, No. 4, May 2019, pp. 7-13.

C. Finck et al., "Economic Model Predictive Control for Demand Flexibility of a Residential Building," Energy 176 Mar. 2019, Accepted Manuscript.

A. Attia et al., "Global Overview of Imitation Learning," arXiv:1801.06503v1, Jan. 19, 2018, 12 pages.

M. Bain et al., "A Framework for Behavioural Cloning," Machine Intelligence, Jul. 30, 2001, 36 pages.

J. Drgoňa et al., "Approximate Model Predictive Building Control via Machine Learning," Applied Energy, vol. 218, May 2018, pp. 199-216.

M. Hertneck et al., "Learning an Approximate Model Predictive Controller with Guarantees," arXiv:1806.04167v1, Jun. 11, 2018, 6 pages.

S. Ross et al., "A Reduction of Imitation Learning and Structured Prediction to No-Regret Online Learning," Proceedings of the 14th International Conference on Artificial Intelligence and Statistics, arXiv:1011.0686v3, Mar. 16, 2011, 9 pages.

A. Vlachos et al., "An Investigation of Imitation Learning Algorithms for Structured Prediction," 2012 10th European Workshop on Reinforcement Learning, vol. 24, 2012, pp. 143-153.

J. Zhang et al., "Query-Efficient Imitation Learning for End-to-End Autonomous Driving," arXiv:1605.06450v1, May 20, 2016, 12 pages.

A. Zeyer et al., "A Comprehensive Study of Deep Bidirectional LSTM RNNS for Acoustic Modeling in Speech Recognition," arXiv:1606.06871v2, Mar. 29, 2017, 5 pages.

Consolidated Edison, Inc., "Residential Time-of-Use Rate," https://www.coned.com/en/accounts-billing/your-bill/time-of-use, Accessed Mar. 25, 2021, 7 pages.

XCEL Energy, "Time of Use Pricing FAQs," 2017, 9 pages.

Z. E. Lee et al., "Scalable Identification and Control of Residential Heat Pumps: A Minimal Hardware Approach," Applied Energy, vol. 286, Mar. 15, 2021, 13 pages.

Z. E. Lee et al., "Generalized Reinforcement Learning for Building Control using Behavioral Cloning," arXiv:2104.00123v1, Mar. 31, 2021, 23 pages.

D, Sturzenegger et al., "Semi-Automated Modular Modeling of Buildings for Model Predictive Control," ACM Workshop on Embedded Sensing Systems for Energy-Efficiency in Buildings, Nov. 2012, 9 pages.

W. E. Hart et al., "Pyomo—Optimization Modeling in Python," Springer Optimization and Its Applications, vol. 67, Second Edition, 2017, 280 pages.

K. J. Kircher et al., "On the Lumped Capacitance Approximation Accuracy in RC Network Building Models," Energy and Buildings, vol. 108, Dec. 2015, 17 pages.

A. Afram et al., "Theory and Applications of HVAC Control Systems—A Review of Model Predictive Control (MPC)," Building and Environment, vol. 72, Feb. 2014, pp. 343-355.

J. Drgoňa et al., "Explicit Stochastic MPC Approach to Building Temperature Control," 52nd IEEE Conference on Decision and Control, Dec. 2013, 6 pages.

A. Parisio et al., "Control of HVAC Systems via Scenario-based Explicit MPC," 53rd IEEE Conference on Decision and Control, Dec. 2014, pp. 5201-5207.

T. Wei et al., "Deep Reinforcement Learning for Building HVAC Control," 54th ACM/EDAC/IEEE Design Automation Conference (DAC), Jun. 2017, 6 pages.

V. Mnih et al., "Asynchronous Methods for Deep Reinforcement Learning," 33rd International Conference on Machine Learning, Jun. 19, 2016, 10 pages.

Z. Wang et al., "Reinforcement Learning for Building Controls: The Opportunities and Challenges," Applied Energy, Jun. 2020, 29 pages.

J. Cigler et al., "Beyond Theory: The Challenge of implementing Model Predictive Control in Buildings," Proceedings Of 11th Rehva World Congress, Jun. 2013, 10 pages.

X. Jin et al., "Foresee: A User-centric Home Energy Management System for Energy Efficiency and Demand Response," Applied Energy, Nov. 2017, 13 pages.

R. Godina et al., "Model Predictive Control Home Energy Management and Optimization Strategy with Demand Response," Applied Sciences, vol. 8, Mar. 2018, 19 pages.

I. Rahman, "Electrical Load Disaggregation and Demand Response in Commercial Buildings," Dissertation for Doctor of Philosophy in Electrical Engineering, Virginia Polytechnic Institute and State University, Dec. 17, 2019, 102 pages.

Z. E. Lee et al., "Regulated Peer-to-Peer Energy Markets for Harnessing Decentralized Demand Flexibility," Applied Energy, Author's Manuscript, 2023, 20 pages.

J. G. Monroe et al., "Agent-Based Model of a Blockchain Enabled Peer-to-Peer Energy Market: Application for a Neighborhood Trial in Perth, Australia," Smart Cities, vol. 3, Sep. 2020, pp. 1072-1099.

A. Dubey et al., "Electric Vehicle Charging on Residential Distribution Systems: Impacts and Mitigations," IEEE Access, vol. 3, Sep. 14, 2015, pp. 1871-1893.

A. M. Brockway et al., "Inequitable Access to Distributed Energy Resources Due to Grid Infrastructure Limits in California," Nature Energy, Sep. 13, 2021, 15 pages.

C. D. White et al., "Using Vehicle-to-grid Technology for Frequency Regulation and Peak-load Reduction," Journal of Power Sources, vol. 196, No. 8, Apr. 15, 2011, pp. 3972-3980.

C. Liu et al., "Opportunities and Challenges of Vehicle-to-Home, Vehicle-to-Vehicle, and Vehicle-to-Grid Technologies," Proceedings of the IEEE, vol. 101, No. 11, Nov. 2013, pp. 2409-2427.

K. Kok et al., "A Society of Devices," IEEE Power & Energy Magazine, May/Jun. 2016, pp. 34-45.

K. Garifi et al., "Stochastic Home Energy Management Systems with Varying Controllable Resources," IEEE Power & Energy Society General Meeting, Aug. 2019, 5 pages.

(56) References Cited

OTHER PUBLICATIONS

O. Abrishambaf et al., "Towards Transactive Energy Systems: An Analysis on Current Trends," Energy Strategy Reviews, vol. 26, Nov. 2019, 17 pages.
S. Widergren et al., "Residential Transactive Control Demonstration," Innovative Smart Grid Technologies (ISGT), Feb. 2014, 5 pages.
H. R. Bokkisam et al., "Blockchain-based Peer-to-Peer Transactive Energy System for Community Microgrid with Demand Response Management," CSEE Journal of Power and Energy Systems, vol. 8, No. 1, Jan. 2022, pp. 198-211.
F. Lezama et al., "Local Energy Markets: Paving the Path Toward Fully Transactive Energy Systems," IEEE Transactions on Power Systems, vol. 34, No. 5, Sep. 2019, pp. 4081-4088.
D. Lee et al., "The Challenges of Implementing Transactive Energy: A Comparative Analysis of Experimental Projects," The Electricity Journal, vol. 33, No. 10, Dec. 2020, 6 pages.
K. Kok, "The PowerMatcher: Smart Coordination for the Smart Electricity Grid," SIKS Dissertation Series No. 2013-17, TNO, The Netherlands, May 13, 2013, 314 pages.
M. S. Nazir et al., "A Dynamical Systems Approach to Modeling and Analysis of Transactive Energy Coordination," IEEE Transactions on Power Systems, vol. 34, No. 5, Sep. 2019, pp. 4060-4070.
A. Masood et al., "Transactive Energy for Aggregated Electric Vehicles to Reduce System Peak Load Considering Network Constraints," IEEE Access, vol. 8, Feb. 2020, pp. 31519-31529.
C. Zhang et al., "Peer-to-Peer energy trading in a Microgrid," Applied Energy, vol. 220, Jun. 15, 2018, 12 pages.
Y. Zhou et al., "Evaluation of Peer-to-peer Energy Sharing Mechanisms Based on a Multiagent Simulation Framework," Applied Energy, vol. 222, Jul. 15, 2018, pp. 993-1022.
C. Long et al., "Peer-to-Peer Energy Sharing through a Two-Stage Aggregated Battery Control in a Community Microgrid," Applied Energy, vol. 226, Sep. 15, 2018, pp. 261-276.
W. Tushar et al., "Peer-to-Peer Trading in Electricity Networks: An Overview," IEEE Transactions on Smart Grid, vol. 11, No. 4, Jul. 2020, pp. 3185-3200.
W. Tushar et al., "Peer-to-Peer Energy Systems for Connected Communities: A Review of Recent Advances and Emerging Challenges," Applied Energy, Jan. 2021, 33 pages.
E. P. Johnson et al., "Renewable Generation Capacity and Wholesale Electricity Price Variance," The Energy Journal, Feb. 2019, 44 pages.
M. Huneault et al., "A Survey of the Optimal Power Flow Literature," IEEE Transactions on Power Systems, vol. 6, No. 2, May 1991, pp. 762-770.
R. Hledik et al., "Distribution System Pricing with Distributed Energy Resources," Future Electric Utility Regulation Advisory Group, Report No. 4, May 2016, 103 pages.
M. S. H. Nizami et al., "A Nested Transactive Energy Market Model to Trade Demand-Side Flexibility of Residential Consumers," IEEE Transactions on Smart Grid, vol. 12, No. 1, Jan. 2021, pp. 479-490.
A. Ramos et al., "Realizing the Smart Grid's Potential: Defining Local Markets for Flexibility," Utilities Policy, vol. 40, Jun. 2016, Abstract & Introduction, 7 pages.
A. Keskar et al., "Do Commercial Buildings Become Less Efficient When They Provide Grid Ancillary Services?" Energy Efficiency, vol. 13, Apr. 2, 2019, pp. 487-501.
U.S. Energy Information Administration, "Residential Energy Consumption Survey," https://www.eia.gov/consumption/residential/data/2015/index.php, Accessed Mar. 25, 2021, 5 pages.
R. Aldrich et al., "Northeast/Mid-Atlantic Air-Source Heat Pump Market Strategies Report 2016 Update," Northeast Energy Efficiency Partnerships, Inc., Jan. 2017, 96 pages.
New York City Mayor's Office of Sustainability, "New York City's Roadmap to 80 x 50," 2017, 134 pages.
D. Carroll et al., "NYSERDA Low-to Moderate-Income Market Characterization Report," New York State Energy Research and Development Authority, 2017, 59 pages.
Z. E. Lee et al., "Providing Grid Services with Heat Pumps: A Review," Journal of Engineering for Sustainable Buildings and Cities, vol. 1, Feb. 2020, 11 pages.
X. Li et al., "Review of Building Energy Modeling for Control and Operation," Renewable and Sustainable Energy Reviews, vol. 37, May 17, 2014, pp. 517-537.
Z. E. Lee et al., "Mixed-Integer Model Predictive Control of Variable-Speed Heat Pumps," Energy and Buildings, vol. 198, Apr. 30, 2019, 19 pages.
L. Zhang et al., "Building-to-Grid Flexibility: Modelling and Assessment Metrics for Residential Demand Response from Heat Pump Aggregations," Applied Energy, Jan. 2019, 27 pages.
J. L. Mathieu et al., "State Estimation and Control of Electric Loads to Manage Real-Time Energy Imbalance," IEEE Transactions on Power Systems, Feb. 2013, 11 pages.
H. Hao et al., "Aggregate Flexibility of Thermostatically Controlled Loads," IEEE Transactions on Power Systems, Sep. 2014, 10 pages.
J. Clauss et al., "Model Complexity of Heat Pump Systems to Investigate the Building Energy Flexibility and Guidelines for Model Implementation," Applied Energy, vol. 255, 2019, 16 pages.
Internet of Business, "Smart Thermostats Gain Traction in Europe and North America," https://internetofbusiness.com/smart-thermostats-gain-traction-europe-north-america/#:~:text=Analysts%20at%20Berg%20Insight%20forecast,reach%2078.1%20million%20in%202021, Accessed Mar. 25, 2021, 3 pages.
K. Ehrhardt-Martinez et al., "Advanced Metering Initiatives and Residential Feedback Programs: A Meta-Review for Household Electricity-Saving Opportunities," American Council for an Energy-Efficient Economy, Jun. 2010, 140 pages.
A. Meier et al., "What Can Connected Thermostats Tell US about American Heating and Cooling Habits?" ECEEE 2019 Summer Study Proceedings, 2019, pp. 649-657.
Ecobee Inc. "Donate your Data," https://www.ecobee.com/donateyourdata/, Accessed Mar. 25, 2021, 12 pages.
M. Sengupta et al., "The National Solar Radiation Data Base (NSRDB)," Renewable and Sustainable Energy Reviews, vol. 89, 2018, pp. 51-60.
D. Korn et al., "Ductless Mini-Split Heat Pump Impact Evaluation," The Cadmus Group, Inc. prepared for The Electric and Gas Program Administrators of Massachusetts and Rhode Island, Dec. 30, 2016, 161 pages.
K. D. Anderson et al., "Event Detection for Non Intrusive Load Monitoring," 38th Annual Conference on IEEE Industrial Electronics Society, Oct. 2012, pp. 3312-3317.
J. Z. Kolter et al., "Approximate Inference in Additive Factorial HMMs with Application to Energy Disaggregation," Proceedings of the 15th International Conference on Artificial Intelligence and Statistics, 2012, 11 pages.
J. Z. Kolter et al., "Energy Disaggregation via Discriminative Sparse Coding," Proceedings of the 23rd International Conference on Neural Information Processing Systems, 2010, 9 pages.
A. Rahimpour et al., "Non-Intrusive Energy Disaggregation Using Non-negative Matrix Factorization with Sum-to-k Constraint," arXiv:1704.07308v2, May 14, 2018, 12 pages.
F. Pedregosa et al., "Scikit-learn: Machine learning in Python," Journal of Machine Learning Research vol. Oct. 12, 2011, pp. 2825-2830.
Coleman Heating and Air Conditioning, "LX Series Split System Heat Pumps," Technical Guide, https://bit.ly/35m8MQd, 2018, 80 pages.
B. Eisenhower et al., "A Methodology for Meta-Model Based Optimization in Building Energy Models," Energy and Buildings, vol. 47, 2012, pp. 292-301.
D. B. Crawley et al., "Energyplus: Energy Simulation Program," ASHRAE Journal, Apr. 2000, pp. 49-56.
M. W. Ahmad et al., "Trees vs Neurons: Comparison between Random Forest and ANN for High-Resolution Prediction of Building Energy Consumption," Energy and Buildings, vol. 147, 2017, pp. 77-89.
Y. Chen et al., "Optimal Control Via Neural Networks: A Convex Approach," arXiv: 1805.11835v5, Feb. 26, 2019, 25 pages.
B. Sun et al., "Building Energy Management: Integrated Control of Active and Passive Heating, Cooling, Lighting, Shading, and Ven-

(56) References Cited

OTHER PUBLICATIONS tilation Systems," IEEE Transactions on Automation Science and Engineering, vol. 10, No. Jul. 2013, pp. 588-602.
Q. Hu et al., "Building Model Identification during Regular Operation—Empirical Results and Challenges," arXiv:1603.06872v1, Mar. 22, 2016, 6 pages.
S. Bashash et al., "Modeling and Control Insights into Demand-Side Energy Management Through Setpoint Control of Thermostatic Loads," Proceedings of the 2011 American Control Conference, Jun. 29-Jul. 1, 2011, pp. 4546-4553.
X. Glorot et al., "Deep Sparse Rectifier Neural Networks," Proceedings of the Fourteenth International Conference on Artificial Intelligence And Statistics, 2011, pp. 315-323.
C. Andrade-Cabrera et al., "Lumped Parameter Building Model Calibration using Particle Swarm Optimization," 3rd Asia conference of International Building Performance Simulation Association, Nov. 29, 2016, 8 pages.
R. De Coninck et al., "Toolbox for Development and Validation of Grey-Box Building Models for Forecasting and Control," Journal of Building Performance Simulation, vol. 9, Jun. 2015, 19 pages.
J. Date et al., "Control-Oriented Modelling of Thermal Zones in a House: A Multi-Level Approach," 4th International High Performance Buildings Conference, Jul. 11-14, 2016, 10 pages.
D. H. Blum et al., "Practical Factors of Envelope Model Setup and Their Effects On the Performance of Model Predictive Control for Building Heating, Ventilating, and Air Conditioning Systems," Applied Energy, vol. 236, Feb. 15, 2019, 38 pages.
E. Vrettos et al., "Experimental Demonstration of Frequency Regulation by Commercial Buildings Part I: Modeling and Hierarchical Control Design," arXiv:1605.05835v1, May 20, 2016, 24 pages.
O. Ruhnau et al., "Time Series of Heat Demand and Heat Pump Efficiency for Energy System Modeling," Scientific Data, Oct. 1, 2019, 11 pages.
A. Gleixner et al., "The SCIP Optimization Suite 6.0," Zuse Institute Berlin, Jul. 2, 2018, 40 pages.
P. Belotti et al., "Mixed-Integer Nonlinear Optimization," Acta Numerica, vol. 22, May 2013, 119 pages.
M. Tawarmalani et al., "A Polyhedral Branch-and-Cut Approach to Global Optimization," Mathematical Programming, vol. 103, May 3, 2005, pp. 225-249.
A. Wachter et al., "On the Implementation of an Interior-Point Filter Line-Search Algorithm for Large-Scale Nonlinear Programming," Mathematical Programming, vol. 106, Mar. 19, 2004, 28 pages.
P.-D. Morosan et al., "Building Temperature Regulation Using a Distributed Model Predictive Control," Energy and Buildings, Mar. 10, 2010, 10 pages.
New York State Electric and Gas Corporation, "Service Classification No. 12," Jan. 1, 2008, Revision 1, 15 pages.
Z. E. Lee et al., "Scalable Identification and Control of Residential Heat Pumps with Smart-Home Devices," manuscript under review, 2020, 25 pages.
Z. E. Lee et al., "Behavioral Cloning of HVAC Model Predictive Control for use on Resource-Constrained Devices," 2020, 24 pages.
S. Billimoria et al., "The Economics of Electrifying Buildings: How Electric Space and Water Heating Supports Decarbonization of Residential Buildings," Rocky Mountain Institute, 2018, 73 pages.
M. R. Shaner et al., "Geophysical Constraints on the Reliability of Solar and Wind Power in the United States," Energy & Environmental Science, Feb. 2018, 12 pages.
G. Hernandez et al., "Smart Nest Thermostat: A Smart Spy in Your Home," Black Hat, 2014, 43 pages.
Deloitte, "Energy Management: Navigating the Headwinds," Deloitte Resources 2016 Study, 47 pages.
G. Serale et al., "Model Predictive Control (MPC) for Enhancing Building and HVAC System Energy Efficiency: Problem Formulation, Applications and Opportunities," Energies, vol. 11, No. 631, 2018, 35 pages.

\* cited by examiner

Algorithm 1: Iterative Bound Tightening (IBT)

Solve problem with conservative upper and lower bounds;
Initialize list $B$ of model parameters that are at their bound;
while *True* do
    for *bound in B* do
        Tighten bound by some amount $\beta$;
        Solve problem with new bounds;
        Calculate validation error;
    end
    if *no model parameters at bounds or error is diverging* then
        Stop;
    else
        Update $B$ with new model parameters at new bounds;
    end
end
Choose bounds with lowest validation model error;
Retrain final model on validation and training data.

FIG. 5

Algorithm 2: MPC-Guided DAgger

Simulate a set of randomized buildings, weather, and electricity tariffs using MPC;

Train Behavioral Cloning agent on resulting normalized dataset;

while $J_{appr} - J_{MPC} \le \epsilon$ do

Simulate new set of randomized buildings, weather, and electricity tariffs controlled using the agent;

At each time step, solve MPC and add (but do not implement) the inputs and solutions to training dataset;

Retrain agent with additional training data;

Evaluate agent on test conditions and calculate total objective value $J_{appr}$;

end

FIG. 7

SCALABLE CONTROL OF HEAT PUMPS WITH LIMITED SMART-HOME DEVICES

RELATED APPLICATION

The present application claims priority to U.S. Provisional Patent Application Ser. No. 63/300,920, filed Jan. 19, 2022 and entitled "Scalable Control of Heat Pumps with Limited Smart-Home Devices," which is incorporated by reference herein in its entirety.

STATEMENT OF GOVERNMENT SUPPORT

This invention was made with U.S. government support under Grant No. 1711546 of the National Science Foundation (NSF) and the NSF Graduate Research Fellowships Program. The U.S. government has certain rights in the invention.

FIELD

The field relates generally to electrical systems, and more particularly to techniques for building system control and smart-home energy management.

BACKGROUND

While model predictive control is a widely studied tool for integrating residential heat pumps with a smart grid, modeling difficulties and hardware requirements are significant barriers to widespread implementation. Accordingly, improved techniques are needed for intelligent control of heat pumps, so as to substantially reduce the implementation effort and capital costs required, and to provide other additional or alternative advantages relative to conventional approaches.

SUMMARY

Illustrative embodiments disclosed herein provide techniques for scalable control of heat pumps, utilizing data obtained from limited smart-home devices, such as a smart thermostat or other type of programmable thermostat, and a smart electricity meter.

It should be noted that the term "heat pump" as used herein is intended to be broadly construed, so as to encompass, for example, a wide variety of different types of heating, ventilation and/or air conditioning (HVAC) equipment, such as electric heaters, heating systems, air conditioning systems, ventilation systems and/or other types of systems relating to at least one of heating, cooling and ventilation. Also, the term "programmable thermostat" as used herein is intended to be broadly construed, so as to encompass, for example, a wide variety of different types of Internet-connected smart thermostats, such as digital thermostats with programmable logic controllers (PLCs).

By way of example only, some illustrative embodiments provide a nonintrusive plug-and-play methodology for model identification and model predictive control using data provided by a smart thermostat and smart electricity meter, both of which are becoming increasingly widely deployed in residences and other buildings. While this limited hardware approach is extremely scalable, the lack of data diversity introduces modeling challenges, which are advantageously overcome using the techniques disclosed herein. Accordingly, some embodiments use energy disaggregation to determine the heat pump power consumption model without the need for submetering, and an algorithm is then used to determine building model thermal parameters that combats overfitting caused by limited state excitation. This scalable approach in some embodiments is implemented as a centralized model predictive controller, facilitated by the communication ability provided by the smart thermostat. Experimental results performed on one or more illustrative embodiments disclosed herein show that, in addition to providing reduced energy consumption and improved thermal comfort, a centralized model predictive controller of the type disclosed herein can also provide improved grid services in aggregate, such as reduced peak demand.

In some embodiments, scalable control of heat pumps as disclosed herein can be implemented, for example, in a digital thermostat that includes a PLC or other similar device, possibly through utilization of behavioral cloning techniques or other types of reinforcement learning. Illustrative embodiments therefore do not require the use of a smart thermostat with network connectivity.

An apparatus in one illustrative embodiment comprises at least one processing device. The processing device comprises a processor coupled to a memory, and is configured to obtain energy usage data generated by advanced metering infrastructure of a particular energy usage location that includes a heat pump, to obtain thermostat data characterizing operation of the heat pump, to apply a power consumption disaggregation algorithm to the energy usage data and the thermostat data to disaggregate power consumption of the heat pump from other power consumption of the particular energy usage location, to execute a model predictive control process utilizing the disaggregated heat pump power consumption, and to initiate at least one automated action relating to the heat pump based at least in part on one or more outputs of the model predictive control process.

In some embodiments, the processing device is further configured to operate on temperature and/or solar irradiance information from at least one weather sensor so as to provide hyper-local weather prediction modeling for control purposes.

In some embodiments, the power consumption disaggregation algorithm implements supervised learning via random forest regression, and the model predictive control process utilizes a linear autoregressive heat pump model trained using the disaggregated heat pump power consumption. Numerous other types of machine learning techniques and models can be used in other embodiments.

In some embodiments, initiating at least one automated action relating to the heat pump based at least in part on one or more outputs of the model predictive control process comprises, for example, generating at least one control signal for controlling one or more characteristics of the heat pump based at least in part on one or more outputs of the model predictive control process. A wide variety of other automated actions can be driven by outputs of the model predictive control process in other embodiments.

The above-noted apparatus can be implemented, for example, at least in part in a cloud-based processing platform, and/or at least in part in one or more of a smart meter, a smart thermostat, a smart-home controller or other smart-home device. For example, the apparatus can comprise multiple processing devices, with one such processing device implemented in a cloud-based processing platform, and another such processing device implemented in a smart meter, a smart thermostat, a smart-home controller or other smart-home device. Numerous other arrangements are possible in other embodiments. For example, other types of programmable thermostats may be used in other embodiments, including digital thermostats without Internet connectivity.

Additional illustrative embodiments utilize reinforcement learning agents implemented at least in part using behavioral cloning in order to facilitate implementation of heat pump control using resource-constrained devices.

An apparatus in an illustrative embodiment of this type comprises at least one processing device. The at least one processing device comprises a processor coupled to a memory, and is configured to obtain information characterizing operation of a heat pump at a particular energy usage location, and to process the obtained information in a reinforcement learning agent to generate at least one control signal for controlling the heat pump, wherein the reinforcement learning agent is implemented at least in part utilizing behavioral cloning of a model predictive control process.

In some embodiments, the behavioral cloning of the model predictive control process comprises a constraint-informed parameter grouping (CIPG) phase, a training data generation phase and a model training phase.

The CIPG phase illustratively determines a plurality of grouped parameters comprising at least a first grouping that includes thermodynamic properties of a building model of the particular energy usage location and one or more additional groupings comprising at least one of future disturbances and previous control signals generated by the reinforcement learning agent.

The training data generation phase illustratively implements a dataset aggregation algorithm guided at least in part by solutions determined by the model predictive control process.

The model training phase illustratively comprises training a reverse-time recurrent neural network (RT-RNN) of the reinforcement learning agent.

Further illustrative embodiments are configured for harnessing decentralized demand flexibility through autonomous peer-to-peer transactions using smart contracts. Such embodiments advantageously enable a grid operator or other system entity to harness the decentralized demand flexibility in a wide variety of different implementations.

For example, a given such embodiment is illustratively configured to provide a decentralized, flexibility-as-a-curve approach which allows individual smart-home prosumers to bid a flexibility curve into a peer-to-peer electricity market within a distribution system, where the term "prosumer" as used herein is intended to be broadly construed so as to encompass, for example, an entity that can both produce energy for delivery to electrical distribution infrastructure and consume energy received from electrical distribution infrastructure. Thus, a prosumer both produces energy and consumes energy.

The above-noted flexibility curves are autonomously generated through a reinforcement learning agent or other type of agent in some embodiments. For example, such flexibility curves can be generated in illustrative embodiments by an agent implementing a hierarchical optimal control algorithm, using reinforcement learning techniques, model predictive control techniques and/or other techniques.

By aggregating the individual flexibility curves and considering electricity prices from a utility or other generation, an optimal real-time clearing price is determined that balances supply and demand. Prosumers then buy and sell electricity from each other or from the utility on a virtual financial layer through smart contracts that are recorded on a blockchain. System operators can also use the aggregate flexibility curve to effectively set their price in order to satisfy operational requirements.

In one such embodiment, an apparatus comprises at least one processing device comprising a processor coupled to a memory, with the processing device being configured to obtain energy usage data generated by advanced metering infrastructure of a particular energy usage location, and to generate a flexibility curve for the particular energy usage location based at least in part on the obtained energy usage data, with the flexibility curve being generated utilizing a reinforcement learning agent associated with the particular energy usage location, although it is to be appreciated that other types of agents can be used. Accordingly, the disclosed techniques do not require use of reinforcement learning techniques.

The processing device is further configured to provide the flexibility curve to at least one other processing device of a peer-to-peer electricity market of an electrical distribution system, wherein the flexibility curve is aggregated with additional flexibility curves generated for respective other energy usage locations utilizing respective other reinforcement learning agents or other types of agents associated with those respective other energy usage locations, to determine an optimal real-time clearing price for electricity in the peer-to-peer electricity market, and to execute a transaction at the optimal real-time clearing price through a smart contract that is configured to record the executed transaction on a blockchain.

In some embodiments, a given reinforcement learning agent or other type of agent is trained on model predictive control data using behavioral cloning.

In some embodiments, the above-noted processing device comprises at least one IoT device in a network of IoT devices, and/or at least one smart-home controller or other type of building controller, illustratively configured to generate bids for a blockchain-based peer-to-peer energy market.

These and other illustrative embodiments disclosed herein include but are not limited to systems, methods, apparatus, processing devices, integrated circuits and computer program products comprising processor-readable storage media having software program code embodied therein.

BRIEF DESCRIPTION OF THE FIGURES

FIG. 5 shows example pseudocode for an iterative bound tightening (IBT) algorithm utilized in an MPC module of a heat pump control system in an illustrative embodiment.

FIG. 7 shows example pseudocode for an MPC-guided dataset aggregation ("DAgger") algorithm for training of a behavioral cloning agent in an illustrative embodiment.

DETAILED DESCRIPTION

Figure 1:
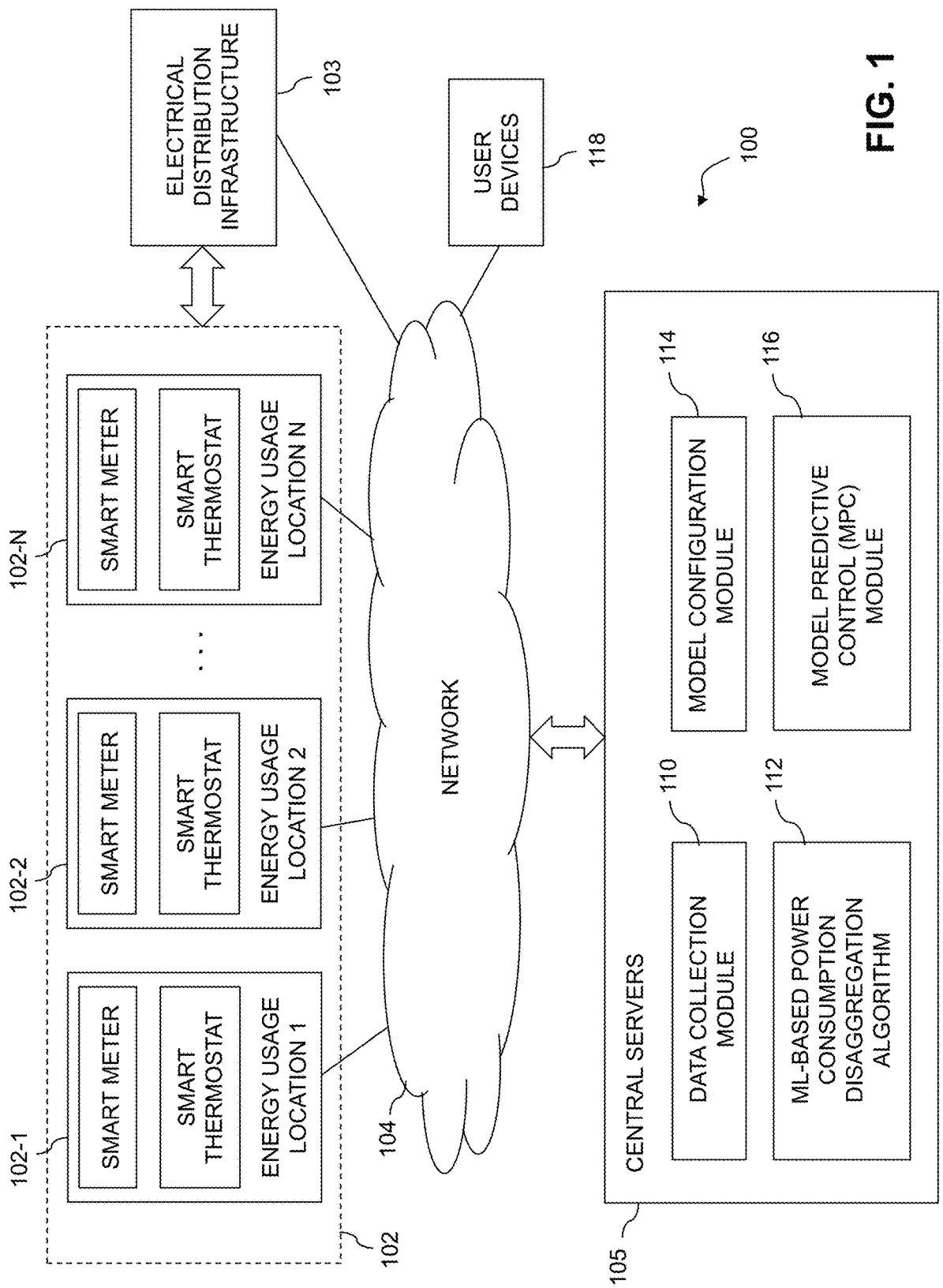
FIG. 1 is a block diagram of an information processing system configured with functionality for scalable control of heat pumps at respective energy usage locations of an electrical distribution system in an illustrative embodiment.

Illustrative embodiments disclosed herein can be implemented, for example, at least in part in the form of information processing systems comprising computer networks or other arrangements of networks, clients, servers, processing devices and other components. Illustrative embodiments of such information processing systems and associated electrical distribution systems will be described in detail herein. For example, smart meters of an electrical distribution system, and smart thermostats, smart-home controllers or other smart-home devices, may operate as respective clients relative to one or more central servers, possibly implemented as cloud-based servers. It should be understood, however, that embodiments of the invention are more generally applicable to a wide variety of other types of information processing systems and associated networks, clients, servers, processing devices or other components.

Accordingly, the term "information processing system" as used herein is intended to be broadly construed so as to encompass these and other arrangements. Such information processing systems illustratively comprise localized and/or centralized control system arrangements that are implemented in conjunction with other types of systems and devices, such as heat pumps, power grids, electrical distribution systems and smart metering arrangements.

An "electrical distribution system" as that term is used herein is also intended to be broadly construed and may encompass at least a portion of a power grid or other types of electrical distribution infrastructure, possibly including smart meters arranged at respective energy usage locations. Some embodiments illustratively comprise potentially large numbers of networked smart meters.

Smart control of residential heat pumps can provide significant benefits to both consumers and the power grid, but has so far been difficult to reliably implement at scale. The process of model identification and other hardware requirements can discourage residents from investing in this smarter control. However, smart-home devices like smart thermostats and smart electricity meters are seeing widespread adoption across the US. At periodic intervals (e.g., every five minutes), these devices log valuable data like electricity consumption, indoor and outdoor temperature, setpoints, and calls for heat or cool, which can be used in illustrative embodiments herein for data-driven system identification. Moreover, current smart thermostats are capable of bi-directional communication with servers over a network, meaning they can send usage data to a central server, and the server can return a given control signal, making centralized control for certain grid services feasible.

Illustrative embodiments utilize smart thermostat and smart electricity meters to provide an end-to-end, non-intrusive methodology for identifying residential building models and implementing model predictive control (MPC) for energy efficiency, peak demand reduction, flexibility, and other potential control objectives. An important benefit in some embodiments is a plug-and-play capability for heat pump and smart grid interactivity, in which the homeowner installs a smart thermostat and the utility provides data from a smart electricity meter. This approach can drastically reduce barriers to adoption that currently discourage homeowners from participating in demand response programs.

For example, the heat pump and building system models may be identified entirely based on the data obtained from these smart-home devices. Consequently, very little knowledge of the building's construction parameters is required, drastically increasing the potential for scalability. However, because of the limited data sources and low system excitation, unique challenges arise when trying to identify building models for control purposes. Although pure black-box models can accurately predict the indoor temperature, they are highly susceptible to overfitting and are therefore unable to generalize for control purposes. Illustrative embodiments overcome this problem of conventional practice at least in part by enhancing the data-driven model with some knowledge of the underlying thermodynamic laws to provide an accurate model that also generalizes well for control purposes.

Additionally or alternatively, the identified models may be incorporated into a realistic centralized MPC formulation to control an aggregation of heat pumps in a manner that provides substantial improvements relative to existing MPC algorithms. For example, minimum heat pump on and off times are considered in order to mitigate the efficiency and reliability losses that arise from short cycling. In some embodiments, real user setpoint schedules obtained from actual smart thermostats are used. While many MPC simulations use predefined setpoint schedules, setpoints can vary drastically from person to person, and the aggregate effect of coinciding setpoint changes significantly affects peaks in electrical consumption.

Illustrative embodiments can be configured to include a centralized controller that minimizes the aggregate peak demand of a cluster of heat pumps under an aggregate demand charge pricing structure, while still incorporating a realistic, high-fidelity MPC formulation using the identified models. For example, minimum heat pump on and off times are considered in some embodiments in order to mitigate the efficiency and reliability losses that arise from short cycling. In some embodiments, real user setpoint schedules obtained from actual smart thermostats are used. While many MPC simulations use predefined setpoint schedules, setpoints can vary drastically from person to person, and the aggregate effect of coinciding setpoint changes significantly affects peaks in electrical consumption. This centralized controller can achieve many of the same benefits as a local controller, such as improved thermal comfort and reduced energy costs, while also mitigating the aggregate peak load of coinciding setpoint schedules, all without any intrusion or effort from the resident.

Some embodiments provide data-driven control of grid-interactive buildings using smart-home devices.

In the transition to a carbon-neutral energy system, electric heat pumps are widely accepted as a clean alternative to fossil-fuel based heating. However, heat pumps still face high economic barriers to adoption, and these new electrical loads present technical challenges for an electrical grid that is increasingly supplied by variable renewable energy. While many heat pump control solutions have already been proposed to increase efficiency, lower operational costs, and provide grid interactivity through demand response and load shifting, these solutions have largely remained limited to academic studies due to the high effort and costs of implementation.

To reduce the barriers for heat pump adoption and providing grid interactivity, illustrative embodiments disclosed herein provide scalable, nonintrusive data-driven heat pump control methods that can be implemented using increasingly popular smart-home devices like smart thermostats and smart electricity meters. By using devices already projected to be in a majority of homes in the coming years, illustrative embodiments disclosed herein provide plug-and-play solutions that can both lower energy consumption and provide services to the grid.

Some embodiments implement a method for building model identification using only data collected by a smart thermostat and smart electricity meter. Such embodiments illustratively use the identified model and the smart thermostat's Internet connectivity in centralized model predictive control arrangement to provide aggregated energy management services such as aggregate peak load reduction.

One or more such embodiments can additionally or alternatively implement a reinforcement learning based approach that can provide MPC-like control with significantly reduced computational requirements, making it suitable for operation on low-cost hardware.

Other embodiments can be configured to use a large smart thermostat dataset to explore potential unintended negative system level effects of current heat pump sizing practices and smart thermostat usage.

Additionally or alternatively, other embodiments can be configured to use reinforcement learning for complex grid-interactive buildings that contain electric vehicles (EVs), solar panels, and energy storage. Reinforcement learning can provide computationally efficient control that accounts for nonstationary dynamics and model uncertainty in such embodiments.

Illustrative embodiments solve the energy aggregation problem for residential and small commercial buildings. Key to achieving an efficient and sustainable energy systems is the role of grid-interactive efficient buildings (GEB), which not only just consume electricity from the grid, but also provide grid services (and get rewarded) to reduce costs, incorporate renewables, etc. Many residential and commercial buildings are not eligible to participate in many GEB programs individually because their loads are too small. This is where energy aggregators come in, which operate using a business model that involves aggregating a large number of small loads to provide power systems services. The residential energy aggregation market has been long recognized as a major challenge because of the hardware and labor costs required to install building-level and appliance-level load monitoring devices. Some embodiments disclosed herein provide an integrated set of control and system identification methods that are configured to use two pieces of existing smart-home hardware, illustratively smart thermostats and smart electricity meters, to aggregate heat pumps in a totally non-intrusive and highly scalable way. Such embodiments can eliminate the largest obstacles in aggregate residential buildings, but are more generally applicable to other types of energy consuming entities, including larger commercial buildings.

Illustrative embodiments can also determine building thermal parameters using data from smart thermostats and smart electricity meters, which can simplify home energy auditing processes.

Some embodiments are configured to address the unintended negative consequences of smart thermostats. Though smart thermostats do reduce energy consumption on a local level, the current decentralized control method based on setpoint schedules can potentially introduce unintended consequences on the aggregate energy system by creating new or more pronounced peaks in aggregate demand. Illustrative embodiments herein can effectively reduce these peaks in the aggregate demand.

In conventional approaches, smart thermostat companies have many "smart-away" products that are scalable and improve energy efficiency. However, they do not generate detailed building models and do not consider the power consumption data from the smart meter. Their efficiency improvements and grid interactivity potential are limited.

In academia, many research papers have detailed models and can provide high efficiency improvements and grid interactivity, but these models require significant hardware implementation and more data sources and are thus not scalable.

The combination of smart-thermostat and smart electricity meter data utilized in illustrative embodiments provides more efficient modeling and control of heat pumps than conventional arrangements.

As illustrative embodiments can operate using data obtained from just these two devices, product implementations thereof as disclosed herein are scalable, inexpensive, and non-intrusive. No professional is required to visit the home for modeling or hardware installation.

An interpretable building and heat pump model (as opposed to popular black-box models) provides the ability for scalable home energy efficiency auditing through limited hardware. Auditing can be done automatically from a remote location and results can be used to alert the homeowner of any problems (e.g., a notification that a heat pump is performing poorer than expected, HVAC service is recommended, etc.)

The heat pump power model in some embodiments is derived from energy disaggregation, and performs significantly better than existing conventional approaches. Energy disaggregation in some embodiments means that the heat pump power consumption is estimated from the total power consumption from the smart meter, with no need for a heat pump submeter.

While time-of-use electricity rates benefit the energy system, they are rarely adopted because it is difficult for homeowners to control their behavior to benefit from them. However, by disaggregating the heat pump power consumption from other indoor loads, illustrative embodiments herein provide the ability for utilities to offer a dual-rate structure that charges a dynamic electricity price to the automatically controlled heat pump, and a static price to other loads, reducing barriers to adopting time-of-use rates and financially benefiting both utilities and consumers.

The scalability and bi-directional communication provided by these devices gives the ability for centralized control, which can reduce energy costs as well as provide improved grid services such as peak load reduction or demand response. These services are financially beneficial to both consumers and utilities.

In some embodiments, at least one software program comprising one or more algorithms for implementing at least a portion of a heat pump control process is implemented on a smart thermostat with an application programming interface (API). In such embodiments, the software program can be uploaded and interfaced with any smart thermostat.

The control objective can be varied depending upon the particular needs of users or controlling entities. For example, although some embodiments are configured to reduce peak load, other embodiments can additionally or alternatively provide flexibility for demand response, follow any form of a dynamic electricity price, or even have the aggregate power consumption follow some desired control signal from a grid operator (e.g., for load balancing and/or contingency purposes).

Some embodiments are implemented at least in part by smart thermostat providers. For example, the benefits of example control algorithms disclosed herein could entice users to buy the smart thermostat provider's product. These benefits include reduced energy costs, improved thermal comfort, and potential paybacks from the utility for participating in demand response programs.

Additionally or alternatively, some embodiments may be implemented at least in part by a utility company. For example, the utility company can offer a product of the type disclosed herein to encourage energy users to participate in demand response programs or to decrease their peak demand. In return, the consumer has reduced energy bills and the potential for automatic home energy auditing. These services have significant financial benefit for utilities but under conventional approaches it has been difficult for utilities to encourage participation. Illustrative embodiments disclosed herein facilitate such participation for a wide array of energy users, with limited cost and complexity.

It is also possible that illustrative embodiments can be implemented at least in part by a third party that acts as intermediary between the consumer and the utility. For example, Aquanta is a company that provides a domestic water heating product and operates as an intermediary of this type.

Some embodiments are configured to provide scalable identification and remote building auditing.

For example, in such an embodiment, the system includes at least one smart electricity meter, one or more smart thermostats, and at least one heat pump (e.g., a heating system, an air conditioning system, and/or an electric heater). Numerous other arrangements of additional or alternative system components can also be used, possibly including a weather sensor, thermal energy storage, battery energy storage, etc.

In some embodiments, a microprocessor or other type of processor, in a processing device comprising a processor coupled to memory, executes a machine-learning energy disaggregation algorithm to determine heat pump power consumption without the need for submetering. This enables data-driven modeling of the heat pump power consumption without submetering. Moreover, it provides separation of the heat pump from other home loads, so that the non-remote controllable peak load can be analyzed and predicted for control purposes, and/or the remote controllable heat pump can use a time-of-use electricity rate while keeping other indoor loads on a flat electricity rate.

Additionally or alternatively, a processing device comprising a microprocessor configured as disclosed herein can remotely derive a thermal circuit building model that contains parameters representing the amount of heat loss. A central server connected to other smart thermostats can compare these parameters between homes, provide a remote energy audit, and offer recommendations and estimated monetary savings for improved energy efficiency.

In some embodiments, a processing device comprising a microprocessor configured as disclosed herein can remotely derive a heat pump capacity model and combine it with power information from the smart electricity meter and weather data from a remote sensor to remotely audit the heat pump's efficiency. The central server can compare the model between multiple connected thermostats and provide recommendations for service, an indication as to whether the heat pump is oversized or undersized, and/or an indication as to whether or not configuration settings should be changed.

In some embodiments, a processing device comprising a microprocessor configured as disclosed herein can further operate on temperature and solar irradiance information from a weather sensor so as to provide hyper-local weather prediction modeling for control purposes. This sensor can be placed to enable consideration of shading of the home from the sun based on the time of day.

Additional illustrative embodiments provide various types of cloud-based control.

In some embodiments of this type, a central server can use the remotely derived thermodynamic building and heat pump models to use connected thermostats to manage a community of homes or a microgrid to minimize their energy consumption, maintain their thermal comfort, and/or provide one or more additional functionalities, such as limiting their aggregate peak load (both the heat pump and other home loads), providing grid ancillary services like reserves or load balancing, providing demand response services through their thermostats for an electrical utility, and/or minimizing electricity cost based on dynamic electricity prices.

A central server can manage a microgrid of air conditioners, electric heaters or other types of heat pumps to minimize their peak electrical demand and thus the number of generators required to serve them.

A central server can detect power outages when the connected thermostats go offline, and then mitigate load synchronization of air conditioners, electric heaters or other types of heat pumps after the outage is restored.

A central server can recommend setpoint schedule changes to mitigate daily load synchronization based on nearby users' setpoint schedules.

Some embodiments provide privacy preserving, minimal hardware control.

In such an embodiment, a system comprises a programmable logic circuit, a basic thermostat, and a wirelessly connected solar and temperature sensor. It does not require Internet connectivity.

The programmable logic circuit illustratively uses a pre-trained reinforcement learning agent that mimics model predictive control without the need for a central processing unit, large amounts of random access memory (RAM), or cloud connectivity. This reinforcement learning agent implements functionality such as knowledge of the heat pump's efficiency curves to minimize energy consumption, knowledge of the building's thermodynamic model, improved thermal comfort by preheating or precooling the building prior to scheduled setpoint changes, consideration of time-of-use rates to minimize electricity cost, and/or maintaining privacy by avoiding sharing of data. The reinforcement learning agent can then improve its performance and understanding. Additionally or alternatively, if connected to the Internet, the programmable logic circuit can receive signals from an aggregator to provide grid services without sharing of private data.

Other types of reinforcement learning agents, as well as additional or alternative agents not using reinforcement learning techniques, can be used. In some embodiments, such reinforcement learning agents or other types of agents are implemented at least in part utilizing behavioral cloning techniques as disclosed herein, and such agents are also referred to herein as behavioral cloning agents. Reinforcement learning agents in some embodiments more particularly comprise respective hierarchical reinforcement learning agents implemented using hierarchical reinforcement learning techniques, although again other types of agents can be used. Terms such as "agent," "reinforcement learning agent" and "behavioral cloning agent" as used herein are therefore intended to be broadly construed.

Potential additional applications include homes, buildings, or structures in remote locations where Internet connectivity is not guaranteed.

Other embodiments include a backup control system for a cloud-connected thermostat in case the Internet is unreliable.

Still further embodiments can replace the central server's control algorithm with the reinforcement learning agent so as to reduce cloud computational requirements without sacrificing performance.

In illustrative embodiments, a model-based control system comprises at least one processing device comprising a microprocessor or other type of processor, illustratively connected to various smart-home devices that can include solar panels, electric vehicles, solar panels, pool pumps, heat pumps, water heaters, dishwashers, electric heaters, thermal or battery energy storage, a weather sensor, a smart electricity meter, and/or additional or alternative smart-home devices, in any combination.

For example, using only a single electricity meter, a processing device comprising a microprocessor configured as disclosed herein can disaggregate the power consumption of these smart-home devices from the total building power consumption, in order to separately meter them for time-of-use electricity rates, develop data-driven control models, and/or develop behavioral models that can be analyzed and predicted for control.

Such a processing device can use these models in model predictive control or reinforcement learning to enable energy prosumers to optimally control their systems and buy and sell electricity at better rates. Examples include charging an electric vehicle only when solar panels are consuming energy, charging the electric vehicle when the electricity price is low, then using it as a home battery to heat or cool the home when the electricity price is high, and/or coordinating vehicle-to-grid services with heat pump demand response or other grid services.

A processing device comprising a microprocessor as disclosed herein can be connected to a central server to coordinate smart-home control for aggregated energy management, such as peak load reduction, reduction of renewable energy curtailment in microgrids, and/or mitigating load synchronization after a power outage. It is also possible that, during a power outage, a microprocessor can limit the home's peak demand so that it does not exceed the power output of an installed backup battery.

A number of illustrative embodiments will now be described in more detail with reference to FIGS. 1 through 12. It is to be appreciated that these embodiments, like others disclosed herein, are presented by way of illustrative example only, and should not be construed as limiting in any way.

Referring initially to FIG. 1, an information processing system 100 is configured with functionality for scalable control of heat pumps using smart-home devices. The information processing system 100 includes a plurality of energy usage locations 102-1, 102-2, . . . 102-N, collectively denoted as energy usage locations 102. Each such energy usage location comprises a smart meter and a smart thermostat as shown, and one or more heat pumps that are not explicitly shown. The smart meters are illustratively part of advanced metering infrastructure (AMI) of the system 100. The AMI comprising the smart meters is coupled to additional electrical distribution infrastructure 103 that is assumed to be associated with a smart grid or other power grid of an electric utility or other energy service provider.

The electrical distribution infrastructure 103 is further assumed to provide the actual electrical energy to the residences, businesses or other energy usage locations at which respective ones of the smart meters are deployed.

The smart meters and the additional electrical distribution infrastructure 103 are configured to communicate over network 104 with one or more central servers 105 which are illustratively part of a processing platform. The processing platform is assumed to comprise one or more processing devices each comprising a processor coupled to a memory. For example, the processing platform can comprise multiple networked processing devices implemented at least in part utilizing virtual machines or other types of cloud-based virtualization infrastructure. The processing platform can therefore be implemented as a cloud-based processing platform configured to receive energy usage data from the smart meters and thermostat data from the smart thermostats over the network 104. The one or more central servers 105 can comprise, for example, a single server, multiple servers on a single processing platform, and/or different servers on two or more different processing platforms.

The network 104 can comprise, for example, a global computer network such as the Internet, a wide area network (WAN), a local area network (LAN), a satellite network, a telephone or cable network, a cellular network such as a 3G, 4G or 5G network, a wireless network implemented using a wireless protocol such as Bluetooth, WiFi or WiMAX, or various portions or combinations of these and other types of communication networks. Accordingly, references herein to a network such as network 104 are intended to be broadly construed so as to encompass arrangements involving a single network as well as arrangements involving multiple networks of potentially different types.

Although each smart meter and each smart thermostat are illustratively associated with a corresponding one of a plurality of energy usage locations, it is to be appreciated that a given energy usage location can include multiple smart meters and/or multiple smart thermostats. The smart meters and/or smart thermostats are illustratively configured to operate as respective clients relative to the one or more central servers 105.

The one or more central servers 105 in the present embodiment comprise a data collection module 110, a machine learning (ML) based power consumption disaggregation algorithm 112, a model configuration module 114, and a model predictive control (MPC) module 116.

Also coupled to the network 104 are user devices 118, which may comprise, for example, a laptop computer, tablet computer or desktop personal computer, a mobile telephone, or another type of computer or communication device, as well as combinations of multiple such processing devices. Such user devices 118 provide interfaces through which various users can interact with the system 100.

In operation, the one or more central servers 105 obtain energy usage data generated by the smart meter of a particular energy usage location that includes a heat pump, obtain thermostat data from a corresponding one of the smart thermostats characterizing operation of the heat pump, apply a power consumption disaggregation algorithm to the energy usage data and the thermostat data to disaggregate power consumption of the heat pump from other power consumption of the particular energy usage location, and execute an MPC process utilizing the disaggregated heat pump power consumption. Similar operations may be performed for each of the other energy usage locations 102.

At least one automated action relating to the heat pump is initiated in the system 100 based at least in part on one or more outputs of the MPC process.

An MPC process in some embodiments uses one or more models to make predictions about future outputs of a controlled system. For example, it illustratively solves an optimization problem at each of a plurality of time steps to determine an optimal control action that drives the predicted output to a desired reference as closely as possible. Other types of control processes can be used in other embodiments.

In some embodiments, the power consumption disaggregation algorithm implements supervised learning utilizing random forest regression, although it is to be appreciated that other supervised or unsupervised learning techniques may be used.

Additionally or alternatively, executing an MPC process utilizing the disaggregated heat pump power consumption comprises executing the MPC process utilizing at least one control model including at least one of a heat pump model and a building model. The heat pump model in some embodiments comprises a linear autoregressive model trained using the disaggregated heat pump power consumption, although other types of models can be used.

In some embodiments, initiating at least one automated action relating to the heat pump based at least in part on one or more outputs of the MPC process comprises generating at least one control signal for controlling one or more characteristics of the heat pump based at least in part on one or more outputs of the MPC process.

As another example, initiating at least one automated action relating to the heat pump based at least in part on one or more outputs of the MPC process comprises generating at least one display signal, providing at least one of a notification and a recommendation relating to the heat pump, for presentation on a display device, such as a display associated with a particular one of the user devices 118.

As a further example, initiating at least one automated action relating to the heat pump based at least in part on one or more outputs of the MPC process comprises performing a comparison of operation of the heat pump to operation of other heat pumps associated with respective other energy usage locations.

As yet another example, initiating at least one automated action relating to the heat pump based at least in part on one or more outputs of the MPC process comprises establishing one or more load limitations for the heat pump.

As a still further example, initiating at least one automated action relating to the heat pump based at least in part on one or more outputs of the MPC process comprises performing at least one aggregated management operation to control one or more characteristics of the heat pump and one or more other heat pumps associated with respective other energy usage locations.

Numerous other types of automated actions may be initiated based at least in part on outputs of the MPC process in other embodiments.

Each of the smart meters, smart thermostats, central servers 105 and user devices 118 may be viewed as an example of what is more generally referred to herein as a processing device comprising a processor coupled to a memory. The processor illustratively comprises a microprocessor and/or programmable logic circuit of the type referred to elsewhere herein, or other types of processing circuitry, in any combination. Illustrative embodiments disclosed herein implement heat pump control and related functionality utilizing one or more such processing devices.

Additional or alternative types of processing devices that can be used in illustrative embodiments herein include IoT devices, illustratively arranged in one or more IoT networks, where IoT denotes Internet-of-Things. Various other processing devices described elsewhere herein can be implemented as or comprise one or more IoT devices. Smart-home controllers and other types of building controllers are other examples of "processing devices" as that term is broadly used herein.

In some embodiments, a processing device comprises a processor, a memory and a network interface. The processor is assumed to be operatively coupled to the memory and to the network interface.

The processor may comprise, for example, a microprocessor, an application-specific integrated circuit (ASIC), a field-programmable gate array (FPGA) or other programmable logic circuit, a central processing unit (CPU), a tensor processing unit (TPU), a graphics processing unit (GPU), an arithmetic logic unit (ALU), a digital signal processor (DSP), or other similar processing device component, as well as other types and arrangements of processing circuitry, in any combination. At least a portion of the functionality of one or more heat pump related algorithms provided by one or more processing devices as disclosed herein can be implemented using such circuitry.

In some embodiments, such as one or more embodiments in which heat pump control is implemented primarily in central servers 105, the processor comprises one or more graphics processor integrated circuits. Such graphics processor integrated circuits are illustratively implemented in the form of one or more GPUs. Accordingly, in some embodiments, system 100 is configured to include a GPU-based processing platform, illustratively implemented in the cloud. For example, such a GPU-based processing platform can be cloud-based configured to implement one or more heat pump related algorithms for processing data associated with a large number of system users. Other embodiments can be implemented using similar arrangements of one or more TPUs.

Numerous other arrangements are possible. For example, in some embodiments, one or more heat pump related algorithms can be implemented on a single processor-based device, such as a smart thermostat, smart meter, smart-home controller or other smart-home device, utilizing one or more processors of that device. Such embodiments illustratively provide "on-device" implementations of heat pump related algorithms.

The memory stores software program code for execution by the processor in implementing portions of the functionality of the processing device. For example, at least portions of the functionality of the data collection module 110, ML-based power consumption disaggregation algorithm 112, model configuration module 114 and/or MPC module 116 can be implemented using program code stored in memory.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, illustrative embodiments may be implemented in the form of integrated circuits comprising processing circuitry configured to implement processing operations associated with one or more heat pump related algorithms of system 100 as well as other related functionality. For example, at least a portion of the ML functionality of system 100 is illustratively implemented in at least one ML integrated circuit or other type of integrated circuit of at least one processing device.

The network interface is configured to allow the processing device to communicate over one or more networks with other system elements, and may comprise one or more conventional transceivers.

It is to be appreciated that the particular arrangement of components and other system elements shown in FIG. 1 is presented by way of illustrative example only, and numerous alternative embodiments are possible. For example, other embodiments of information processing systems can be configured to implement heat pump related algorithm functionality of the type disclosed herein.

Figure 2:
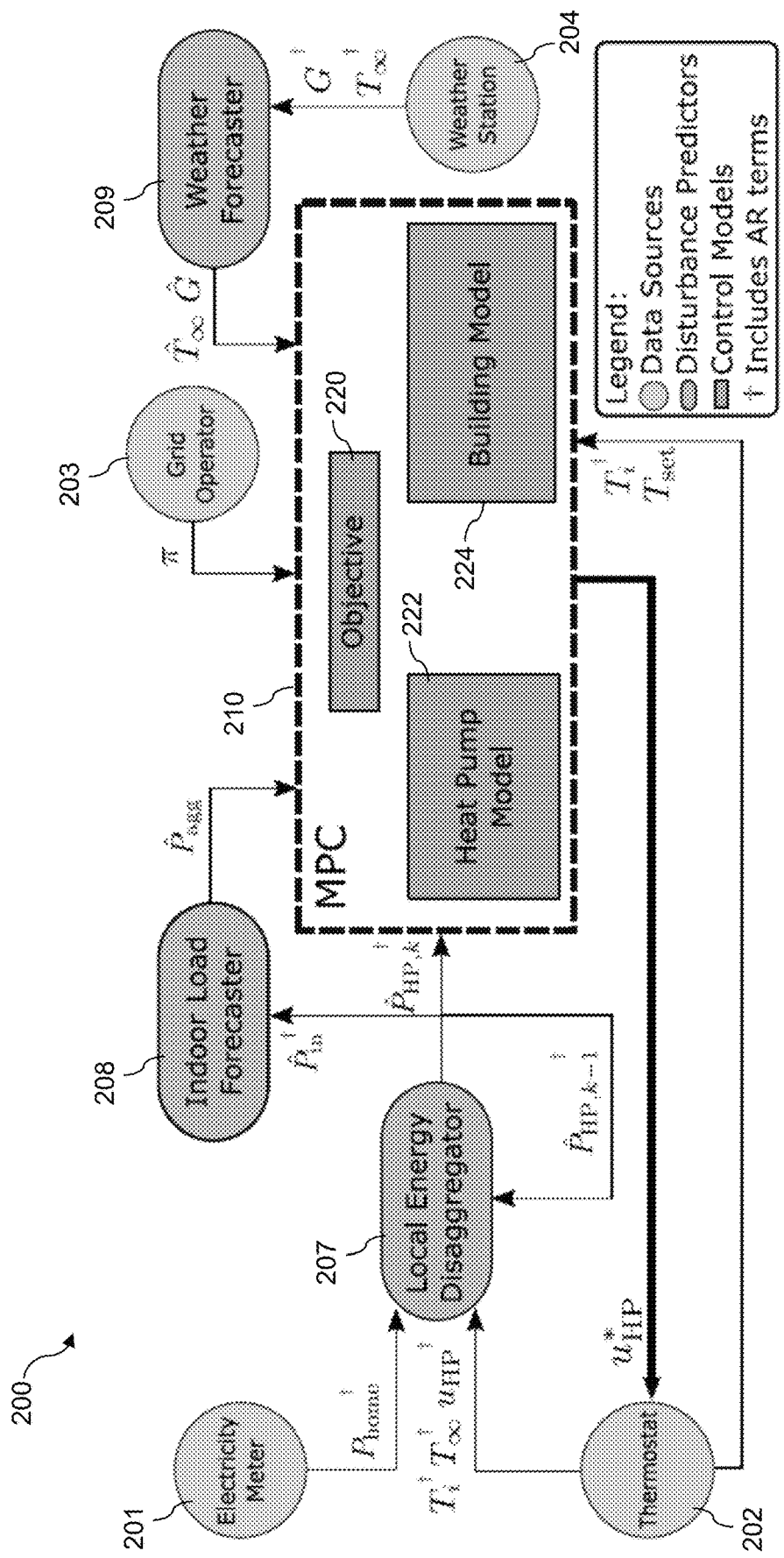
FIG. 2 illustrates the operation of a heat pump control system for a given energy usage location in an illustrative embodiment.

FIG. 2 illustrates a more detailed example of the operation of a heat pump control system 200 for a given energy usage location of system 100 in an illustrative embodiment. Inputs are received in this embodiment from a plurality of data sources, including an electricity meter 201, illustratively implemented as a smart meter, and a thermostat 202, illustratively implemented as a smart thermostat, both associated with a particular one of the energy usage locations 102. Additional data sources include a grid operator 203 and a weather station 204. For example, inputs from the grid operator 203 and the weather station 204 may be received from corresponding servers or other devices over one or more networks. The heat pump control system 200 in this embodiment more particularly comprises disturbance predictors that include a local energy disaggregator 207, an indoor load forecaster 208 and a weather forecaster 209, and an MPC module 210 that includes an objective 220, a heat pump model 222 and a building model 224. It is to be appreciated that a wide variety of different arrangements of additional or alternative components can be used in other heat pump control systems in other embodiments. Additional details regarding the operation of the FIG. 2 embodiment are provided elsewhere herein.

Figure 3:
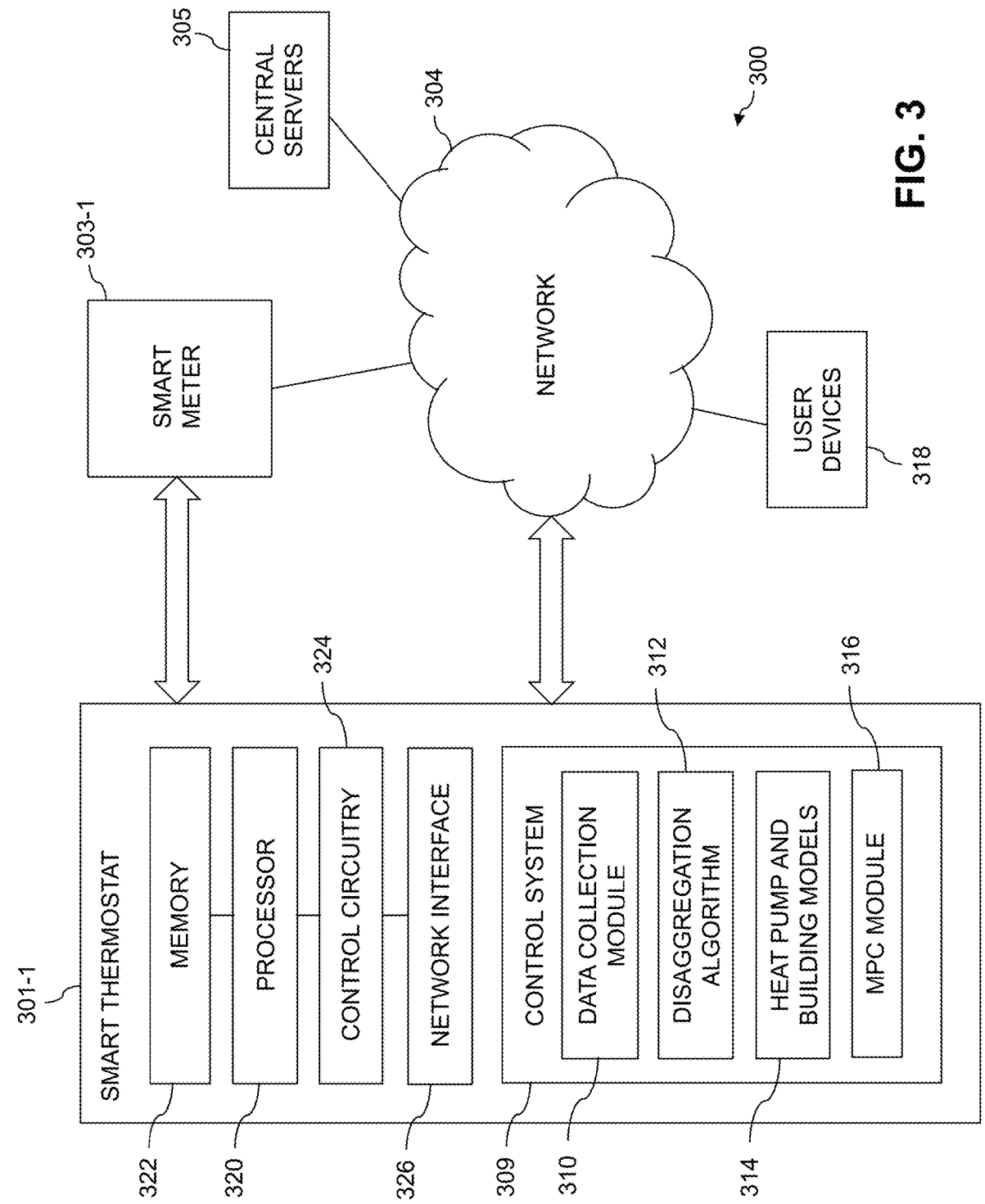
FIG. 3 is a block diagram showing another example of a system implementing scalable control of a heat pump in an illustrative embodiment.

FIG. 3 shows another example of a system 300 implementing scalable control of a heat pump in an illustrative embodiment. In this embodiment, the heat pump control system is implemented primarily in a smart thermostat 301-1, rather than primarily in the one or more central servers 105 of the FIG. 1 embodiment.

The smart thermostat 301-1 is coupled to a smart meter 303-1. Both the smart thermostat 301-1 and the smart meter 303-1 are also coupled to network 304. The smart thermostat 301-1 is implemented at a particular energy usage location and coupled to the smart meter 303-1 at that location. The network 304 provides access to one or more central servers 305.

The smart thermostat 301-1 in this embodiment comprises a control system 309 that includes a data collection module 310, a disaggregation algorithm 312, heat pump and building models 314, and an MPC module 316, all configured to operate in a manner similar to that previously described above in conjunction with corresponding components 110, 112, 114 and 116 of the one or more central servers 105 in the FIG. 1 embodiment. For example, outputs generated by the MPC module 316 can directly control one or more heat pumps of the system 300 so as to meet one or more specified objectives within the system 300. These and other similar modules referred to herein can be implemented at least in part in the form of software, although hardware and firmware can additionally or alternatively be used to implement such components of the control system 309.

The smart thermostat 301-1 also provides an interface accessible over the network 304 to user devices 318. For example, such an interface illustratively allows a user associated with one or more of the user devices 318 to check the current state of the smart thermostat 301-1 and to adjust one or more parameters for controlling energy usage at the particular energy usage location, possibly based at least in part on notifications and/or recommendations generated by the MPC module 316.

The smart thermostat 301-1 further comprises a processor 320, a memory 322, control circuitry 324 and a network interface 326. The processor 320, memory 322 and network interface 326 are generally configured in a manner similar to that of corresponding components described elsewhere herein. The control circuitry 324 illustratively comprises switches, setpoint circuits and other types of circuitry that can be driven at least in part by outputs generated by the MPC module 316, in conjunction with controlling operation of a heat pump. Such circuitry can include otherwise conventional circuitry for controlling various parameters of HVAC systems or other types of heat pumps deployed at the particular energy usage location.

Other embodiments can implement the heat pump control system primarily in a smart meter, smart-home controller or other type of smart-home device, or in a combination of multiple such smart-home devices at the particular energy usage location.

It is also possible to implement aspects of illustrative embodiments in a different type of programmable thermostat, such as a digital thermostat, rather than in a smart thermostat with network connectivity.

Referring again to FIG. 2, the heat pump control system 200 illustrates implements aspects of a methodology for data-driven identification of a residence's heat pump and building thermodynamic models assuming that each residence is equipped with at least one smart thermostat and one smart electricity meter. Data measured by the thermostat 202 include indoor air temperature and relative humidity, thermostat setpoint, Boolean occupancy, and heat pump runtime in seconds. The electricity meter 201 provides whole-home power, which includes the contributions from both the heat pump power $P_{HP}$ and the other miscellaneous power consumption from the occupant that is defined as indoor loads $P_{in}$. While some weather data, such as outdoor temperature, can be provided through the thermostat 202, other weather data such as solar irradiation and humidity can be readily acquired from a nearby weather station, such as weather station 204, or an associated forecasting service such as weather forecaster 209. While this example system 200 is analyzed herein in the context of heating, the disclosed techniques can be equally applied to cooling as well.

Some embodiments were tested using data from an occupied residential building representative of a majority of heat pump-heated US homes. The residence, located in Ithaca, NY, is a well insulated 130 m² building heated by a single-stage air to air split system heat pump (model number TH4B2421SA). A single Ecobee4 smart thermostat controls the heat pump and records data every 5 minutes. The thermostat is set to its default setpoint settings, with a setpoint of 21° C. during the "home" mode from 6:30 am to 11:30 μm, and a setpoint of 18° C. during "sleep" mode from 11:30 μm to 6:30 am. Additionally, the thermostat will periodically set back the setpoint when no occupancy is detected for a certain amount of time. The heat pump, air handler, and total building power consumption are all measured through current transformers located in the circuit panel. Weather data, including temperature, solar irradiation, dewpoint, wind speed, and pressure, were obtained from the NREL National Solar Radiation Database. Data were collected for this building for the entire month of November 2019, resulting in 7000 5-minute timesteps.

Illustrative embodiments implement heat pump power modeling using energy disaggregation, as will now be described in more detail. These techniques are utilized to configure at least portions of the heat pump model 222 in MPC module 210.

Many heat pump control studies model heat pump power and performance either through steady-state physics-based models or from manufacturer's lab data. Instead, some embodiments disclosed herein utilize a purely data-driven approach due to various effects that arise in real-world operation that cause significant deviations from these assumptions. First, the heat pump has a warm-up time, taking up to 10 minutes to reach its steady-state power after being turned on. Second, there can be a significant control delay of up to two minutes between the thermostat calling for heat and the heat pump actually switching on, due to varying internal heat pump or thermostat control mechanisms. Combined, these two factors can cause the average power over a timestep where the heat pump is turning on to be significantly lower than the steady-state models predict. In addition, due to installation differences in the field, the actual efficiency and power can vary widely from the manufacturer lab data. Because of these issues, some embodiments use an autoregressive (AR) data-driven model that can provide a more accurate power prediction by taking into account the combined effects of control delays, warm-up times, and differences between field and lab operation.

One limitation preventing deployment of this type of data-driven AR approach under conventional practice has been the requirement to submeter the heat pump's electrical consumption in order to obtain training data, which can be costly and require a professional to install. Illustrative embodiments disclosed herein solve this problem by using energy disaggregation to predict the heat pump power profile based on the whole-home power profile measured by the smart electricity meter, eliminating the need for a heat pump submeter in field operation. Energy disaggregation, sometimes called non-intrusive load monitoring, is a method for estimating device-level (disaggregated) power consumption based on the whole-home (aggregate) power profile, and includes, for example, load classification and signal decomposition. Load classification is used to determine which devices are on at any point in time and is accomplished using methods like event detection and hidden Markov models. Signal decomposition aims to separate the individual power signals from each device from the whole-home power signal, and methods for this task include sparse coding, change detection, and Sum-to-k constrained Non-negative Matrix Factorization. Because these approaches attempt the relatively difficult task of estimating power information for many different devices based on the whole-home power signature, they often require significant amounts of training data and complex models. In contrast, approaches disclosed herein utilize the heat pump control data provided by the smart thermostat, which provides implicit load classification information and significantly simplifies the signal decomposition task.

Some embodiments use random forest regression to accomplish the disaggregation. Random forest is a supervised learning technique that creates an ensemble of different decision trees and outputs the mean of each decision tree's individual prediction. By taking the mean of each tree's output, random forest combats the overfitting that commonly occurs in individual decision trees. It was found that utilization of random forest regression in some embodiments outperforms other supervised learning regression methods for this task due to its ability to efficiently incorporate the load classification information available from the control signal into its decision trees.

As shown in FIG. 2, input features of the local energy disaggregator 207 include (1) the model's output for the previous timestep $\hat{P}_{HP,k-1}$, (2) the heat pump control signal $u_{HP}$, (3) the whole-home power $P_{home}$, (4) indoor temperature $T_i$, and (5) outdoor temperature $T_\infty$, each of which contain AR terms from the previous timestep. The output is the disaggregated heat pump power $\hat{P}_{HP,k}$ for the current timestep. A prediction of other indoor loads $\hat{P}_{in}$ can then be found by subtracting the heat pump power from the total power at that timestep. The training process was carried out using 6000 datapoints, with 500 datapoints used for five-fold cross-validation to determine the optimal hyperparameters using the Sci-kit Learn Python package. The remaining samples were used for testing. Disaggregation test performance for an illustrative embodiment indicated a final test RMSE at 0.037 kW, equivalent to around 2% of the steady-state heat pump power.

The disaggregated heat pump power is then utilized to train a linear AR model of the heat pump power that can be used in linear MPC. In this case, linear regression determines the optimal coefficients θ to minimize the residual sum of squares between the predicted heat pump power $\hat{P}_{HP,k}$ and the actual power $P_{HP,k}$ at the current timestep k. While the disaggregated power is used as labels for training the model, test performance is evaluated based on the difference between the prediction and the submeter-measured heat pump power. The input features $x_k$ include the percentage of time the thermostat was calling for heat over the timestep $U_{HP,k}$, indoor temperature $T_i$ and outdoor temperature $T_\infty$. To capture the effects of warm-up time and control delays, AR terms $x_{k-1}$ to $x_{k-p}$ and $P_{HP,k-1}$ to $P_{HP,k-p}$ are also included, where p is the number of AR timesteps. This model is given as:

$$\min_\theta \sum_{k+p}^{K} (P_{HP,k} - \hat{P}_{HP,k})^2 \quad (1)$$

subject to $$\hat{P}_{HP,k} = \theta_x \begin{bmatrix} x_k \\ x_{k-1} \\ \cdots \\ x_{k-p} \end{bmatrix} + \theta_P \begin{bmatrix} P_{HP,k-1} \\ \cdots \\ P_{HP,k-p} \end{bmatrix}$$

The 7000 timesteps of data samples were divided into 6000 timesteps for training, and 500 timesteps each for validation and testing. Since the heat pump's duty cycle changes based on the heat load, the data is divided into four hour segments and shuffled such that the training, validation, and test sets contain the same distribution of heat pump operation. Five-fold cross validation is used to determine that one AR term is sufficient to capture the transient effects.

The improvements provided by this data-driven AR model are demonstrated by comparing it to the more conventional steady-state (SS) models (no AR terms) where parameters are based on field experimental data and where parameters are determined from the manufacturer performance data. The model prediction results were determined for the data-driven AR model, the field data-driven SS model, and the SS model derived from the manufacturer performance data using the disaggregated heat pump power as training labels. It was found that in this case disaggregation does not significantly affect model performance. The disaggregation test error tends to follow a Gaussian distribution, and therefore over many datapoints, the Gaussian noise introduced by the disaggregation into the heat pump power training labels does not adversely affect the resulting heat pump power model. If the disaggregation test error had more significant bias, such as consistent over- or underpredicting, then the heat pump model trained on disaggregated data would be negatively affected. The large difference between the manufacturer data-based model and the field data-based models is likely due to field installation settings that differ from the performance datasheet, underscoring the need for field-data based models that can capture this variability.

Aspects of building model identification in illustrative embodiments will now be described in more detail. These techniques are utilized to configure at least portions of the building model 224 in MPC module 210.

Again, due to the scalability and accessibility of data-driven methods, data is used to determine the building model. While reduced-order white-box building models based on building construction perform well in control, they often require detailed simulation models in software like EnergyPlus, severely limiting their potential for scalability. In contrast, black-box models contain no explicit knowledge of the underlying thermodynamic equations or building construction, but instead infer the temperature dynamics entirely through data. Linear autoregressive models, which include linear combinations of features from previous timesteps, have been used to model both energy consumption and indoor temperature. More complex machine learning techniques such as random forest and neural networks can produce even more accurate models. Common input features to these models include indoor and outdoor temperature, wind speed, solar radiation, occupancy, and internal electrical loads. However, black-box models are at serious risk of overfitting if the training data are not sufficiently diverse.

Buildings often have either periodic or stagnant setpoint schedules which can cause insufficient system excitation leading to overfitting. If data is insufficient and model input features are not carefully engineered, the model could learn the setpoint schedule and closed-loop control dynamics, rather than the temperature's response to control inputs. For example, the model can predict the indoor temperature to oscillate between 20° C. and 21° C. during the daytime, regardless of weather conditions or heat pump input, since this is what occurs throughout the entire training dataset. Moreover, this overfitting is not immediately apparent when used on test data from the same distribution, as the control algorithm and setpoint schedule can remain the same, and the model is not asked to generalize to other potential control methods like MPC.

Conventional approaches attempt to remedy this issue through pseudorandom control inputs over a variety of weather conditions. This is easily done in simulation studies, where buildings can be subjected to any condition to generate training data. For real buildings, this method is considerably more difficult due to occupant comfort requirements and uncontrollable weather patterns. One approach generates sufficient training data by implementing an identification period during the weekend for an experimental unoccupied commercial building in spring and summer. While this process is technically feasible for residential buildings when residents are not home, giving up control of their heating or cooling system for long enough to generate a sufficient amount of training data may not be ideal for many people. A more recently applied method to prevent overfitting is through transfer learning using neural networks. This method uses a different simulated building to generate enough training data to learn the underlying thermodynamics, requiring significantly less data from the building to be modeled. However, neural networks are nonlinear and nonconvex, making them extremely difficult to implement in MPC.

In order to address these and other issues, some embodiments herein implement a grey-box modeling approach that uses data to fit parameters for a linear reduced-order physics-based model to reduce the amount and diversity of training data needed. For buildings, the physical model almost always takes the form of a thermal circuit involving resistors and capacitors (known as RC network models), and can range from single order 1R1C (1 resistor, 1 capacitor) models for small, lightweight buildings, to higher-order models with dozens of resistors and capacitors in large multi-zone buildings.

Determining optimal parameters is a nonconvex, nonlinear optimization problem, making the globally optimal solution difficult to obtain. To circumvent this issue, some studies attempt to find globally optimal solutions using metaheuristic optimization techniques like genetic algorithms and particle swarm optimization. Others use Latin hypercube sampling to generate many initial guesses for convex optimization software to search for global minima. However, finding a globally optimal solution is highly dependent on the chosen bounds and initial guesses. Without a priori knowledge of the building construction, guessing tight bounds without excluding the optimal solution can be challenging.

Another difficulty is that data typically must be collected from sensors that capture enough of the building's state to fit the chosen order of the model. Typical RC modeling studies have extensive knowledge of floor plans, temperatures, and heat gains throughout the building. Installing these sensors can be confusing, costly, and intrusive, though, reducing the scalability potential. For higher-order models, a large number of data sources and system excitation are typically required to prevent over-fitting and subsequent control performance degradation. Therefore, it is important to choose a model that is sufficiently complex to capture the building's dynamics while still considering the limitations based on the amount of data sources and system excitation available.

Finally, when identifying models for use in some embodiments of MPC, it is beneficial to determine the optimal system parameters based on multi-step prediction rather than on next-step prediction and recursively predicting future timesteps. For systems with low state excitation, such as building thermodynamics, next step prediction can produce models that perform unrealistically well on test data. For example, if the temperature does not change much between timesteps, even a persistence model can perform remarkably well when only tested on its next-step prediction. In order to capture the evolution of the thermodynamics for MPC, the multi-step prediction horizon should be on the same order as the MPC horizon.

While there has already been a significant amount of research into various RC model types and the algorithms used to determine optimal thermal parameters, illustrative embodiments disclosed herein provide a method that can successfully combat overfitting when using only the limited data available from a thermostat, an electricity meter, and a nearby weather station, such as, for example: (1) indoor temperature, (2) outdoor temperature, (3) disaggregated heat pump power, (4) disaggregated indoor power, and (5) solar irradiation. Instead of using an identification period, some embodiments use the system excitation inherently provided by the occupant's own thermostat setpoint schedule, which may allow the temperature to drift during night or when the occupant is away. Additionally, an iterative bound tightening (IBT) algorithm is used in combination with convex optimization software to find an optimal solution consistent with expected model error from sensor uncertainty. Further description herein illustrates the discrepancy between next-step and multi-step prediction and compares the generalization performance of example models of illustrative embodiments to common black-box modeling techniques.

Figure 4:
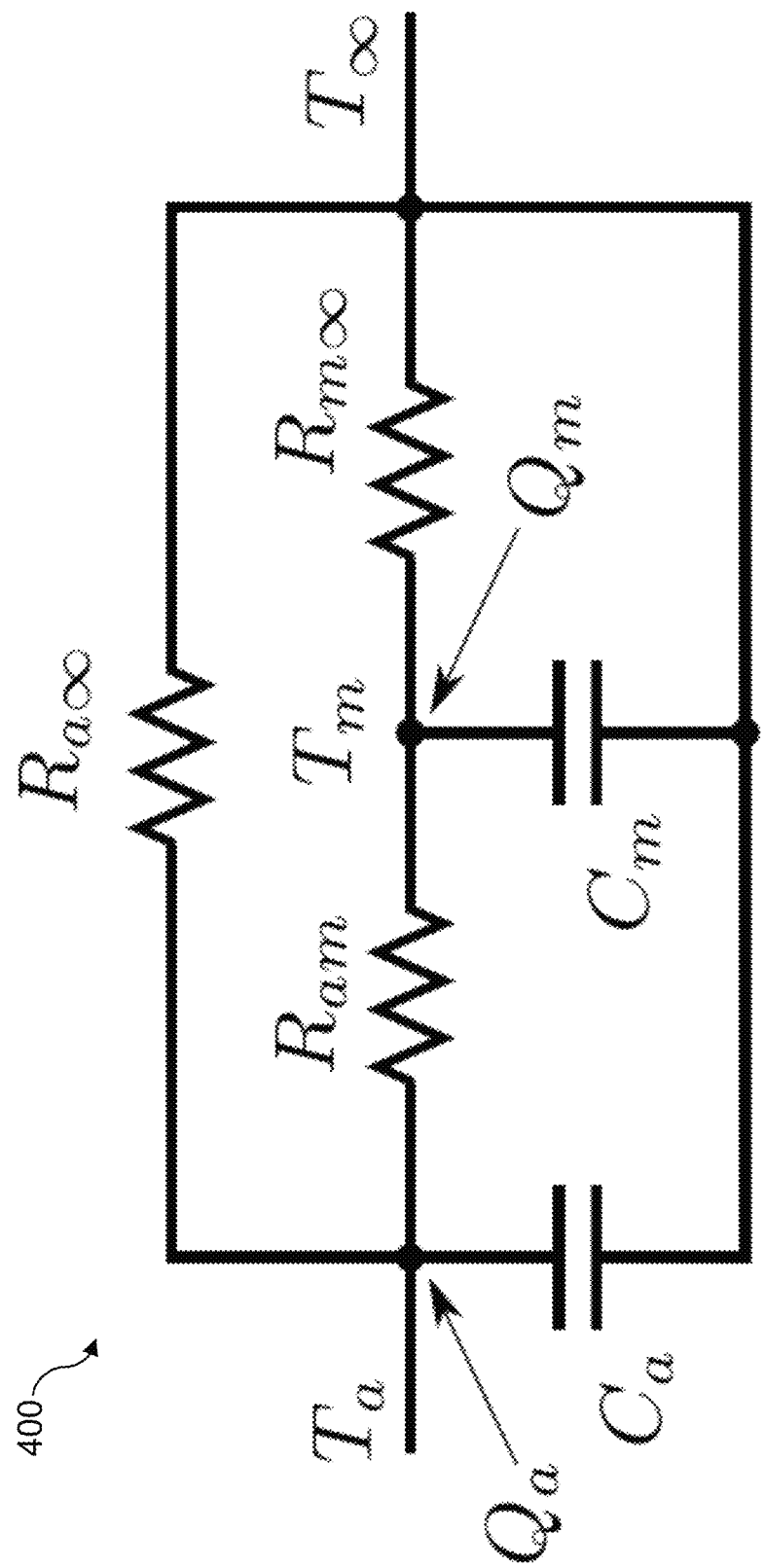
FIG. 4 shows an example thermal circuit representing a building model utilized in a model predictive control (MPC) module of a heat pump control system in an illustrative embodiment.

Referring now to FIG. 4, an example thermal circuit 400 representing one possible implementation of building model 224 in MPC module 210 is shown.

The thermal circuit 400 more particularly comprises a three resistor two capacitor (3R2C) thermal circuit representing a grey-box building model, in which the subscript a represents the indoor air and other low thermal capacitance materials, the subscript m represents the building's mass, and the subscript ∞ represents the outdoor air.

This example two-state model models the temperature of the indoor air (including any other low thermal capacitance material) and building mass as separate states since the thermal capacitance of the building's mass is often much higher than that of the indoor air. This model is represented by, $$C_a \dot{T}_a(t) = \frac{T_\infty - T_a(t)}{R_{a\infty}} + \frac{T_m(t) - T_a(t)}{R_{am}} + Q_a \quad (2)$$

$$C_m \dot{T}_m(t) = \frac{T_\infty - T_m(t)}{R_{m\infty}} + \frac{T_a(t) - T_m(t)}{R_{am}} + Q_m$$

As indicated above, the subscript a refers to the indoor air, the subscript m refers to the building mass, and the subscript ∞ refers to the outside air. $R_{ij}(°C./kW)$ refers to the thermal resistance between elements i and j, and $C_i(kJ/°C.)$ is the thermal capacitance of element i. The sources of external heat gain for the indoor air node $Q_a$ (kW) involve the heat from the heat pump (which blows hot air into the indoors), heat from internal gains (which can be estimated from internal power consumption), and any heat coming from solar radiation (which enters through windows). In contrast, the additional heat gains to the building's mass only include the solar irradiation. These gains can therefore be defined as, $$Q_a = Q_{HP,a} + \eta Q_{e,a} + \alpha_a G, \quad Q_m = \alpha_m G \quad (3)$$

where the superscript e refers to heat from internal gains and η is the fraction of indoor power consumption that results in heat gains. Here, $G(kW/m^2)$ is the solar radiation and α $(m^2)$ is the solar absorption factor, or the fraction of solar energy absorbed as heat. While the heat transfer from a heat pump can often be modeled using manufacturer performance data, for similar reasons to those described previously, the heat pump does not always perform the same in the field as it does in the lab. Therefore, it is assumed in some embodiments that the heat pump coefficient of performance (COP) can be approximately modeled as linearly dependent on the difference between indoor and outdoor air temperature, and optimal model parameters $β_i$ are then determined. This model gives the heat output $Q_{HP,a}$ as, $$Q_{HP,a} = (\beta_1(T_\infty - T_a) + \beta_2)P_{HP} \quad (4)$$

where $P_{HP}$ is the disaggregated power of the heat pump.

In order to formulate a complete model for use in control, it is useful to convert Equations (2) through (3) from continuous time into a first-order Euler discrete-time state space model of the form, $$x_{k+1} = Ax_k + B_k u_k + Cw_k, \quad (5)$$

where, $$x = \begin{bmatrix} T_{a,k} \\ T_{m,k} \end{bmatrix}, u_k = [P_{HP,k}], w_k = \begin{bmatrix} T_{\infty,k} \\ Q_{e,k} \\ G_k \end{bmatrix}$$

$$A = \begin{bmatrix} 1 - \frac{\Delta t}{C_a}\left(\frac{1}{R_{a\infty}} + \frac{1}{R_{am}}\right) & \frac{\Delta t}{C_a R_{am}} \\ \frac{\Delta t}{C_m R_{am}} & 1 - \frac{\Delta t}{C_m}\left(\frac{1}{R_{m\infty}} + \frac{1}{R_{am}}\right) \end{bmatrix} \quad (6)$$

$$B_k = \begin{bmatrix} \frac{\Delta t}{C_a}(\beta_1(T_{\infty,k} - T_{set,k}) + \beta_2) \\ 0 \end{bmatrix}$$

$$C = \begin{bmatrix} \frac{1}{R_{a\infty}C_a} & \frac{\eta \Delta t}{C_a} & \frac{\alpha_a \Delta t}{C_a} \end{bmatrix}$$

Here, k represents the timestep and ranges from 0 to the number of training samples K. Since the difference between the predefined setpoint $T_{set,k}$ and $T_{a,k}$ is typically very small, $T_{set,k}$ is used as a proxy for $T_{a,k}$ to prevent nonlinearity in the control model that results from multiplication of control and state variables.

In contrast to convention techniques which identify the consolidated entries of the state-space matrix, illustrative embodiments disclosed herein determine the actual thermal parameters of the model. Finding the individual thermal parameters instead of the matrix entries provides the model with both interpretability and the ability to add physically intuitive constraints on the thermal parameters, such as non-negativity.

These thermodynamic equations can be combined into a nonlinear, nonconvex constrained optimization problem that minimizes the sum of the squared errors between the actual indoor temperature $T_a^k$ and the predicted indoor temperature $\hat{T}_a^k$, $$\min_J \sum_{k=0}^{K} \left(\hat{T}_a^k - T_a^k\right)^2 \quad (7a)$$

subject to $$x_{k+1} = Ax_k + B_k u_k + Cw_k \ \forall \ k \in K \quad (7b)$$

$$\underline{b}^i \leq J_i \leq \overline{b}^i \ \forall \ i \in J \quad (7c)$$

$$\hat{T}_a^0 = \hat{T}_m^0 = T_a^0 \quad (7d)$$

$$\hat{T}_a^{im} = T_a^{im} \ \forall \ i \in \{1. \ .K/m\} \quad (7e)$$

In Equation (7c), conservative upper and lower constraints are added on the variable bounds, denoted as $\underline{b}^i$ and $\overline{b}^i$ and indexed over the set of decision variables J, shown in Table 1 below. In Equation (7d), it is assumed that the initial predicted mass and air temperature are equal to the initial air temperature, but only errors from after the first 100 timesteps are considered to eliminate the effects of initial condition assumptions. Equation (7e) imposes the multi-step prediction constraint, namely, that knowledge of the true temperature is only given every m timesteps.

TABLE 1

Example Optimization Parameters Used
for Determining Model Parameters

| | Parameter Value | | |
|---|---|---|---|
| Decision Variable Bounds | Lower | Upper | Units |
| $R_{am}, R_{a\infty}, R_{n\infty}$ | 0 | 40 | ° C./kW |
| $C_a, C_m$ | 0 | 1e5 | kW/° C. |
| $C_m$ | 0 | 5e5 | kW/° C. |
| $a_a, a_m$ | 0 | 5 | m² |
| $\hat{T}_a, \hat{T}_m$ | 10 | 35 | ° C. |
| $\beta_1$ | −.5 | 0 | 1/° C. |
| $\beta_2$ | 1 | 5 | |
| η | 0 | 2 | |
| Prediction Horizon m | | 48 | |

FIG. 5 shows example pseudocode for an IBT algorithm utilized in MPC module 210 of heat pump control system 200 in an illustrative embodiment. This IBT algorithm is denoted in the figure as Algorithm 1.

While nonconvex optimization solvers such as SCIP, Couenne, and Baron can use additional heuristic methods and spatial branch and bound to search for global optimal solutions, these solvers are unable to converge to an optimal solution due to the problem size (approximately 30,000 constraints for 5000 data samples). In contrast, the convex optimization solver Ipopt can quickly find a locally optimal solution, but there is no guarantee that it can find the global optimum. In fact, Ipopt consistently converges to a local minimum where either $R_{am}$ or $R_{a\infty}$ are set to their upper bound, somewhat regardless of the initial guess and how high the upper bounds are set. This phenomenon turns out to be very similar to how black-box methods overfit on this data, in that since the indoor temperature remains relatively constant for much of the time, a good solution can be found by putting an unrealistically high weight on the previous indoor temperature (equivalent to very high resistance values in the thermal circuit model).

To prevent this overfitting, illustrative embodiments utilize the example IBT algorithm shown in FIG. 5. This example IBT algorithm tightens each active upper bound until the model performance on validation data aligns with the expected lower bound on model error, which is derived from thermostat sensor uncertainty, in a manner analogous to hyperparameter tuning in machine learning algorithms. In essence, iterative bound tightening performs an efficient grid search of the optimal bounds, or hyperparameters, that provide good training performance and prevent overfitting. In addition, since the problem starts with new random initial points over a reduced search space on each iteration, the chance that the solver finds a global minimum is increased.

Results of implementing the IBT algorithm of FIG. 5 on experimental data indicate that increasingly higher bounds on $R_{a\infty}$ and $R_{m\infty}$ cause the building model to plateau at the same RMSE on training data. However, when tested on validation data, the RMSE consistently increases at higher upper bounds, indicating overfitting. The final parameter bounds were taken from the model that gave the lowest validation data error. Using these optimal bounds, the model was trained on both the validation and training data and then tested on test data to present the final IBT model error.

In order to demonstrate the performance of the IBT multi-step prediction model, it was compared to other modeling methods, including regression (LR), random forest (RF) regression, and artificial neural network (ANN). Each of these black-box models use the same input data as the IBT model but also include autoregressive terms. In this comparison, the performance of each of the models over the MPC horizon was determined on test data when trained for next-step prediction and multi-step prediction. Next-step prediction models were therefore used recursively, where the predicted output at each timestep becomes part of the input for the next timestep's prediction.

For each method, training the model to minimize the error over the entire control horizon introduces significantly lower error into the MPC compared to minimizing the next step error and predicting each next step recursively. However, model error does not tell the entire story. While the LR multi-step model provides the lowest error on test data, further analysis of the model coefficients shows that this black-box method disproportionately weights the previous timestep's temperature and gives very little weight to control inputs. This overfitting phenomenon arises in each black-box model that was tested, indicating that the LR, RF and ANN methods have difficulty learning the underlying physics and are not optimal for use in MPC. Despite having significantly lower test-error, the LR multi-step model cannot generalize to new control schemes and predicts the indoor temperature to gradually rise in response to zero heat input. In contrast, the IBT multi-step model, with its underlying thermodynamic equations, can provide low test error while at the same time be used in model-based control.

Additional aspects of disturbance prediction in the heat pump control system 200 will now be described.

With regard to weather prediction, future weather conditions over the control horizon can be reliably obtained from dedicated forecasting services to a high degree of accuracy. To emulate these forecasts for use in simulations of illustrative embodiments, data-driven models trained on historical weather data are used. The two weather related disturbances considered in an example model are outdoor air temperature and solar insolation, since these have the largest effect on indoor heating or cooling load.

Solar insolation and outdoor air temperature are predicted using linear autoregressive models based on input features readily available from a nearby weather station. These include solar insolation, dew-point, wind speed, pressure, and time of day. The output of the models are the next four hours of outdoor temperature and solar insolation. Training data comes from available datasets for the winters (December to March) of 2016 and 2017 in Ithaca, totaling 14,000 samples, and performance of the models is then tested on corresponding data for the winter of 2018. RMSE for outdoor temperature prediction is 0.99° C., while RMSE for solar radiation is 0.09 kW/m².

With regard to aggregate load prediction, the peak load seen by the grid in some embodiments is the aggregate whole-home power, which includes both the centrally controllable heat pump power and the internal loads each resident uses. Therefore, in order for the controller to adequately plan the heat pump control to minimize the aggregate peak power, the internal load profile should also be forecasted. While predicting single building internal loads can be quite difficult in some embodiments due to its volatility, the aggregate internal load profile of many homes contains identifiable trends and patterns and allows an aggregate controller to have improved disturbance predictions.

Training data for aggregate load prediction was obtained from measurements of non-heat pump related electricity consumption in three different residences similar to the example building described previously herein. A load profile representing the power consumption of more than just three units is created by augmenting this data. For each additional unit added to the load profile, each individual load profile is randomly shifted by up to three hours and up to 15 days to simulate different resident behaviors. Training and test data come from different combinations of these random shifts and contain 6000 samples each.

Again, a linear autoregressive model for forecasting. The previous 6 hours, or 72 timesteps, of the power profile as well as the time of day were used as inputs to the model, with the next four hours, or 48 timesteps as the output. It was found that while more complex machine learning methods like random forest regression and neural networks provide lower RMSE, they tend to underpredict high peak loads because these loads happen very rarely in the training dataset. If high peak loads are not accurately predicted, peak load minimization MPC does not have sufficient information to plan an optimal control sequence and will result in higher peak load costs. Therefore, some embodiments use linear regression because it predicts these peaks much better, particularly if they occur in the next hour. This results in an RMSE of 3.01 kW, or around 15% of the aggregate peak of 24 residences.

An example control problem formulation to implement the above-described data driven models into MPC will now be described. MPC incorporates a model of the system and predictions of future disturbances into an optimization problem that minimizes the control objective over the desired control horizon. At each timestep, only the optimal control for the first timestep is implemented. At the next timestep, this process is repeated with the updated state and disturbance predictions. Different cost functions and constraints can be added to the formulation, allowing the controller to be applicable to many different types of heat pump control systems and to consider a wide variety of control objectives.

With regard to constraints, a thermal comfort constraint, minimum on and off time constraints and a peak load constraint are utilized in formulating the control problem in illustrative embodiments. Each of these is further described below. It is to be appreciated, however, that additional or alternative constraints can be used in other embodiments.

Thermal comfort is illustratively defined as a temperature range $T_\delta$ above and below the thermostat setpoint $T_{set}$. Since setpoints are assumed to be customizable by the resident, violations outside of this thermal comfort band are penalized to maintain feasibility. Residents often use setpoint setbacks in the interest of reducing energy consumption, thus causing large unavoidable comfort violations. Since these violations are expected and in the primary interest of energy efficiency rather than actual comfort, illustrative embodiments use different values for upper and lower comfort violations, denoted as $\bar{\pi}_{pen}$ and $\underline{\pi}_{pen}$ ($/s/° C.), respectively. These violations are enforced by the constraints, $$T_j^i \leq T_{set,j}^i + T_{\delta,j}^i + \overline{T}_{pen,j}^i \; \forall j \in N, i \in B$$

$$T_j^i \geq T_{set,j}^i + T_{\delta,j}^i + \underline{T}_{pen,j}^i \; \forall j \in N, i \in B \quad (8)$$

Here, $T_j^i$ is the indoor temperature of the ith building at timestep j, $\underline{T}_{pen,j}^i$ is the lower comfort violation, and $T_\delta^i$ is the occupant's comfort band above or below the setpoint. N represents the prediction horizon, and B is the set of buildings. Note that the comfort band can vary based on time of day as well. For the purpose of this simulation, it was assumed that $T_{\delta,j}^i$ is 4° C. during work hours (8:00 am to 4:00 pm), 2° C. at night (11:00 μm to 6:00 am), and 1° C. all other times.

To prevent compressor short-cycling and the resulting performance degradation, minimum on and off times are enforced for each heat pump. This means that once a heat pump turns on (or off) it must remain on (or off) for a minimum amount of time. To do this, binary variables $v_j^{\uparrow,i}$ and $v_j^{\downarrow,i}$ are introduced to indicate whether the heat pump in the ith building is turned on or off, respectively, at timestep j. The values of these variables and the minimum on and off times are enforced by the following constraints, $$u_j^i - u_{j-1}^i = v_j^{\uparrow,i} - v_j^{\downarrow,i} \; \forall j \in N, i \in B \quad (9)$$

$$\sum_{k=j-t_{min\,on}}^{j} v_k^{\uparrow,i} \leq u_j^i \; \forall j \in N, i \in B \quad (10)$$

$$\sum_{k=j-t_{min\,off}}^{j} v_k^{\downarrow,i} \leq 1 - u_j^i \; \forall j \in N, i \in B \quad (11)$$

Here, the minimum on time is denoted by $t_{min\,on}$ and the minimum off time is denoted by $t_{min\,off}$, which are set equal to 3 (15 minutes).

In order to minimize the aggregate peak load, another decision variable $P_{max}$ is introduced through the constraint, $$P_{max} \geq Q_{e,j}^{agg} + \sum_{i \in B} P_{HP,j}^i \; \forall j \in N \quad (12)$$

Here, $P_{max}$ must be greater than or equal to the sum of the heat pump power over all buildings and the aggregate indoor load $Q_{e,j}^{agg}$, predicted by the aggregate load prediction model described previously.

Example control objectives in illustrative embodiments, including aggregate peak load MPC, local time-of-use MPC and rule-based hysteresis control with programmable thermostat setbacks, will now be described.

While in some embodiments most heat pump MPC for improved efficiency and costs is on a local level, the scalability of this approach supports aggregate control to provide local benefits as well as provide some aggregate service to the grid, such as peak load management. In order to show this value of aggregation and the benefit of aggregate MPC, the three example controllers mentioned above, namely, aggregate MPC for peak load reduction, local MPC using time-of-use rates, and standard rule-based thermostat control using programmable thermostat setbacks, are analyzed.

An aggregate peak load MPC control policy illustratively minimizes the aggregate electrical cost of the buildings using an aggregate peak demand charge pricing structure. This structure charges a delivery charge ($/kWh) for the amount of energy used as well as a demand charge ($/kW) based on the highest 5-minute averaged aggregate demand for all buildings. While a demand charge structure is usually only offered to commercial buildings due to their size and controllability, this aggregate control can expand this structure's benefits of discouraging peak load and reduced capacity requirements to an aggregation of residences as well.

This price structure is included in the objective function as, $$\min_{u_j^i} C = \sum_{j=0}^{N-1} \sum_{i \in B} [\pi_{e,j} P_j^i + \underline{\pi}_{pen} \underline{T}_{pen,j}^i + \overline{\pi}_{pen} \overline{T}_{pen,j}^i] \Delta t + r \pi_{max} P_{max} \qquad (13)$$

Here, $\pi_{e,j}$ is the time-varying delivery charge and $\pi_{max}$ is the demand charge. In order to properly scale the demand charge for the MPC horizon, a scaling parameter r is included, and equal to the ratio of the number of minutes in the time horizon to the number of minutes in the month.

The local time-of-use MPC control policy uses a residential TOU rate in the objective function and optimizes each building separately, with no communication or coordination between buildings. Utilities use TOU rates to discourage homes from contributing to the aggregate peak load by charging higher prices for on-peak hours. For this simulation, data from New York State Electric and Gas (NYSEG) service class 12 winter TOU rate is used, where on-peak lasts from 7:00 am to 10:00 am and from 5:00 μm to 10:00 pm, mid-peak lasts from 10:00 am until 5:00 pm, and from 10:00 pm until 11:30 μm, and off-peak is all other times.

The objective function for this rate structure is, $$\min_{u_j} C = \sum_{j=0}^{N-1} [\pi_{e,j} P_j + \underline{\pi}_{pen} \underline{T}_{pen,j}^i + \overline{\pi}_{pen} \overline{T}_{pen,j}^i] \Delta t \qquad (14)$$

The rule-based hysteresis control with programmable thermostat setbacks is a common rule-based control method for smart thermostats. In heating mode, when the indoor temperature falls below the thermostat's lower comfort level, the heat pump will turn on to heat the air until it reaches the upper part of a deadband. At that point, it will turn off and let the temperature drift down again, repeating the cycle. By using custom setpoint schedules, this method represents an occupant's best attempt at balancing thermal comfort with energy efficiency. In addition, energy saving tactics employed by the smart thermostat, such as setpoint setbacks when the user is away, are also reflected in the setpoint schedules used in the simulation. This process can be represented by, $$u_{j+1}^i = \begin{cases} m, & T_j^i < T_{set,j}^i - T_\delta^i \\ 1-m, & T_j^i > T_{set,j}^i - T_\delta^i \\ u_j^i, & \text{otherwise} \end{cases} \qquad (15)$$

where m is equal to zero if in cooling mode and one if in heating mode.

The above-described example control arrangements were simulated over five days of heating for 24 randomly generated residences and heat pumps, where model parameters were randomly chosen from a uniform distribution of ±20% around the parameters derived from the data described previously herein. To introduce model uncertainty, variation was added between the plant and control model parameters such that the average error between the MPC and the plant models is equal to the test error results from model identification. Weather data range from February 24 to February 28 for Ithaca, NY Both the weather and aggregate load data are subsets of the test data used for evaluating the performance of the prediction models. Twenty-four setpoint schedules were randomly chosen from the collection of over 2000 participants in NY state in the Ecobee Donate Your Data (DYD) dataset.

The MPC used a five-minute timestep with an optimization horizon of 48 steps, or 4 hours. The optimization was carried out using a CPLEX 12.9 solver in a Pyomo modeling environment with a maximum run time of five minutes, equal to the timestep length. Since conditions change relatively little over a single timestep, each optimal solution is used as a warm-start for the next timestep to aid solver performance.

The simulations determined controller performance by measuring average daily profiles for indoor temperature, setpoint, and aggregate power for each control algorithm, including average daily peak power. In aggregate, real user thermostat setpoint schedules play an enormous role in creating peak loads and illustrate the potential unintended consequences of widespread use of smart thermostats. The mean thermostat setpoint creates two peaks at around 7:00 am and 7:00 pm, coinciding with on-peak hours. In this case, the programmable thermostat setbacks enabled by smart thermostats can actually exacerbate peak loads at exactly the times the grid would like to discourage increases in demand. During winter in northern climates these peaks occur just before the sun rises and after the sun sets and therefore cannot directly use solar energy, further underscoring the need to reduce peak loads during those times.

While local TOU-based MPC provides a marked reduction in electrical consumption and costs, it is still unable to reduce the aggregate peak load. Instead of peaking during on-peak hours, the aggregate power profile creates a new peak just before the on-peak hours occur, with a significant drop-off just after. While this may contribute toward flattening the peak if only a fraction of homes used TOU-based control, should this control method become widely available, TOU rates could have significant adverse effects just before on-peak hours begin.

The aggregate demand charge-based MPC is able to consider both other heat pump operation as well as the aggregate non-heat pump electrical demand. The result is a 19% reduction in average daily peak demand and a significantly more even demand profile when compared to TOU-based MPC. Moreover, it was found that the aggregate controller can significantly reduce peak demand without a significant increase in electrical consumption. When compared to the local MPC, the cost of a 19% reduction in average daily peak demand is only a 4.6% increase in energy consumption, primarily during the night when non-heat pump demand is very low and the wholesale electricity price is often cheap.

Costs for each controller under each rate structure were determined and normalized by the cost of the baseline rule-based controller. The aggregate controller was found to have consistently good performance under each rate structure, and provides a consistent savings of 23% when compared to the custom setpoint thermostat control. The local controller provides slightly better savings of 26% on the consumption-based rate structures, but only a 9% savings on the demand charge structure.

Thermal comfort was also measured by determining each algorithm's thermal comfort constraint violation for being above (up) or below (down) the user-defined comfort level. This cost is the portion of the objective function related to thermal comfort constraint violation and is calculated as the product of the thermal comfort penalty $\pi_{pen}$ and the amount the indoor temperature exceeds the comfort band $T_{pen}$. Both MPC approaches provide significantly lower thermal comfort violations than rule-based control because of the ability to pre-heat or pre-cool the building so that the temperature is in the correct range prior to setpoint changes. Up comfort violations are much higher because the heat pump can only heat during winter, and thus has no way to lower the temperature in response to large setpoint reductions. However, since the most likely reason for these user-defined thermostat setbacks is in an attempt to save energy and money, up comfort violations are less important than down comfort violations in winter. Since there is no significant difference in thermal comfort between the local and aggregate approaches, it is apparent that the aggregate controller can effectively reduce peak load without any reductions in thermal comfort. Furthermore, the aggregate controller does not unfairly penalize some users to reduce the overall objective, with each unit's aggregate control thermal comfort violation changing less than 5% compared to the local control.

The illustrative embodiments described above in conjunction with FIGS. 2 through 5 provide a plug-and-play methodology that utilizes smart-home devices, illustratively a smart thermostat and smart electricity meter, to provide scalable system identification and MPC for heat pump and smart grid interactivity. Example implementations use the devices already present in a growing number of homes to model the building and heat pump, as well as provide optimal control for improved comfort and grid services. Since it requires no additional hardware implementation or visit from a professional, this method is scalable and non-intrusive, considerably reducing barriers to adoption.

These illustrative embodiments make data-driven building and heat pump modeling feasible when limited data sources are available. However, it should be noted that there are inevitably some cases where the available data is still insufficient. Examples include thermostats with little setpoint variation or large homes where one thermostat temperature cannot accurately represent the whole home. In these cases, adaptive control techniques that artificially excite the system or multiple thermostats and changes to the building model could be used. Moreover, the effects of different indoor loads on the indoor temperature can vary widely and the associated parameter η is often difficult to estimate. For example, large loads like electric vehicles may need to be submetered or separated using energy disaggregation to distinguish them from heat producing loads inside the home.

Example simulation results show that while smart thermostat setpoint schedules and local MPC can reduce energy consumption, they can also have unintended consequences on the aggregate energy system by creating new or more pronounced peaks in demand during or just before on-peak hours. The scalability of illustrative embodiments enables aggregate MPC to mitigate these aggregate effects on the energy system, while still providing local benefits of improved thermal comfort and reduced energy costs. Additional results show that this aggregate MPC can reduce the average daily peak load by 19% without a significant increase in energy consumption or decrease in thermal comfort when compared to a local approach. Therefore, with this scalable approach, an easily implemented and improved control for smart thermostats and heat pumps is provided, while at the same time mitigating the effects that an aggregation of units may have on the overall energy system.

Figure 6:
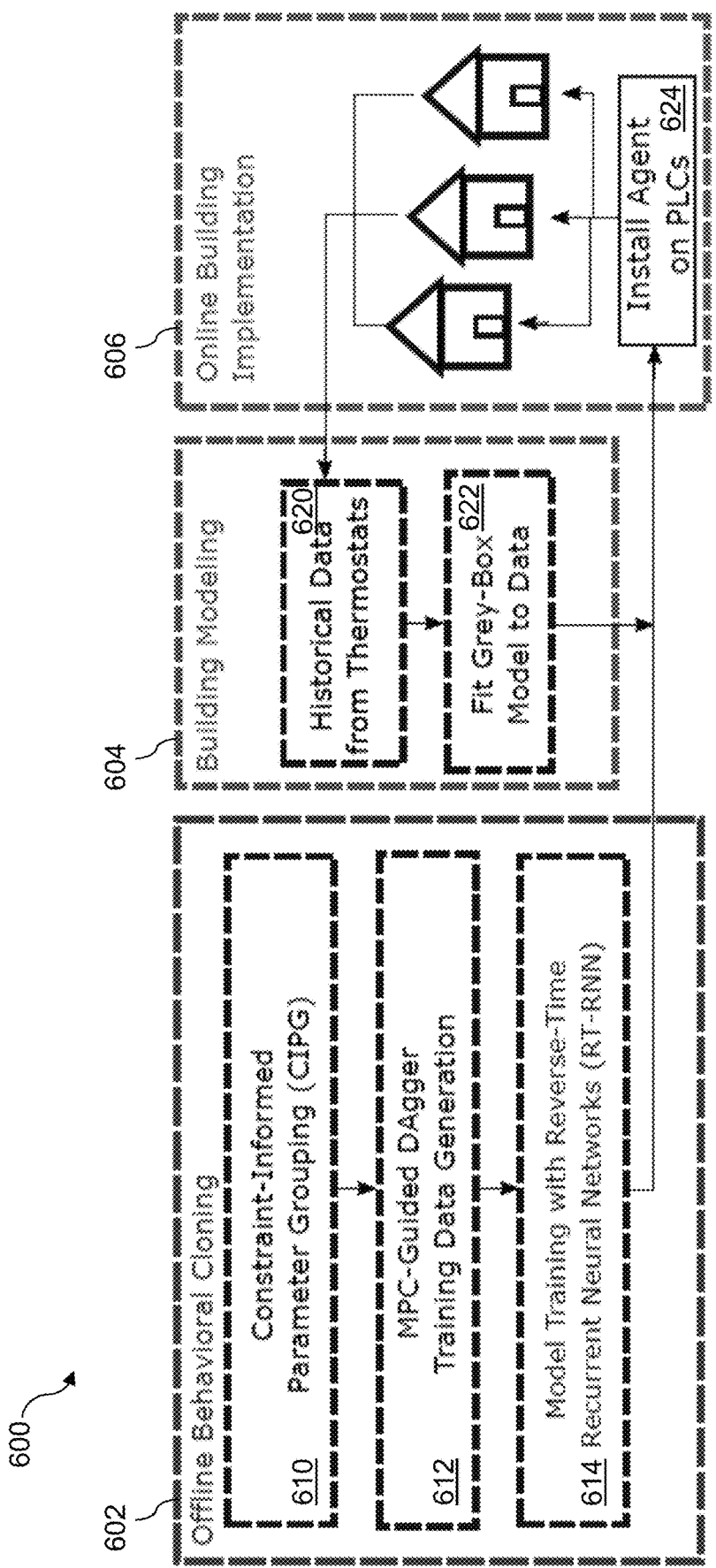
FIG. 6 is a flow diagram of an example process for behavioral cloning of MPC and implementation thereof in a set of buildings in an illustrative embodiment.
Figure 8:
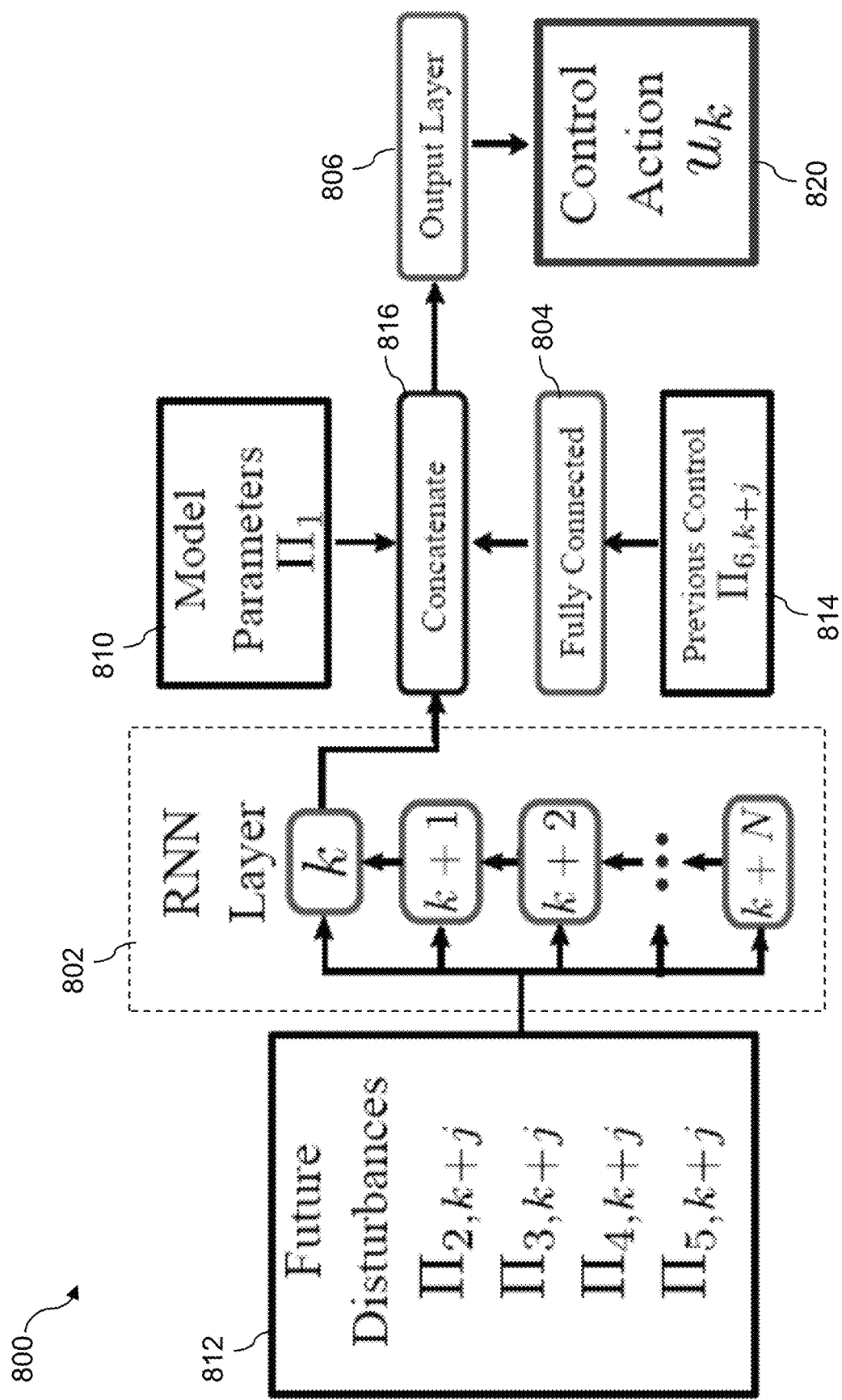
FIG. 8 is a block diagram of an example reverse-time recurrent neural network (RT-RNN) utilized in implementing a behavioral cloning agent in an illustrative embodiment.

Additional illustrative embodiments that incorporate behavioral cloning features will now be described in conjunction with FIGS. 6 through 8. More particularly, FIGS. 6 through 8 show illustrative embodiments that are configured for behavioral cloning of HVAC model predictive control for use on resource-constrained devices.

Some of these embodiments implement reinforcement learning using behavioral cloning to reduce the computational burden of computing the optimal control in MPC. For example, in some embodiments, behavioral cloning also allows the model to continually improve and adapt based on new data collected by devices such as smart meters and smart thermostats. Such embodiments can thus provide significantly improved performance, in terms of both energy and computational efficiency, in the context of scalable control of heat pumps using smart meters and smart thermostats, and even more so in the context of coordinating smart thermostats across multiple energy usage locations for grid services.

In some embodiments, the behavioral cloning represents the MPC policy at least in part as a neural network that can be locally implemented and quickly computed on a low-cost PLC or other processing device. While previous reinforcement learning and approximate MPC methods must be specifically trained for each building, an important advantage of illustrative embodiments disclosed herein is that the controller can generalize to many buildings, electricity rates, and thermostat setpoint schedules without additional, effort-intensive retraining. To provide this versatility, example behavioral cloning techniques disclosed herein are implemented using one or more of a constraint-informed parameter grouping (CIPG) method that provides a more efficient representation of the training data, an MPC-guided training data generation method using a dataset aggregation ("DAgger") algorithm that improves stability and constraint satisfaction, and a deep learning model structure using a reverse-time recurrent neural network (RT-RNN) that allows future information to flow backward in time to more effectively interpret the temporal information in disturbance predictions.

Such embodiments advantageously provide an easy-to-deploy, generalized behavioral clone of MPC that can be implemented on a low-cost PLC or other processing device and requires little building-specific controller tuning, reducing the effort and costs associated with implementing smart residential heat pump control. For example, some embodiments implement a behavioral clone of MPC that uses only around 100 kB of memory, requires negligible computational time, and can be implemented in buildings on a PLC in a low-cost thermostat with minimal installation effort and costs.

Referring now to FIG. 6, an example process 600 for behavioral cloning of MPC and implementation thereof in a set of buildings is shown. In this embodiment, a behavioral cloning agent is advantageously configured to generalize to new buildings and operating conditions, using techniques that substantially reduce the amount of training that would otherwise be required to provide such functionality.

The process 600 as illustrated includes an offline behavioral cloning stage 602, a building modeling stage 604, and an online building implementation stage 606. The building modeling stage 604 is also illustratively performed offline, although not explicitly indicated as such in the figure. In some embodiments, the offline behavioral cloning stage 602 and the building modeling stage 604 are both illustratively performed offline using, for example, a desktop computer or other arrangement of one or more processing devices, while the online building implementation stage 606 illustratively implements scalable heat pump control utilizing only a PLC. Additional or alternative stage configurations, and offline and/or online implementations thereof, can be used in other embodiments. For example, one or more stages may be implemented using a hybrid offline-online approach in some embodiments, with some portions of a given such stage being implemented offline and other portions being implemented online.

The offline behavioral cloning stage 602 more particularly implements CIPG step 610, MPC-guided DAgger training data generation step 612, and model training with RT-RNN step 614, arranged as illustrated.

The building modeling stage 604 obtains historical data from thermostats in step 620 and fits a grey-box model to the data in step 622.

The online building implementation stage 606 installs a resulting behavioral cloning agent on PLCs of respective smart thermostats of respective buildings in step 624 and performs heat pump control utilizing the installed agents.

The CIPG step 610 provides a more efficient representation of the state and disturbance inputs. These parameter groupings are derived from the structure of the MPC constraints and building model. Rather than using a black-box or white-box model, which can sometimes require hundreds of unique parameters, illustrative embodiments use a reduced-order grey-box building model to allow the thermodynamics to be efficiently grouped as inputs to the behavioral cloning agent. Such embodiments exploit the structure of the MPC formulation to group the model and disturbance parameters in a way that provides a more efficient representation of the input state information and improves the ability for the controller to generalize to new conditions. In essence, the building thermodynamics and the optimal control are not necessarily functions of the actual parameter values, but rather the ratios or differences between the parameter values (e.g., heat loss is a function of the temperature difference). Therefore, grouping the training data parameters based on the constraints in the MPC formulation condenses the feature space so as to allow operating conditions from one training simulation to be more effectively applied to a different operating condition during test time.

The MPC-guided DAgger training data generation step 612 builds a diverse set of training data that provides the behavioral cloning agent with sufficient information to operate optimally under various operating conditions and to recover from any mistakes. Since the agent is sub-optimal, it will likely make errors in its control prediction, which can lead it to a state that differs from an expert controller's trajectory. Since these sub-optimal states would not be included in training data generated by the expert controller, the agent would have no prior information on which to base its control decision and will likely make more errors, leading to instability and constraint violation. To prevent the compounding of errors, a DAgger algorithm guided by MPC is utilized as the expert controller. At each iteration, DAgger uses the behavioral cloning agent to control a simulation of randomized building models and operating conditions over a period of time. At each of these time steps, the MPC solves and records the true optimal control and adds the new state-control pairs to the training dataset. After each iteration, the agent is retrained with the growing dataset that now has information on how to correct the mistakes the agent made during the prior iteration. This process is repeated until each iteration produces negligible performance improvements.

The model training with RT-RNN step 614 uses the total grouped and normalized dataset to train the final behavioral cloning agent that predicts the optimal control as a function of the input parameters. The RT-RNN is advantageously configured to more effectively incorporate the temporal information from the future disturbance forecasts compared to more conventional supervised learning algorithms. The model structure was tested against three other supervised learning methods to show that RT-RNNs can provide the best performance while maintaining minimal memory and processing requirements.

An optimal model is implemented in a test simulation on a sample of buildings intended to mimic real-world operation. To implement the controller, a homeowner buys and installs a low-cost thermostat containing a PLC with the behavioral cloning agent installed. The thermostat then collects various operational data over a period of time that can be used to automatically derive a data-driven reduced order building model. These model parameters, combined with weather forecasts and data collected by the thermostat, are then used as inputs to the behavioral cloning agent to provide online approximately optimal control. This test simulation contains buildings with diverse thermodynamics and heat pump performances, various thermostat setpoint schedules obtained from real data, and different electricity price schedules, all of which were not originally included in the training dataset. Testing performed on these diverse operating conditions shows that the behavioral cloning approach disclosed in illustrative embodiments herein leads to improved versatility and minimal-effort implementation compared to conventional heat pump control approaches.

The example methodology illustrated in FIG. 6 is designed to be applicable to a wide range of residential building types and heat pump configurations. For example, one of the most common residential configurations, namely, a detached home served by a single-stage air-to-air heat pump, is simulated herein. However, many heat pump MPC formulations include similar structures, and thus it is straightforward to adapt the disclosed methodology to other system types for both heating and cooling.

To be able to model each system without significant manual effort, a data-driven grey-box model is utilized, where each of the building and heat pump model parameters can be automatically identified from collected data. As a reduced-order model, the grey-box approach reduces the number of thermodynamic model parameters so they can be used as inputs to the behavioral cloning agent. While derivation of these building parameters sometimes requires data collected from a variety of sensors throughout the building or from building energy simulations, an identification and control method of the type described elsewhere herein can be utilized to reduce hardware installation cost and effort.

The building model in some embodiments can be represented by a thermal RC circuit, such as that previously described in conjunction with FIG. 4. While single-state RC models often have insufficient complexity to provide benefits from MPC, a two-state model better captures the increased energy storage capacity of the building's construction and more generally is applicable to a wide range of buildings. This two-state model includes different states for the building's indoor air and the building's construction and includes effects from solar irradiation, and is illustratively given by, $$C_a \dot{T}_a(t) = \frac{T_\infty - T_a(t)}{R_{a\infty}} + \frac{T_m(t) - T_a(t)}{R_{am}} + \alpha_a G + Q_{HP} \quad (16)$$

$$C_m \dot{T}_m(t) = \frac{T_\infty - T_m(t)}{R_{m\infty}} + \frac{T_a(t) - T_m(t)}{R_{am}} + \alpha_m G,$$

where the subscript a refers to the indoor air, m to the building mass, and ∞ to the outside air. The resistance and capacitance values are given by R and C, respectively, while the temperature of the states is given by T. Solar heat gains are included using the solar irradiation G and the solar absorption factor α. Based on an analysis of manufacturer performance data, the heat transfer from the heat pump $Q_{HP}$ is assumed to vary linearly based on the indoor and outdoor temperature, given by, $$Q_{HP,a} = u(\beta_1(T_\infty - T_a) + \beta_2) \quad (17)$$

where $\beta_i$ are data-driven heat pump specific model parameters and u denotes the binary control input for whether the heat pump is on or off.

Finally, based on an analysis of heat pump technical data, the power consumption P is assumed to be a constant γ multiplied by the control input, such that P=γu.

For use in MPC, the model is discretized with time step Δt into the state space form indexed by k, $$x_{k+1} = Ax_k + B_k u_k + Ew_k, \quad (18)$$

where, $$x = \begin{bmatrix} T_{a,k} \\ T_{m,k} \end{bmatrix},$$

$$u_k = [u_k],$$

$$w_k = \begin{bmatrix} T_{\infty,k} \\ G_k \end{bmatrix}$$

$$A = \begin{bmatrix} 1 - \frac{\Delta t}{C_a}\left(\frac{1}{R_{a\infty}} + \frac{1}{R_{am}}\right) & \frac{\Delta t}{C_a R_{am}} \\ \frac{\Delta t}{C_m R_{am}} & 1 - \frac{\Delta t}{C_m}\left(\frac{1}{R_{m\infty}} + \frac{1}{R_{am}}\right) \end{bmatrix}$$

$$B_k = \begin{bmatrix} \frac{\Delta t}{C_a}(\beta_1(T_{\infty,k} - T_{set,k}) + \beta_2) \\ 0 \end{bmatrix}$$

$$E = \begin{bmatrix} \frac{\Delta t}{R_{a\infty} C_a} & \frac{\alpha_a \Delta t}{C_a} \\ \frac{\Delta t}{R_{m\infty} C_m} & \frac{\alpha_m \Delta t}{C_m} \end{bmatrix}$$

The controller in illustrative embodiments seeks to minimize the time-varying electricity cost while maintaining thermal comfort in response to varying thermostat setpoints decided by the resident. Thermal comfort is illustratively defined as a temperature range above and below the thermostat setpoint. Since it is assumed that setpoints are customizable by the resident, to maintain feasibility violations outside of this thermal comfort band are penalized. These violations are enforced by the constraints, $$T_{k+j} \leq T_{set,k+j} + T_{\delta,k+j} + \overline{T}_{pen,k+j} \quad \forall j \in N$$

$$T_{k+j} \geq T_{set,k+j} - T_{\delta,k+j} - \underline{T}_{pen,k+j} \quad \forall j \in N \quad (19)$$

Here, $T_{pen,k+j}$ is the comfort violation decision variable, $T_{\delta,k+j}$ is the resident's specified comfort band above or below the setpoint, $T_{set,k+j}$ is the resident's specified setpoint, and N represents the prediction horizon indexed by j. Note that the comfort band can also vary based on time of day and can be determined by whether the thermostat is in home, away, or sleep modes.

Next, heat pumps have inherent minimum on and off times to prevent short cycling and the resulting compressor damage and efficiency reduction. To enforce these minimum cycle times, the following constraints are added, $$u_{k+j} - u_{k+j-1} = v_{k+j}^\uparrow - v_{k+j}^\downarrow \quad \forall j \in N \quad (20)$$

$$\sum_{i=k+j-i_{min\,on}}^{k+j} v_i^\uparrow \leq u_{k+j} \quad \forall j \in N \quad (21)$$

$$\sum_{i=k+j-i_{min\,off}}^{k+j} v_i^\downarrow \leq 1 - u_{k+j} \quad \forall j \in N \quad (22)$$

Here, $v_i^\uparrow$ and $v_i^\downarrow$ are binary variables that are unity if the heat pump turned on or off, respectively, at the time step i. The parameters $t_{min,on}$ and $t_{min,off}$ are the minimum on and off times, respectively.

The objective function combines the time-varying cost of electricity $\pi_{e,j}$ with the upper and lower thermal comfort penalties, $\overline{\pi}_{pen}$ and $\underline{\pi}_{pen}$, $$\min_{u_{k+j}} J = \sum_{j=0}^{N-1} \left[ \pi_{e,k+j} P_{k+j} + \underline{\pi}_{pen} \underline{T}_{pen,k+j} + \overline{\pi}_{pen} \overline{T}_{pen,k+j} \right] \quad (23)$$

The final MPC problem is therefore, $$\min_{u_{k+j}} \sum_{j=0}^{N-1} \left[ \pi_{e,k+j} P_{k+j} + \underline{\pi}_{pen} \underline{T}_{pen,k+j} + \overline{\pi}_{pen} \overline{T}_{pen,k+j} \right] \quad (24a)$$

subject to $$x_{kk+j+1} = Ax_{k+j} + B_{k+j} u_{k+j} + Ew_{k+j} \quad \forall j \in N \quad (24b)$$

$$T_{a,k+j} \leq T_{set,k+j} + T_{\delta,k+j} + \overline{T}_{pen,k+j} \quad \forall j \in N \quad (24c)$$

$$T_{a,k+j} \geq T_{set,k+j} - T_{\delta,k+j}^i - \underline{T}_{pen,k+j} \quad \forall j \in N \quad (24d)$$

$$u_{k+j} - u_{k+j-1} = v_{k+j}^\uparrow - v_{k+j}^\downarrow \quad \forall j \in N \quad (24e)$$

$$\sum_{i=k+j-i_{min\,on}}^{k+j} v_i^\uparrow \leq u_{k+j} \quad \forall j \in N \quad (24f)$$

$$\sum_{i=k+j-i_{min\,off}}^{k+j} v_i^\downarrow \leq 1 - u_{k+j} \quad \forall j \in N \quad (24g)$$

This gives the optimal MPC policy $\mu^*_{mpc}$ that maps the building parameters and disturbance forecasts to the optimal control $u^*_k$, $$u^*_k = \mu^*_{MPC}(x_k, A, B_{k+j}, E, \gamma, T_{set,k+j}, T_{\delta,k+j}, \pi_{e,k+j}, \underline{\pi}_{pen}, \overline{\pi}_{pen})$$

where $\mu^*(\cdot)$ is found numerically by solving the optimization problem.

Solving this mixed-integer linear program can require significant processing power and memory. Therefore, illustrative embodiments use behavioral cloning to find the function ft that represents the MPC policy such that it provides the optimal control at each time step as a function of the inputs to the MPC. Thus, behavioral cloning takes the form, $$u_k = \hat{\mu}_{MPC}(\cdot)$$

Finding this function is a supervised learning problem that uses the MPC controller to generate a diverse set of input parameters and the corresponding optimal control. Example input features to the behavioral cloning agent illustratively include the same information used by the MPC, including future thermostat setpoints, comfort levels, electricity prices, and weather forecasts, as well as the building and heat pump model parameters. The agent's output is the binary optimal control value at the current timestep $u_k$ indicating whether the heat pump should turn on or off.

Additional aspects of the CIPG step 610 of example process 600 will now be described in further detail.

Since the controller will be implemented on a variety of home types, setpoint schedules, electricity tariffs, and weather forecasts, learning over the entire feasible parameter space can require a large amount of training data. Therefore, as indicated previously, illustrative embodiments utilize CIPG to group the input parameters using knowledge of the MPC constraints to create more sample-efficient state representation in training data and improve controller performance on new conditions.

In some embodiments, the CIPG approach disclosed herein utilizes dimensionality reduction that is similar in certain respects to those of the Buckingham Pi Theorem. As an example, the latter method is used in fluid dynamics to non-dimensionalize fluid parameters such that the solutions to complex fluid flows are no longer functions of the actual parameter values (e.g., viscosity, velocity, temperature, etc.), but instead functions of the ratios between the values (e.g., Reynolds number). This method can be similarly applied to normalize input parameters in illustrative embodiments herein using knowledge of the structure of the dynamics and MPC formulation. For example, heat loss is not an explicit function of the outdoor temperature, but rather the difference between the indoor and outdoor temperatures and the building's thermal parameters. Similarly, the control decision does not change if the costs were all scaled by 50%. Therefore, grouping and normalizing these values provides a more efficient state representation without sacrificing any information required to solve the control problem. Through these groupings the training data for one building and operating condition can generalize to another, as long as these groupings remain the same.

An example procedure for parameter grouping is described as follows. First, the building's thermodynamic parameters R, C are simply grouped as the entries of the A state space matrix defined in Equation (18). This initial grouping provides a simple illustration of the point that in some embodiments disclosed herein it is not the parameter values themselves that govern the MPC solution, but the ratios of the parameters instead. Following the notation of the Buckingham Pi Theorem where $\Pi$ refers to a grouped parameter, the building model parameter groupings are given by the vector, $$\Pi_1 = [a_{11}, a_{12}, a_{21}, a_{22}] \tag{25}$$

where the subscripts denote the entries in the corresponding state space matrix.

Next, the heat pump's effect on the indoor air temperature comes from the B matrix defined in Equation (18). Since the heat output changes based on the indoor and outdoor air temperature, this parameter grouping is indexed by j over the MPC horizon N. The normalized parameter corresponding to the heat pump is given as, $$\Pi_{2,k+j} = b_{11,k+j} \; \forall j \in N \tag{26}$$

The weather's effect on the solution comes from the forecasts for outdoor temperature and solar irradiation and the corresponding thermal properties of the home grouped in the C matrix defined in Equation (18). These are combined into a matrix indexed over the MPC horizon, $$\Pi_{3,k+j} = \begin{bmatrix} c_{11}T_{\infty,k+j} \\ c_{21}T_{\infty,k+j} \\ c_{12}G_{k+j} \\ c_{22}G_{k+j} \end{bmatrix} \; \forall j \in N \tag{27}$$

The thermal comfort constraints are normalized by taking the distance between the temperature at the current time step, $T_{a,0}$, and the upper and lower thermal comfort bounds indexed over the control horizon. This grouping is defined such that value will be zero if $T_{a,0}$ is at the lower comfort bound and unity if it is at the upper comfort bound, given by, $$\Pi_{4,k+j} = \frac{T_{a,k} - (T_{set,k+j} - T_{\delta,k+j})}{2T_{\delta,k+j}} \; \forall j \in N \tag{28}$$

Similarly, the normalized parameter corresponding to electricity price is the distance between the electricity price at the current time step and the maximum and minimum electricity prices such that the value is zero at the minimum price, and one at the maximum price. It is then multiplied by $\gamma$ to give the total energy cost of turning the heat pump on. This grouping is indexed over the MPC horizon and given by, $$\Pi_{5,k+j} = \gamma \frac{\pi_{e,k+j} - \pi_{e,min}}{\pi_{e,max} - \pi_{e,min}} \; \forall j \in N \tag{29}$$
$$\forall j \in N$$

Finally, minimum heat pump on and off time constraints are implemented by supplying the previous control values. Since illustrative embodiments assume a 15-minute minimum heat pump cycle time and a five minute time step, this becomes three previous control steps, $$\Pi_{6,k} = [u_{k-1}, u_{k-2}, u_{k-3}] \tag{30}$$

The result is a new functional form for the approximate MPC policy that is a function of the normalized parameter groupings and spans a reduced parameter space, $$u^* = \mu_{MPC}(\Pi_1, \Pi_{2,k}, \Pi_{3,k}, \Pi_{4,k}, \Pi_{5,k}, \Pi_{6,k}) \tag{31}$$

Additional aspects of the MPC-guided DAgger training data generation step 612 of example process 600 will now be described in further detail.

Since the original controller is completely replaced by a machine learning model, the original MPC properties of recursive feasibility and closed-loop stability are no longer guaranteed. Instead, the controller must be able to learn these properties solely from the training data, making the training data's content particularly important for stability and performance. For some applications, such as those in which the operating conditions do not vary much, the control prediction can make very few errors and can provide statistical guarantees on constraint satisfaction and stability. However, if the agent faces new operating conditions, such as changing setpoints or different electricity tariffs, the agent will likely make mistakes and deviate from the optimal control trajectory. Therefore, closed-loop MPC simulations are often unable to provide sufficient information for the agent to correct itself should it drift to a sub-optimal state (such as outside of the thermal comfort bounds).

FIG. 7 shows example pseudocode for an MPC-guided DAgger algorithm for training of a behavioral cloning agent in an illustrative embodiment. The DAgger algorithm is an iterative algorithm that uses the behavioral cloning agent to generate likely suboptimal trajectories, records what the expert controller would have done in those trajectories, and then retrains the agent with additional data. Illustrative embodiments use MPC to guide the DAgger algorithm, which lets the suboptimal agent control the system, while the true MPC acts as a guide to correct the suboptimal behavior between each iteration. For example, if the agent lets the temperature drift below the lower thermal comfort bound, the true MPC will record what the optimal control should have been and how to correct for it so that the mistake is not repeated during future iterations. By letting the true MPC guide the imperfect behavioral cloning agent, the DAgger algorithm enriches the training dataset above pure closed-loop MPC simulations to allow the agent to be stable on new operating conditions and correct for model imperfection. Conventional aspects of DAgger algorithms are described in, for example, S. Ross et al., "A reduction of imitation learning and structured prediction to no-regret online learning," Proceedings of the 14$^{th}$ International Conference on Artificial Intelligence and Statistics, 2011, pp. 627-635, which is incorporated by reference herein in its entirety.

As illustrated in FIG. 7, an algorithm denoted herein as Algorithm 2 is an MPC-guided DAgger algorithm that starts by training an initial behavioral cloning agent on a day of closed-loop MPC simulation data on a set of random building and heat pump model parameters. This initial agent is then tested in simulation to control a new set of random buildings on a new day with different weather conditions and electricity costs. During this initial test simulation, the agent will likely perform poorly and deviate from the optimal control trajectory. Throughout the test, however, a supervisory MPC calculates and records, but does not implement, the true optimal control at each time step. At the end of the simulation, these optimal control solutions are added to the training data set and the agent is retrained with the additional data. Through this process, the correct control responses to suboptimal states are added to the training dataset so the agent can know how to correct itself in the future. These iterations can be repeated until the agent is stable during the testing phase and its objective value $J_{appr}$ is within some limit E of the true MPC objective value $J_{MPC}$.

Additional aspects of the model training with RT-RNN step 614 of example process 600 will now be described in further detail.

In developing a functioning behavioral cloning agent, it is important to implement an appropriate machine learning model structure. Particularly with MPC, the ability to extract the temporal information embedded in the disturbance forecasts heavily affects the model's performance. For example, knowing that the setpoint will rise at a specific time in the future determines at what time the agent should begin preheating. Conventional supervised learning techniques such as regression trees and feed-forward neural networks generally do not contain sufficient inherent structure to interpret temporal information and thus may be unable in some embodiments to adequately learn the larger feature space so as to be able to generalize to new conditions. Accordingly, illustrative embodiments herein implement a new model structure denoted herein as RT-RNN to better capture the temporal information contained in the future disturbance predictions.

Traditional RNNs are a type of neural network that use a time-based structure to take advantage of temporal information in the data. RNNs take inputs from the current time step and from previous time steps that are passed through the RNN layer as a hidden state. RNNs perform significantly better than conventional feed-forward neural networks (FFNN) on sequential data applications such as forecasting and natural language processing. In some embodiments herein, however, the input features do not contain data from previous time steps, but rather from future disturbances like weather, electricity price, and setpoint preferences. Nevertheless, future disturbances can also benefit from being used in RNNs, as is in the case of bidirectional RNNs, which use both previous and future datapoints to make a prediction at the current time step. As indicated previously, illustrative embodiments herein implement RT-RNNs, where the RNN is structured such that time is reversed, and future disturbance prediction information flows backward in time to help predict the optimal control at the current time step.

FIG. 8 shows an example RT-RNN 800 utilized in implementing a behavioral cloning agent in an illustrative embodiment. In this embodiment, the RT-RNN 800 comprises an RNN layer 802, a fully connected layer 804 and an output layer 806. Parameter groupings that are determined as previously described include model parameters 810, future disturbances 812, and previous control values 814.

The future disturbances 812 containing weather, electricity price, and setpoint information are input into the RNN layer 802, where the information flows backward in time, from the end of the MPC horizon to the current time step. The output of the RNN layer 802 is concatenated in concatenation component 816 with the remaining input parameters including model parameters 810 and previous control values 814. The previous control values 814 indicating minimum on and off times contained in $\Pi_6$ are first passed through fully connected layer 804 layer, illustratively in the form of a single node, to compress the information before concatenation. The output layer 806 illustratively contains a sigmoid activation function to provide the prediction of control action 820, which is illustratively a binary control action. The control action 820 is an example of what is more generally referred to herein as a "control signal." Other types of control signals can be used in other embodiments, and the term "control signal" as used herein is therefore intended to be broadly construed.

It is to be appreciated that this particular RT-RNN configuration is presented by way of illustrative example only, and different layers, parameter groupings, control actions and other additional or alternative neural network elements can be used in other embodiments.

Since RNNs contain feedback loops to store memory, they can experience vanishing or exploding gradients if the sequences are too long. Thus, vanilla RNNs are often unable to learn long term temporal dependencies. To solve this, RNNs have been improved with model structures like gated recurrent units (GRU) and long short-term memory (LSTM), which are capable of storing a separate memory state that may be important in a long sequence. These structures can be equally applied for RT-RNNs, where the memory state can instead be termed the prediction state. For example, if a setpoint change occurs several hours in the future, the prediction state can store this information without it being potentially lost due to vanishing gradients over many time steps in the RNN. While LSTMs often outperform GRUs due to a more complex structure, GRUs can be more suited for memory constrained applications or on smaller datasets. Therefore, both model structures are tested to determine their performance in illustrative embodiments, as described below.

An example behavioral cloning agent of the type described above is illustratively evaluated herein in terms of control prediction accuracy to determine the optimal behavioral cloning model structure and control simulation performance to determine its comparison to existing HVAC control policies.

Control prediction accuracy was first evaluated in order to select the optimal model structure and hyper-parameter configuration. The control prediction performance and computational requirements of the RT-RNN was then compared to three alternative supervised learning techniques: (1) FFNNs, (2) Random Forest, and (3) Extreme Gradient Boosting (XGBoost).

FFNNs represent the most basic deep neural network architecture, and pass information forward from the input features to the output prediction through multiple fully connected layers. Each node in a layer contains a vector of weights for each of the nodes in the previous layer and a bias parameter. The value of each node is then put through a nonlinear activation function to allow the network to approximate nonlinear functions.

Random forest is an ensemble based supervised learning method that uses an ensemble of many different decision trees to classify data. Different decision trees are fit based on random subsamples of the dataset, and each tree's output votes toward the final model's decision. By taking the majority vote of many decision trees, random forest reduces the potential for overfitting that is common with single decision trees. Both the memory requirement and performance of random forest depends on key hyper-parameters that govern the number and size of the trees and must be optimized.

XGBoost is similar to random forest in that it uses an ensemble of decision trees, but it differs based on how the trees are created. Instead of creating each tree independently, XGBoost uses extreme gradient boosting to iteratively improve a decision tree using more trees. At each iteration, the algorithm constructs a new tree to predict the error resulting from the previous ensemble of trees and then adds the new tree to the ensemble using a scaling factor called the learning rate. By doing so, the algorithm "boosts" the prediction at each step until no more performance gains can be made.

While more model parameters can theoretically learn more complex representations of the input data, this comes at the cost of larger model and higher memory requirements. To analyze this tradeoff, each machine learning model's optimal hyper-parameters were determined through a grid search with 25 iterations for each model type. For each iteration, the model size and the validation prediction accuracy were logged. Model size refers to the memory requirements to store each of the individual model parameters and is measured in kilobytes. Validation prediction accuracy refers to the model's prediction accuracy where the validation data is comprised of a random selection of 10% of the buildings simulated in the training data.

After selecting the best predicting model, the actual control performance is found through control simulations. Control performance is illustratively defined in some embodiments as the cumulative MPC objective function over a five-day test simulation on a set of buildings B, operating conditions, and electricity tariffs that were not included in the original training dataset, represented by the equation, $$\sum_{b=0}^{B}\sum_{k=0}^{K}[\pi_{e,k}P_k^b + \underline{\pi}_{pen}\underline{T}_{pen,k}^b + \overline{\pi}_{pen}\overline{T}_{pen,k}^b] \qquad (32)$$

Here k is the time step and K is the total number of time steps in the five-day test. Since setpoint preference and building thermal capacity can have a strong effect on MPC benefits, the model is tested on ten different buildings indexed by b to give a more holistic evaluation of model performance and generalization. Final computational requirements are logged during this simulation and include the processing speed and memory requirements required to store and run the model.

These metrics were used to compare the behavioral cloning control of illustrative embodiments to a baseline standard rule-based control policy and the true MPC policy. In this case, the rule-based control policy is the typical thermostat's hysteresis control, where the heat pump turns on when the indoor temperature falls below the lower comfort bound and turns off when the temperature rises above the upper comfort bound. Note that this rule-based policy uses variable setpoint schedules that may include energy-saving setbacks when the occupant is away or asleep. In contrast, the MPC policy provides the target objective function value that behavioral cloning is trying to imitate.

At each iteration of the DAgger algorithm, the system simulates new buildings with different random R, C, and a values and different heat pump performance coefficients. Various setpoint schedules were obtained from the Ecobee DYD dataset, which contains smart thermostat setpoint schedules from thousands of homes throughout the country. Thermal comfort band schedules were set based on whether those thermostats were in "home", "sleep", or "away" modes. It was assumed that the comfort band is ±0.5° C. for "home," ±1.0° C. for "sleep," and no limit when "away." Electricity price schedules were obtained from New York State Electric and Gas (NYSEG), Con Edison (ConEd), and Xcel Energy, three utilities that offer time-of-use rates during winter. Weather data comes from various days in January and February 2019 for New York City. Note that while illustrative embodiments provide some level of generalization, if the climate varies significantly from the training case, more simulations specific to the target climate may be required.

The simulations utilized 15 days of simulation data, each containing 10 randomized buildings, heat pumps, and setpoint schedules. For each of the random buildings, the thermodynamic model parameters were randomly selected from a range of ±25% around the values used in MPC embodiments described elsewhere herein. This totals 45,760 samples of data used for training. To show the benefit of both the constraint-informed parameter normalization and the DAgger algorithm, a set of models were trained on three different training data representations. The first (CIPG+ DAgger) is the aforementioned dataset generated by DAgger and normalized using CIPG as disclosed herein. The second (CIPG+MPC) uses CIPG as disclosed herein, but instead is trained to approximate the closed-loop MPC simulations and thus contains no information outside of the optimal control trajectory. The third (No Parameter Groupings+DAgger) contains data from the DAgger-generated dataset that is independently normalized. In other words, the third dataset uses only the conventional machine learning approach of scaling each individual input variable to have zero mean and unit variance, rather than the approach of first creating CIPGs and then scaling in accordance with illustrative embodiments disclosed herein.

To compare the datasets, 25 RT-RNNs were trained for each dataset using various hyper-parameter combinations to find the combination that provided the highest prediction accuracy on validation data. Each dataset's best model was then tested in a control simulation containing new conditions outside of the training dataset.

There are at least two important findings from these results. First, combining the features into parameter groupings in CIPG+DAgger provides a three percentage point increase in validation prediction accuracy over No Parameter Groupings+DAgger, meaning the former approach improves the ability to fit the dataset without overfitting. While there is no significant difference in electricity cost, the improved prediction accuracy translates to significantly reduced comfort violations. Second, despite lower validation accuracy, behavioral cloning trained with DAgger has an order of magnitude better control performance than the MPC model, which was trained to approximate closed-loop MPC. The higher accuracy on the MPC dataset is somewhat misleading and does not translate to better control performance. Since it is trained on closed-loop MPC simulations the data is more homogeneous, and the indoor temperature is always within the thermal comfort limits. This contrasts with the DAgger dataset, which has data across a range of indoor temperatures, particularly from early iterations when the model does not perform well. The implication is that while it is easier to fit a more homogenous dataset, the MPC model has insufficient data to correct itself if it strays from the optimal trajectory, and the result is a model with no knowledge that comfort violations are undesirable.

In the results of the hyper-parameter grid search in terms of validation accuracy and model size described previously, the worst performers were the feed-forward neural network and random forest, each requiring high memory requirements with only marginal performance increases from more complex models. XGBoost and the LSTM RT-RNN performed similarly, while the GRU RT-RNN performed the best. Therefore, some embodiments herein are illustratively configured to utilize the GRU RT-RNN configuration with the highest validation prediction accuracy as determined in the simulations.

The optimal model configuration for the selected RT-RNN in an illustrative embodiment contains one GRU layer with 26 nodes and multiple channels corresponding to each of the parameter groupings that are indexed over the MPC control horizon ($\Pi_2$ through $\Pi_5$). The previous control values ($\Pi_6$) are input to the model through a 1-node layer with a Rectified Linear Unit (ReLu) activation function. The outputs of these layers are concatenated with the building model parameters ($\Pi_1$) and connected to a 25-node fully connected layer with a ReLu activation function. It is then connected to the output layer with sigmoid activation to give the binary control value prediction. Other training hyper-parameters in this example include use of an Adam optimizer, a batch size of 512, 24 training epochs, a model size of 106 kB and a validation accuracy of 94.5%.

Using the example RT-RNN model configuration, the control performance was analyzed by comparing it to a baseline thermostat control and the target true MPC control. The simulations were computed on a Raspberry Pi Zero, which contains a 1 GHz single-core processor with 512 MB of RAM. Behavioral cloning in some embodiments only requires 0.1% of the memory of MPC and can operate around 93,000× faster, all while maintaining a similarly low electricity cost and only a modest increase in comfort violations. Moreover, on average the Raspberry Pi, which contains more computing hardware than a typical PLC, was unable to even solve the MPC within the required time step (300 seconds).

Each building's percent improvement in electricity cost and thermal comfort was determined for behavioral cloning and MPC compared to the baseline rule-based approach. On average, MPC and behavioral cloning perform similarly, with broad improvements to both electricity cost and thermal comfort compared to the baseline. These improvements can vary significantly from building to building based on the setpoint schedules and how well the building is insulated.

Temperature trajectories for a representative sample of the buildings were determined for each of baseline rule-based control, behavioral cloning, and MPC, under various operating conditions that occur in the overall simulation, including small and large setpoint changes and small and large amounts of time when the resident is away. Similar to MPC, behavioral cloning maintains the temperature within the lower range of the acceptable thermal comfort band, while still able to effectively preheat the building in preparation for large setpoint changes. Although behavioral cloning does not contain any explicit thermodynamic equations or solve any optimization problem, it is able to generalize to new operating conditions and changing user preferences like that of MPC. Each of these setpoint schedules and building-heat pump thermodynamics were not originally included in the training dataset.

It is to be appreciated that the particular model configurations utilized in these and other simulations are only examples, and should not be viewed as limiting in any way.

The above-described behavioral cloning techniques in some embodiments are advantageously utilized in conjunction with the arrangements to be described below in conjunction with FIGS. 9 through 12.

FIGS. 9 through 12 more particularly show illustrative embodiments that are configured for harnessing decentralized demand flexibility through autonomous peer-to-peer transactions using smart contracts.

For example, a given such embodiment is illustratively configured to provide a decentralized, flexibility-as-a-curve approach which allows individual smart-home prosumers to bid a flexibility curve into a peer-to-peer electricity market within a distribution system. These flexibility curves are autonomously generated through a reinforcement learning agent. By aggregating the individual flexibility curves and considering electricity prices from a utility or other generation, an optimal real-time clearing price is determined that balances supply and demand. Prosumers then buy and sell electricity from each other or from the utility on a virtual financial layer through smart contracts that are recorded on a blockchain. System operators can also use the aggregate flexibility curve to effectively set their price in order to satisfy operational requirements.

In one such embodiment, an apparatus comprises at least one processing device comprising a processor coupled to a memory, with the processing device being configured to obtain energy usage data generated by advanced metering infrastructure of a particular energy usage location, and to generate a flexibility curve for the particular energy usage location based at least in part on the obtained energy usage data, with the flexibility curve being generated utilizing a reinforcement learning agent associated with the particular energy usage location. The processing device is further configured to provide the flexibility curve to at least one other processing device of a peer-to-peer electricity market of an electrical distribution system, wherein the flexibility curve is aggregated with additional flexibility curves generated for respective other energy usage locations utilizing respective other reinforcement learning agents associated with those respective other energy usage locations, to determine an optimal real-time clearing price for electricity in the peer-to-peer electricity market, and to execute a transaction at the optimal real-time clearing price through a smart contract that is configured to record the executed transaction on a blockchain.

The reinforcement learning agent is illustratively trained on model predictive control data using behavioral cloning, although other training arrangements can be used in other embodiments. As mentioned above, example behavioral cloning techniques are described in more detail elsewhere herein.

In some embodiments, the above-noted processing device comprises at least one IoT device in a network of IoT devices, and/or at least one smart-home controller or other type of building controller, illustratively configured to generate bids for a blockchain-based peer-to-peer energy market.

Figure 9:
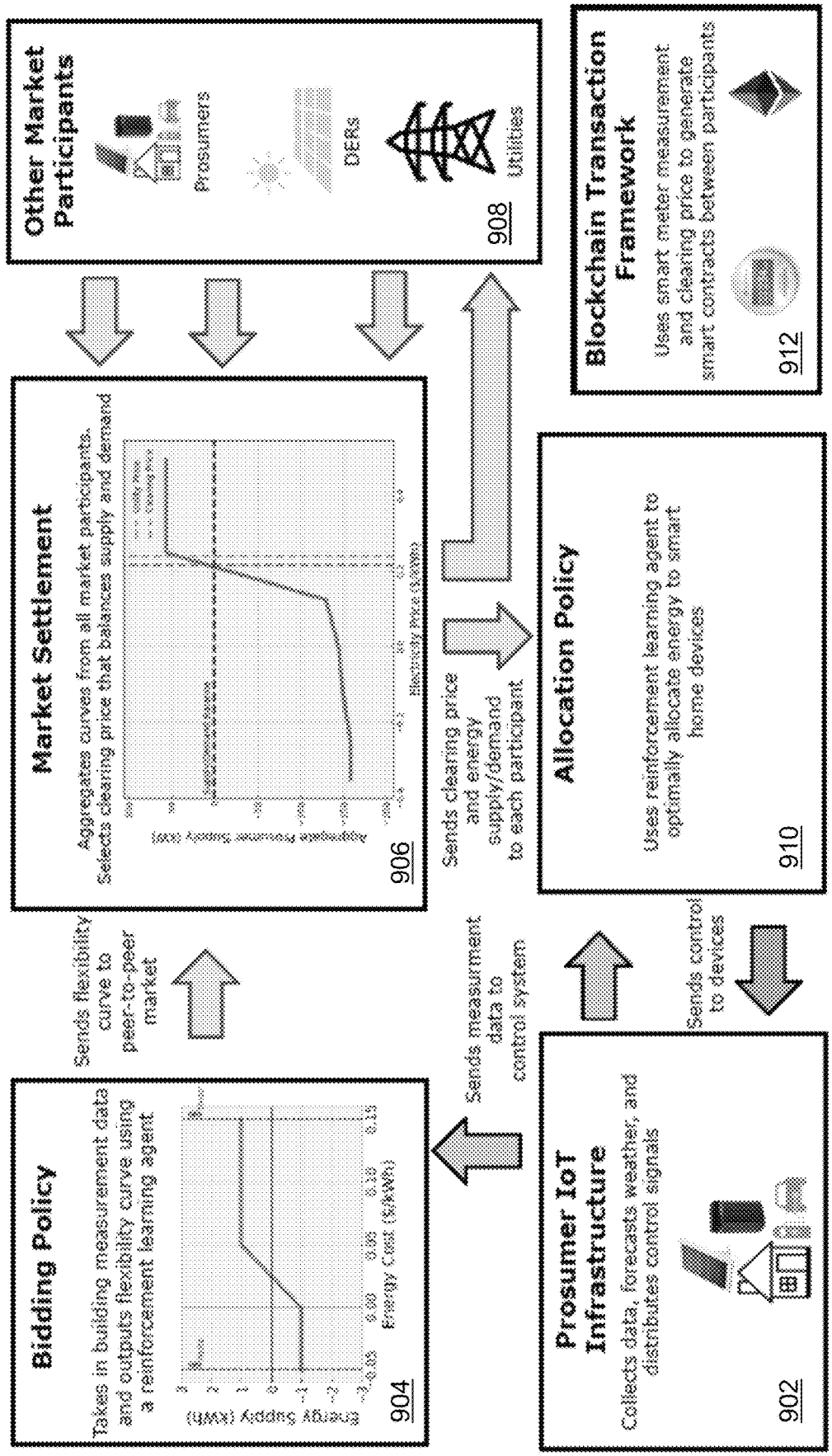
FIG. 9 illustrates the operation of an example heat pump control system with market interaction in an illustrative embodiment.

Some embodiments are configured to utilize data obtained from multiple distinct smart devices, possibly including one or more IoT devices, with such data including, by way of example, data relating to temperature, humidity, weather, device-level energy consumption, etc. Referring now to FIG. 9, an example heat pump control system 900 with market interaction comprises prosumer IoT infrastructure 902, which is illustratively configured to collect building measurement data, forecast weather, and distribute control signals. The measurement data is sent to a bidding policy component 904, which takes in building measurement data and outputs a flexibility curve using a reinforcement learning agent of the type described elsewhere herein. The bidding policy component 904 sends the flexibility curve to a market settlement component 906 of a peer-to-peer (P2P) market. The market settlement component 906 aggregates flexibility curves from all market participants, and selects a clearing price that balances supply and demand. Other market participants 908, illustratively including additional prosumers, distributed energy resources (DERs) and one or more utilities, also provide inputs to and otherwise interact with the market settlement component 906.

The market settlement component 906 sends the clearing price and energy supply/demand information to each participant. In the case of prosumer IoT infrastructure 902, this illustratively occurs via an allocation policy component 910 that uses a reinforcement learning agent to optimally allocate energy to smart home devices. The allocation policy component 910 sends control signals in accordance with the optimal energy allocation to one or more smart home devices of the prosumer IoT infrastructure 902.

In some embodiments, the bidding policy implemented in bidding policy component 904 is specific to each building and each building bids its optimal flexibility curve considering its current and forecasted measurement data.

As indicated previously, the market settlement component 906 illustratively selects the price that balances supply and demand for all participating curves in the market. The clearing price and amount of energy bought or sold is sent to the allocation policy component 910, which determines the optimal allocation of energy among the various smart home devices. This optimal allocation is illustratively conveyed to the prosumer IoT infrastructure 902 in the corresponding prosumer building via control signals.

Finally, a blockchain transaction framework 912 uses the final smart meter measurement and clearing price to generate smart contracts between market participants.

Figure 10:
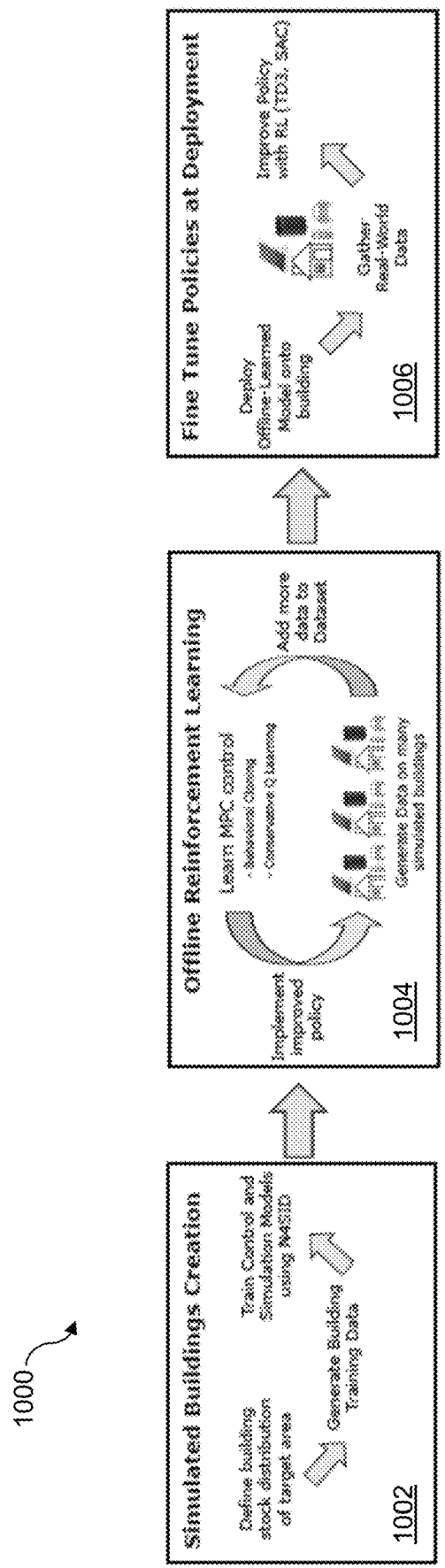
FIG. 10 is a flow diagram of an example process of training a control policy in an illustrative embodiment.

FIG. 10 shows an example process 1000 of training a control policy in an illustrative embodiment. The process includes a simulated buildings creation phase 1002, an offline reinforcement learning phase 1004 and a fine tune policies at deployment phase 1006, which illustratively proceed serially as shown. First, in the simulated buildings creation phase 1002, buildings that match the target building distribution are generated using ResStock, and control models are derived from simulated data. Next, in the offline reinforcement learning phase 1004, a generalized control policy is pretrained using offline reinforcement learning through methods such as Behavioral Cloning or Conservative Q-Learning. Finally, in the fine tune policies at deployment phase 1006, the pretrained model is deployed onto the actual building and is fine-tuned using the real-world data using methods such as Twin-Delayed Deep Deterministic Policy Gradient (TD3) or Soft Actor-Critic (SAC).

Some embodiments disclosed herein provide a fully decentralized, peer-to-peer transactive energy system that can be regulated by a central utility to satisfy distribution system constraints and maintain grid reliability without violating privacy or local autonomy. In contrast to previous transactive energy system regulation mechanisms, which often require personal data transfer or specific types of local policies and equipment, illustrative embodiments can be implemented in a manner that is agnostic to both local models and policies, making them highly scalable and compatible with complex local optimal control policies like MPC or reinforcement learning. Additionally or alternatively, some embodiments provide an expanded regulated transactive control approach that include energy prosumers, which leverage rooftop solar and vehicle-to-grid capability.

As described in more detail elsewhere herein, some embodiments provide a device-agnostic MPC arrangement for prosumers that bids a flexibility curve into a peer-to-peer energy market, representing their willingness to buy or sell electricity at various electricity prices. These flexibility curves are illustratively collected through a market clearing system that enables direct transactions for energy between prosumers, local DERs, and one or more utilities. At the market clearing price, each agent will consume or produce the required energy so that the supply and demand are balanced. Moreover, these flexibility curves can be aggregated together to quantify the demand's sensitivity to changes in electricity price. High levels of privacy and autonomy can be preserved in illustrative embodiments because all building control systems and models can be hosted and operated locally, and specific occupancy or device-level energy use need not be collected. The utility cannot directly control individual buildings, and the only information shared is the building's sensitivity to electricity price and their energy consumption, which is already shared with the utility.

Additionally or alternatively, illustrative embodiments provide a regulation mechanism that helps a utility shape the aggregate power profile using a surcharge. This surcharge acts as a positive or negative offset from the utility's base electricity price, which can reflect the wholesale electricity price at that time. Whenever the peer-to-peer market is not self-sufficient and relies on electricity from the utility, the utility has pricing power and can use the surcharge to shape the dynamics of the net electricity demand. By looking at the sum of the agents' flexibility curves, the utility has a direct quantification of the flexibility of the aggregate system, allowing it to set its surcharge to accurately achieve grid reliability objectives like peak load reduction, ramp reduction, and encouraging local energy consumption.

These and other illustrative embodiments provide an accurate and efficient regulation method that is facilitated by the predictive nature of the local controller. Over time, local controllers learn to avoid positive surcharges by shifting energy consumption away from times where the system would violate constraints. As a result, the local controller indirectly learns the broader dynamics of the peer-to-peer market by predicting the price dynamics. Since local controllers anticipate additional surcharges during peaks, the load-shift is done in a continuous manner, without the additional peaks from warm-up or recovery period effects that accompany typical tiered time-of-use rates or critical peak pricing.

Illustrative embodiments of the disclosed control methods were tested on a simulation framework that provides an improved scalable method for simulating high fidelity multi-agent building systems in accordance with additional aspects of the disclosed arrangements. The simulation framework advantageously allows both replication and scaling of building control studies, particularly when they are high-fidelity.

More particularly, the simulation framework comprises an analysis tool that combines a number of data sources to provide a customizable multi-agent building system simulator with both high fidelity and high scalability. A large number of buildings with structural characteristics representative of a specific geographical location are first simulated using EnergyPlus, and then the resulting simulation data is used for developing thermodynamic building models and rooftop solar models. These buildings are augmented with real occupancy, vehicle use, and energy use data to improve building diversity and realism. Each data source generally contains data from many different geographical regions and demographics, making it easy to generalize this methodology to new operating conditions.

Additional aspects of transactive energy systems in illustrative embodiments will now be described. In a transactive energy system, the management of generation, consumption, and other grid services is achieved through economic or market-based constructs. While this is already true for the generation side of electricity in wholesale markets, transactive energy systems generally refer to the case where the entire market—both consumers and producers—react to economic signals. In many transactive energy approaches, demand-side agents have specific consumption models that allow agents to specify their preference for electricity consumption. For example, thermostatically controlled loads (TCLs) can define a price threshold for when they will turn on based on their distance from the setpoint. While most transactive energy system approaches operate as energy markets, some approaches also use capacity markets that allow agents to trade demand flexibility for products like ancillary services or demand response.

If a transactive energy system contains prosumers, who can both produce and consume electricity, the system has energy flow between peers, making a peer-to-peer energy market feasible. Electricity flows based on line impedance, meaning that a consuming agent will receive energy from a nearby producing agent, even if both agents are in a conventional financial contract with a utility. However, this physical energy transfer between peers, such as in current net metering structures, is often ignored without a financial layer that distributes payments based on the price of electricity. Thus, a peer-to-peer market generally has a financial layer that allows participants to trade energy with each other or a more centralized third party, such as a utility. This financial layer is typically multidimensional and varies based on multiple dimensions, such as, for example, a temporal dimension, a spatial dimension, a contractual dimension, and a price-clearing dimension, where the temporal dimension refers to determining the amount of time between the agent's bid and when it delivers or consumes the bid electricity, the spatial dimension refers to differences in prices based on location due to grid topology, the contractual dimension refers to the financial system that determines how contracts are generated to match buyers and sellers, and the price clearing dimension refers to determining the price at which contracts are carried out and how the market clears.

In some embodiments, the management of a distribution network is considered a multi-agent resource allocation problem. The network illustratively comprises of a large number of small agents (e.g. buildings, EVs, DERs) and a small number of large agents (e.g. the utility or other large-scale generation facilities). Each of these agents has its own cost function that it wishes to optimize subject to operational constraints. For buildings, this function could be thermal comfort, while for the utility, the function could be the cost of generation and satisfying ramping and congestion constraints. This global optimization problem can be written as, $$J = \sum_{i=0}^{B} f_i(r_i, x_i) \quad \min_{r_i} \quad (33a)$$

subject to $$g_i(r_i, x_i) = 0 \quad (33b)$$

$$h_i(r_i, x_i) \le 0 \quad (33c)$$

$$\sum_{i=0}^{N} r_i = 0 \quad (33d)$$

Here, B represents the set of agents indexed by i, and each agent has an initial state $x_i$, a power consumption $r_i$, cost function $f_i$, and constraints $g_i$ and $h_i$. Based on the "copper plate" assumption of the network topology, Equation (33) above enforces the balance in electricity supply and demand across the network.

While Equation (33) can be centrally optimized, computational difficulties arise when large numbers of agents are used. Nevertheless, grid operators typically prefer centralized optimization so that they can guarantee reliability. In the centralized optimization scenario, agent cost functions and constraints are often simplified or even ignored, causing significant inefficiencies. However, there have been many decomposition and distributed optimization methods proposed that can use local computation to solve these large-scale resource allocation problems in a more computationally efficient manner, without compromising optimality.

If Equation (33) is convex, microeconomic theory shows that there exists a single clearing price p* of the resource r such that the resource constraint (33d) is satisfied. This clearing price creates an optimal resource allocation r* that is Pareto optimal. Thus, the global optimization problem can be decomposed into a set of local optimization problems of the form, $$\min_{r_i} \; J_i = p^* r_i + f_i(r_i, x_i) \tag{34a}$$

subject to $$g_i(r_i, x_i) = 0 \tag{34b}$$

$$h_i(r_i, x_i) \leq 0 \tag{34c}$$

where p* is the clearing price that balances supply and demand in accordance with the resource constraint (33d).

Illustrative embodiments disclosed herein provide a regulated peer-to-peer energy market control system that can solve Equation (33) in a computationally-efficient, decentralized, privacy-preserving, and reliability-focused manner.

Figure 11:
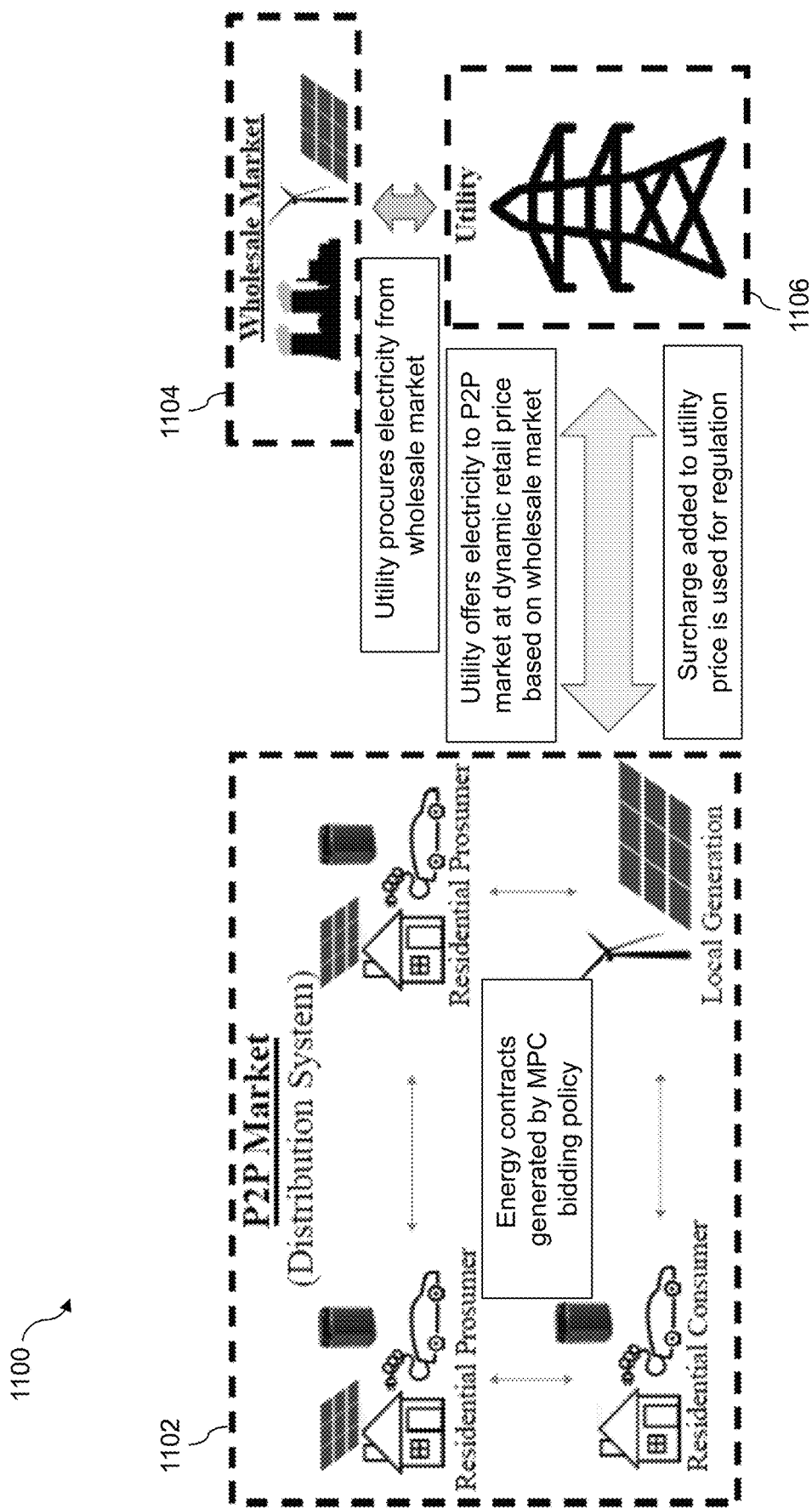
FIG. 11 shows an example regulated peer-to-peer (P2P) energy market system in an illustrative embodiment.

FIG. 11 shows an example regulated peer-to-peer (P2P) energy market system 1100 in an illustrative embodiment. The P2P energy market system 1100 comprises a P2P market 1102, a wholesale market 1104 and a utility 1106. Agents in the P2P market 1102 can either be prosumers, consumers, or only generation. The utility 1106 supplies any excess electricity demand at a dynamic price related to its costs in the wholesale market 1104. It can then use a surcharge, described in more detail below, to offset this price and regulate the demand.

The P2P energy market system 1100 implements a prosumer control system design, also referred to as a local prosumer control system, a local control system or a local controller, that will now be described in additional detail.

The local prosumer control system is designed to be device-agnostic such that it can scale to many kinds of DERs, such as electric vehicles, distributed solar, battery storage, and flexible demand like heat pumps and water heaters. These DERs could either be in isolation (e.g., an EV at a public charging station), or grouped together in a smart building.

As shown in FIG. 11, various example configurations of prosumer or consumer agents can buy or sell electricity to each other in the P2P market 1102. These agents include residential prosumers, residential consumers and local generation facilities, each comprising various types of devices or other local infrastructure.

A multi-stage MPC framework is illustratively utilized for agents to create bids for the transactive energy system. The multi-stage MPC framework in some embodiments comprises first and second stages, where the first stage creates an individual bid curve used for market clearing, while the second stage determines the optimal control at the market clearing price for each device controlled by the agent. In general, most DERs can be modeled as a form of variable setpoint regulation. Heat pumps and water heaters typically maintain a temperature around an occupancy-based setpoint. Electric vehicles and battery systems typically provide a minimum state of charge when the resident leaves or in the case of external power loss. User preferences around the setpoint are also often asymmetric. For example, being warmer than the setpoint during winter may not be penalized the same as being too cold. Similarly, an EV should not be penalized for exceeding its charge setpoint. Thus, the setpoint tracking objective is modified to support asymmetric penalties. Note that while different DERs can be modeled in ways that may be more intuitive, this consolidated, setpoint regulation structure improves computational efficiency and implementation simplicity when building and solving the optimization problem for many DERs.

In the first stage, each agent uses this model to develop a flexibility curve for bidding by solving the MPC problem for a set of potential electricity prices at the current timestep. This curve gives the agent's optimal net power consumption or production at various realizations of the electricity price. As described previously herein, this curve is the Pareto optimal curve of the power consumption or production with respect to varying electricity prices. The generalized, modified setpoint tracking MPC problem to obtain this curve for each agent $i \in B$ can be formulated as, $$\min_{r_{ijk}} \; J_i = \sum_{k=0}^{K} \sum_{j=t}^{t+N} \left( p_{ijk} r_{ijk} + Q_{ij}^+ y_{ijk}^+ + Q_{ij}^- y_{ijk}^- \right) \tag{35a}$$

subject to $$x_{ijk} = A_{ij} x_{ijk} + B_{ij} u_{ijk} \tag{35b}$$

$$y_{ijk} = C_{ij} x_{ijk} + C_{ij} u_{ijk} \tag{35c}$$

$$r_{ijk} = 1^T u_{ijk} \tag{35d}$$

$$x_{i0k} = x_i^{(0)} \tag{35e}$$

$$\underline{u}_{ij} \leq u_{ijk} \leq \overline{u}_{ij} \tag{35f}$$

$$\underline{y}_{ij} - \overline{y_{ijk}} \leq y_{ijk} \leq \overline{y}_{ij} + y_{ijk}^+ \tag{35g}$$

Here, A, B, C, and D represent state-space matrices for the entire system that can be obtained via known system identification methods. The MPC horizon is given by N. The vectors x and y give the state and measurements of the system, respectively. The initial state is given by $x_i^{(0)}$ and can be estimated using a Kalman filter or other suitable estimation technique. The power consumption or production for each of the agent's DERs is given by u and must remain within the upper and lower bounds, $\overline{u}$ and $\underline{u}$, respectively. Similarly, the measured values y must remain within the upper and lower bounds, $\overline{y}$ and $\underline{y}$, with the addition of upper and lower penalty variables, $y_{ij}^+$ and $y_{ij}^-$. This is a soft constraint that is penalized by the customizable cost matrices $Q^+$ and $Q^-$. The net power transfer to the grid is given by r, where positive r is defined as a power demand from the grid.

Equation (35) implements a setpoint tracking MPC formulation that advantageously includes a k index over a set K of feasible price trajectories. By solving the control problem for a range of feasible price trajectories in the set K, the solution provides a curve of the power consumption with respect to electricity price. At each time step, each agent will obtain this curve by solving Equation (35) and then bid the resulting flexibility curve into the peer-to-peer market. After the market clears and peer-to-peer contracts are generated, the agents receive a clearing price and a required power consumption or production to satisfy their contract.

In the second stage, the optimal control can then be obtained by selecting the control $U_{i0k}$ corresponding to the index where $P_{i0k} = p^*$, with interpolation as needed. The optimal control $u_{i0k}$ determines the power for each device in the building, in that each DER will produce or consume electricity as it is able such that the net power equals $p_{i0k}$.

Equation (35) can be solved via linear programming, or mixed-integer linear programming depending on the system model and computational resources available. It is important to note that even with a reformulated, quadratic objective function, an analytically derived explicit form of this control policy is typically not feasible. The price $p_{ijk}$ can take negative values in the case of high solar production, meaning that the control cost matrix is not positive semi-definite and disqualifying typical linear quadratic regulator approaches. Moreover, given the long time horizons and the large number of potential occupancy schedules, explicit MPC approaches can be computationally intractable. If local computational resources are a concern, reinforcement learning approaches such as behavioral cloning can be implemented in the manner described elsewhere herein in order to reduce the online computational costs.

It should be noted that Equation (35) differs from Equation (34) in that the former depends on a receding horizon N, requiring knowledge or predictions of future disturbances. However, Equation (35) can be reformulated using block matrices to implicitly encode the time dependence within the state-space matrices to match the form of Equation (34). Disturbances like weather, setpoints, and occupancy are assumed to be either perfectly forecasted or defined in advance by the user. However, the price and surcharge are dependent on the system's behavior itself, making it a function of the resource variable r.

To account for this, a price prediction model is implemented that seeks to predict a deterministic price forecast under the system's current control policy. In other words, the dynamics of market clearing and utility regulation can be approximated by a price prediction model based on historical data. Decentralized agents coordinate indirectly, by predicting what the aggregate market dynamics will be. Therefore, the change in optimality of the decentralized problem compared to the centralized version depends on the error between predicted price forecast and the realized price trajectory.

In some embodiments, the XGBoost algorithm is used to generate a model that forecasts future prices following the equation, $$\hat{p}_{jk} = f_p(s) \qquad (36)$$

where s represents the state of the system that influences price. Included in s are autoregressed past measurements of solar irradiation, outdoor temperature, outdoor relative humidity, electricity price, and normalized net power consumption of the P2P market. This model can be trained using historical data under the system's control policy, and should be updated regularly as system behavior changes.

It should be noted in this regard that electricity price prediction can be complex. For example, prices can be non-stationary as the mix of DERs and generation sources change. Moreover, the addition of surcharges and bidirectional interaction in a transactive energy system can increase this non-stationarity. Additional or alternative price prediction techniques can therefore be used in illustrative embodiments.

In some embodiments, when the P2P market is not self-sufficient, it may need to buy or sell electricity using outside sources. As shown in FIG. 11, the utility 1106 or an associated distribution system operator can provide this excess electricity, similar to the current retail market structure. Since these parties procure electricity from the wholesale market 1104, they are assumed to offer electricity at a dynamic electricity price that reflects their cost to procure electricity. For example, this structure could mimic the Location-Based Marginal Price (LBMP) plus any additional costs related to maintenance and upkeep of the distribution system. This price is denoted herein as the "utility price." Just like every other agent, the utility provides a curve that they bid into the market. In some embodiments, this curve is assumed to be a step function that supplies any required electricity demand and buys any excess electricity supply at the utility price. This curve can be altered to shape electricity demand using the regulation mechanisms described elsewhere herein.

As is also shown in FIG. 11, the utility 1106 still serves as an intermediary between the wholesale market 1104 and the retail markets associated with P2P market 1102. This arrangement serves at least two functions. First, the difference in wholesale and retail price provides revenue for the distribution system operator to maintain and upgrade the distribution system. Second, it prevents large numbers of DERs from directly interacting with the wholesale market 1104, which relies on complex optimization algorithms like Optimal Power Flow that cannot support exceedingly large numbers of participants.

A uniform pricing model determines a clearing price at each timestep for the P2P market 1102. This clearing price is the price $p^*$ at which the resource constraint (33d) is satisfied. In other words, $p^*$ is the price where the sum of all market participants' bid curves crosses zero, as will be described in more detail below in conjunction with FIG. 12.

With regard to utility regulation, since the utility is assumed in some embodiments to supply all excess electricity at the utility price, the utility price represents a maximum price for the P2P market. This aspect gives the utility the ability to regulate the price of electricity on the P2P market, preventing price gouging or gameplaying from smaller participants.

It also allows the utility to regulate the net power demand and production from the P2P market. Regulating this net power flow is incredibly important, particularly when price-reactive agents comprise a large percentage of the system. Consider a utility price purely based on the LBMP profile. If each agent correctly predicts a large upcoming price increase, they will all simultaneously charge their energy storage just before the price increase, creating new, higher peaks on the local energy grid and potentially causing violations of congestion constraints. Similarly, if the utility price is high, all of the agents may discharge their energy storage, causing a net power outflow from the P2P market, potentially causing grid management issues.

While the system response to dynamic pricing schedules is not typically known in pure price-reactive systems, the concept of flexibility curves gives the utility full visibility of how the P2P system will respond to changes in price. Therefore, the utility can offset its price to harness the decentralized demand flexibility to perfectly satisfy reliability constraints. This offset is defined as a surcharge which can be positive or negative to discourage or encourage power consumption, respectively.

Figure 12:
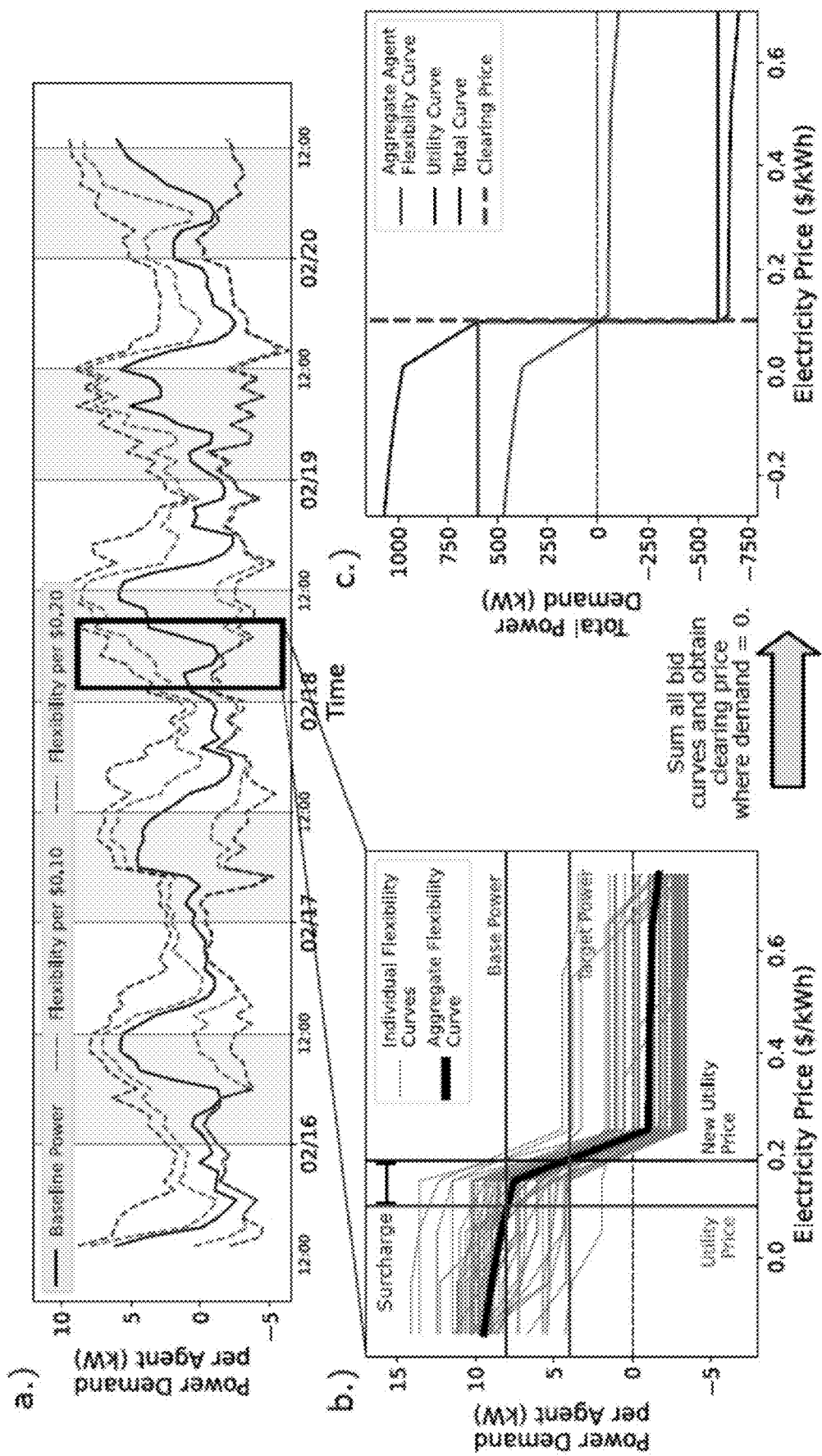
FIG. 12 illustrates a sample power and flexibility trajectory for a population of price-reactive agents in an illustrative embodiment. The figure includes separate parts denoted as (a), (b) and (c).

FIG. 12 illustrates a sample power and flexibility trajectory for a population of price-reactive agents in an illustrative embodiment. The figure includes separate parts denoted as (a), (b) and (c), with part (a) showing power demand per agent over time. At each timestep, agents bid instantaneous flexibility curves as shown in part (b). These flexibility curves provide a quantification of the demand flexibility as a function of change in electricity price, which can be tracked over time and is shown by the dashed lines in part (a). Based on the aggregate flexibility curve in part (b), the utility can change its electricity price and bid curve by a surcharge to harness the demand flexibility and operate at a new target power. The new clearing price is then achieved in part (c) by summing the agent curves with the new utility curve and selecting the price where this total curve crosses zero.

The process for defining a surcharge to achieve a target net power consumption as illustrated in FIG. 12 is as follows:

1. At each time step, each agent bids a flexibility curve into the P2P market by solving Equation (35). Thin grey lines in part (b) of FIG. 12 represent each agent's flexibility curve, while the solid black line represents the average of all agent curves. This average curve provides a function of the power consumption or production per agent as a function of the market price.
2. The utility offers electricity at the utility price, which can be a fixed price schedule or one based on the LBMP. This price would cause the P2P market to consume electricity from the utility at the base power, shown in part (b) of FIG. 12.
3. Now suppose that the utility would like to reduce this power consumption to a specified target power for demand response purposes. The average flexibility curve gives a direct quantification for the change in price required to achieve this target power.
4. This change in price is defined as a surcharge, which is used to dispatch demand flexibility. This surcharge alters the utility's bid curve, shown in FIG. 12 to offer electricity at a new price.
5. The market clearing process, shown in part (c) of FIG. 12, adds the agent demand curves to the utility and generation supply curves to create a total curve. The clearing price is the point where the total curve crosses zero, which now occurs at the new utility price.

Part (a) of FIG. 12 shows the quantification of the instantaneous upwards and downward demand flexibility with respect to changes in electricity price. Upward flexibility refers to the ability for buildings to increase their load, which for example is useful for when there is excess solar production. Downward flexibility refers to the ability for loads to decrease their load, which is useful for high peak load times. The baseline power is a sample demand trajectory of price-reactive agents under no regulation and a real-time electricity price. The different shades of dotted lines show the potential flexibility, or the change in demand as a function of a change in electricity price by $0.10 and $0.20/kWh, respectively. The trajectory shows that flexibility can change drastically over the course of the day as occupancy and weather change.

It should be noted that dispatching this flexibility is not without consequence. Each agent has a finite amount of energy storage available, and as a result, dispatching flexibility requires higher and higher surcharges depending on the length and magnitude of the flexibility interval. Thus, there is a tradeoff between higher surcharges and the system's potential flexibility. However, over time, this surcharge will begin to be anticipated by each agent's price prediction model, encouraging improved load shifting performance and higher amounts of flexibility.

In some embodiments, utilities may have certain regulation objectives that they may want to impose on the P2P system. These illustratively include, for example, encouraging local consumption and peak limiting.

With regard to encouraging local consumption, in many cases, prosumers may produce more electricity than they use. In conventional net metering approaches, the utility buys back all electricity, sometimes at a discounted price. This system is suboptimal for all parties. Utilities are uncertain of how much electricity they will need to buy, and sometimes impose penalties for installing local generation. Moreover, current grid hardware may be unable to support backflows of electricity from the distribution system.

In a conventional net metering system without a peer-to-peer energy market, the local, real-time electricity price is not affected by excess local solar production, meaning that there is no economic incentive for local consumption of electricity. In high production communities, excess electricity may be put on the transmission system, which introduces additional losses and inefficiencies. However, even in a peer-to-peer market system, if the utility is the ultimate source and sink for excess electricity demand or production, its price will saturate the market and will always be the clearing price. The system would thus operate the same as a price-reactive system, since the market price is always equal to the utility price.

Therefore, to promote more efficient, local electricity consumption and prevent backflows of electricity onto the transmission system, the utility in some embodiments disclosed herein is configured to alter its bid curve to not to buy back electricity, or to buy it back only at a very low price. This creates a local P2P market, where prosumers will sell to their peers instead of to the utility. The market price of electricity drops when local generation comes online, encouraging local consumption of electricity and allowing non-prosumers to share in the benefits of their community's renewable generation.

Additionally or alternatively, illustrative embodiments can be configured to limit peak load. For example, in some embodiments, since LBMP profiles can synchronize the behavior of local predictive controllers, larger peaks and valleys in demand can occur. These larger peaks cause issues with grid hardware and the transmission system, as they start to affect constraints on transmission lines.

In order to prevent such situations, illustrative embodiments herein configure the utility to use a surcharge to impose a cap on the net peak demand from the P2P market, as will now be described. Referring to part (b) of FIG. 12, if the base power exceeds the target constraint, a surcharge is added to the utility price to reduce the base power to the target constraint. This surcharge is the minimum additional price that keeps the net peak demand under a target constraint. Since the power flexibility with respect to price is known, this surcharge essentially becomes an informed, more efficient and quantifiable version of critical peak pricing. Three target peak constraints were tests in simulations, namely, 3.0, 4.0, and 5.0 kW/agent, although other values could be used.

As indicated previously, a high-fidelity simulation framework was used to implement illustrative embodiments of the P2P system. This framework brings together a number of simulation tools and data sources to create a scalable multi-agent system simulation framework capable of representing a range of building stock distributions, DER penetrations and weather conditions. A scalable simulation framework like this is vital for repeatability and the ability to generalize and test in new operating conditions.

First, fully electrified residential buildings are generated for simulation using a novel process that extends the ResStock analysis tool. ResStock includes a library that allows for large scale simulation of buildings in EnergyPlus that are statistically generated from survey data from the Residential Energy Consumption Survey (RECS). As a result, buildings with representative structural characteristics can be simulated with high fidelity. Moreover, rooftop solar panels can be added to these buildings and orientation effects can easily be modeled in conjunction with the building thermodynamics.

However, ResStock is designed primarily for parametric studies involving energy efficiency measures, and thus is not immediately suitable for novel system designs like peer-to-peer energy systems or advanced controllers like MPC. Therefore, simulation data for buildings generated in ResStock are used in some embodiments herein to develop faster, more generalized models for use in control. For building thermodynamics, the N4SID system identification algorithm was used to model the indoor temperature as a function of outdoor temperature, outdoor humidity, direct and diffuse solar irradiation, building energy use, and heat pump output. Heat pump COP and power consumption are modeled with linear models, and are done per building so that heat pump size and efficiency are representative of both building floor area, weather conditions, and the type of systems that exist in the building stock. The rooftop solar production was modeled using the XGBoost algorithm based on time of day and diffuse and direct solar irradiation.

In addition, ResStock contains simplified thermostat setpoint schedules that follow repeatable patterns and are not necessarily tied to geographical location. Therefore these stock schedules are replaced with real data from smart thermostat owners in the Ecobee DYD dataset that are representative of the specific geographical location. Similarly, electricity consumption was replaced with data from the Pecan Street dataset which contains individual building electricity use from residential buildings across the US.

It is further assumed with regard to EV modeling that each of the buildings also contains a single EV. EV efficiencies and battery capacities were sampled from five of the top selling electric vehicles in the US. These EVs are assumed to be vehicle-to-grid capable and can serve as battery energy storage for the home when necessary. To prevent battery damage from repeated fast charging and discharging, each house is assumed to have a Level 1 (3.7 kW) EV charger. Agents are simulated to take daily trips based on occupancy data from an example distribution, and trip lengths were obtained from the Vehicle Energy Dataset (VED), a large-scale, real-world dataset containing hundreds of thousands of miles of vehicle energy usage.

Illustrative embodiments were simulated in a case study for 50 single family homes located in New York State, using the simulation framework described above. To generate buildings representative of New York State, ten years of simulation data were generated to train the N4SID for building thermodynamics, and linear autoregressive models for the heat pump COP and rooftop solar production.

Results show that the linear, reduced-order models can generally mimic the behavior of the higher-fidelity EnergyPlus models, while also being suitable for use in more complex control like MPC. Moreover, these reduced order models are based on actual building characteristics that are representative of location-specific building stock.

The simulations were run for a month in the heating season (January) for the year 2019. The month of January is one of the most challenging for fully electrified systems in cold climates, since solar production occurs at opposite times of the highest heating load. The utility is assumed to offer a utility price that matches the LBMP profile for New York City also for the year 2019. The wholesale price was scaled so that its average represents the average retail electricity price in New York City. Weather data for 2019 was obtained from the National Solar Radiation Database.

Thermostat setpoint schedules and occupancy patterns were sampled from real data from New York residents in the Ecobee DYD dataset for the year 2019.

The utility regulation and agent bidding policy of illustrative embodiments were compared to two baseline policies. The tested control policies more particularly included rule-based control (RBC), price-reactive MPC (PR-MPC) and peak limiting MPC. The RBC and PR-MPC control policies do not utilize the P2P market aspects, do not encourage local consumption, and do not have a utility constraint or contain values. The peak limiting MPC utilizes the P2P market aspects, encourages local consumption, and has a peak load utility constraint with example constraint values of 3, 4 and 5 kW/agent.

RBC refers to the base, non-P2P scenario where local controllers do not perform any optimization. The heat pump maintains the indoor temperature as close to the setpoint as possible using a typical feedback controller. The EV begins to charge to full capacity as soon as it is plugged in. There is no bidding or price reactivity, and thus the controller should only depend on the occupancy and setpoint schedules.

PR-MPC uses MPC to respond to the dynamic utility price. The utility is assumed to supply and buy all electricity at the utility price. PR-MPC also contains no bids, as the MPC controller only reacts to the utility price through one-way communication. However, while PR-MPC contains no bids, its ultimate system behavior functions in the same way as an unregulated P2P market. If the utility is willing to both buy and sell all excess electricity at the utility price, then the utility price will always act as the clearing price. As a result, local controllers, which depend on the price signal, will compute the same optimal control.

In a purely unregulated market where agents buy and sell electricity based on the dynamic electricity price, the utility is assumed to be ultimate source and sink of electricity, buying and selling all net electricity from the community at a dynamic price based on the location-based marginal price profile.

If the retail price is only based on the generation cost of electricity (e.g., the location-based marginal price), then there is a substantial economic motivation to use residential DERs to react to the dynamic electricity price. It was found that savings from shifting load and selling excess electricity can cut the monthly electricity cost almost in half, from $360 per month to only $187. While this reduction seems beneficial from an energy efficiency point of view, as the percentage of customers that use price-reactive controls rises in a community, significantly different system-level dynamics emerge. For example, the peak load from the community increases by 40% and the maximum ramp rate increases by 400%. Additionally, in this simulated arrangement, far more electricity is sold back to the grid, instead of being stored or used locally, decreasing grid efficiency.

It was also found that, without use of the techniques disclosed herein, rapid changes and high peaks in electricity demand occurred as a result of changes in price. Even small changes in price can cause rapid changes in electricity demand. Due to this harmful emergent behavior, grid infrastructure costs will likely rise to expand distribution system constraints like congestion. In addition, the net demand becomes more unpredictable with vast shifts depending on the electricity price profile, making it more difficult for a utility to manage and regulate. As a result, these increased costs will be passed on to retail customers, eroding the savings they get from shifting load.

Illustrative embodiments overcome these and other drawbacks through the disclosed implementations supporting regulated peer-to-peer market system behavior.

For example, the utility surcharge implemented in illustrative embodiments herein overcomes the above-noted negative distribution-level effects by regulating the peer-to-peer market structure to encourage self-consumption of electricity and limit peak load.

The simulations of example peak limiting MPC arrangements, illustratively, utilizing the P2P market aspects, encourages local consumption, and has a peak load utility constraint with example constraint values of 3, 4 and 5 kW/agent, provided significantly improved results relative to the other two control policies.

First, in the regulated P2P market, all excess generation is used or stored within the community rather than being put on the transmission system. This benefit is most evident on days that have a combination of higher solar production and lower demand. The net electricity demand from the community illustratively goes to zero, as the market clearing price for electricity drops significantly.

Second, the peak load can essentially be capped through the surcharge regulation system disclosed herein. Power trajectories flatten when they hit the peak constraint, as increases in electricity price dispatch the demand flexibility to shift load away from peak times. The benefit of the predictive controller is clearly evident in the simulation results. Compared to the unregulated PR-MPC, the net load increases much earlier, often in the middle of the night, as agents precharge their available energy storage (either through the building's thermal mass or the EV battery). As a result, local controllers are able to predict the overall system's dynamics and can coordinate to not exceed system-level constraints in aggregate.

Third, loads tend to be able to be shifted by up to 12 hours for the tightest peak load constraint. However, an exact quantification is not easily determined due to the nonlinearity of the power consumption dynamics and the dependence on many different factors like weather, occupancy, and electricity prices. Determining the amount of time that loads can be shifted is not necessarily required though to impose the constraint. For example, as the loads are shifted longer, it may require a higher and higher surcharge, but it can still shift loads as necessary for most cases. Nevertheless, for planning purposes it is useful to know the full capabilities of the system, especially around edge cases, and prediction of the flexibility over time can be implemented in other embodiments.

In the simulations, while the unregulated market drastically increases peak loads and ramp rates compared to the baseline, the peak regulation constraints are able to mitigate this negative effect. Peak loads are almost perfectly satisfied, with small violations likely due to prediction inaccuracies. Incidentally, ramp rates are also significantly reduced as a byproduct of peak load reduction, nearly approaching the rule-based control baseline. Finally, excess energy is eliminated, encouraging extra produced electricity to be consumed locally.

However, regulation is not without cost. compared to the unregulated PR-MPC market, energy costs, energy use, and surcharge costs rise significantly with tighter constraints. For example, in the simulations, generation-related costs (without surcharges) were found to increase by 29%, 35%, and 48% for the 5.0, 4.0, and 3.0 kW/agent peak constraints, respectively. This increase makes sense, as the utility is preventing agents from operating to optimize generation-related electricity costs in order to satisfy grid-reliability constraints. There is therefore a tradeoff between preventing additional grid infrastructure costs and lowering generation-related electricity costs. Similarly, energy use was also found to rise, albeit more modestly, as tighter constraints force agents to deviate from the unconstrained energy optimal control. Finally, the marginal cost of peak load reduction also increases with tighter constraints, as the reduction from 4.0 kW/agent to 3.0 kW/agent requires significantly higher changes in surcharges.

In most cases, utilities are publicly regulated companies, meaning that the revenue they make from selling retail electricity can only provide them with a certain rate of return after paying for maintenance and for electricity in the wholesale market. This setup means that while surcharges may drastically increase the price, electricity generation costs are still far below that of the baseline RBC policy. Since this increased generation cost efficiency and reduced grid infrastructure costs lowers overall utility expenses, then their collected revenue will also decrease. As a result, the average retail electricity price should also decrease for all customers. Additionally, since surcharges increase utility revenue, they can be used to further lower overall retail electricity prices. In this way, surcharges can be used as regulation mechanism without raising average electricity prices for end users.

Illustrative embodiments described above in conjunction with FIGS. 9 through 12 provide a decentralized, peer-to-peer transactive energy system structure that allows a utility to have regulating authority. Through the concept of transactive control, the utility can harness demand flexibility without compromising user autonomy and privacy. The disclosed techniques in some embodiments are also computationally efficient, using decentralized local controllers that can operate in parallel with one another, rather than a centralized optimization problem with many decision variables. Moreover, such embodiments can avoid problems such as unintended emergent behavior that occurs on a regional level through load synchronization, creating higher peak loads, higher ramp rates, and higher rates of surplus energy transferred to the transmission system.

In some embodiments, a multi-stage MPC for distributed energy resources is configured to bid into a peer-to-peer market, and a method is provided for utilities and/or distribution system operators to use these bids for regulation. Such embodiments can be advantageously configured for encouraging local consumption of electricity, limiting peak load, and limiting ramping constraints. Simulation results performed for illustrative embodiments show that these grid reliability objectives can be readily achieved by harnessing decentralized demand flexibility through a surcharge mechanism.

Other embodiments can be configured to determine the magnitude of each reliability constraint value imposed by the utility. This value can be a factor of many things, including the local network topology, penetration of smart controllers, transmission constraints, and prosumers' flexibility preferences. Determining these constraint values could be performed on a case-by-case basis. In addition, rare events can have an unknown effect on the system's dynamics, particularly when they affect both the grid dynamics as well as agents' flexibility bids. The resiliency of the system in some embodiments is configured to adapt to these and other events.

As indicated above, illustrative embodiments disclosed herein provide a peer-to-peer marketplace for distributed energy systems. Some of these embodiments allow MPC techniques such as those described in conjunction with FIGS. 1 through 8 to be used in the context of a regulated peer-to-peer energy market. In such arrangements, each participant would generate a flexibility curve that specifies the amount of power they would consume or produce at various electricity prices. The curve is generated in some embodiments using the above-noted MPC techniques of FIGS. 1 through 8. Participants in some embodiments can add more devices as desired, such as one or more EVs, PVs, batteries, such that the system provide all-in-one whole home building control.

In some embodiments, a smart meter sends the flexibility curve to a market clearing mechanism that functions as a peer-to-peer market. The market clearing mechanism in some embodiments comprises at least one of a centralized utility that coordinates bids and a decentralized ledger using blockchain. The bids are illustratively generated at least in part using fine-tuned behavioral cloning or other types and arrangements of behavioral cloning. Additional or alternative reinforcement learning arrangements or machine learning arrangements can be used in other embodiments.

Illustrative embodiments allow a utility to utilize the flexibility curve to regulate the market in an indirect manner through a surcharge. For example, the surcharge can be exactly known in order to cap a community's electricity consumption. It can also be used to encourage local consumption of electricity (e.g., instead of selling solar back to the grid). This allows the utility to know how to indirectly regulate a decentralized peer-to-peer market to satisfy grid constraints like peak load. Revenue from the surcharge can then be used to offset fixed, grid infrastructure costs and distributed in a manner that offsets the inequity from larger, more energy intensive homes.

In some embodiments, the dynamics of the flexibility curves can be predicted as a function of the electricity price. For example, the utility can use model-based optimal control, such as MPC or MB-RL, to dispatch demand flexibility upwards and downwards to provide certain grid services like flexible ramping products or renewable energy following. This aspect would give a utility as much control over the thermostats as a centralized control method would, without having the participants give up direct control to the utility. As a result, privacy and local autonomy are still satisfied.

As is apparent from the foregoing description, illustrative embodiments disclosed herein provide significant advantages relative to conventional approaches.

For example, some embodiments incorporate data from the smart thermostat to provide direct on/off state information, thereby improving model performance by avoiding the need to estimate such information.

Another benefit is that the model in some embodiments is configured to capture warm-up times and control delays, allowing for an improved time-dependent TCL model that can be used in a wide variety of different heat pump control applications.

Some embodiments are configured to utilize data from two easily installed smart-home devices, illustratively a smart thermostat and a smart meter, to generate thermal response coefficients. Accordingly, there is no need in illustrative embodiments for significant capital expenditure or excessive hardware deployment. Other types of smart-home devices in any combination, possibly in combination with one or more central servers, can be used in implement illustrative embodiments as disclosed herein.

Some embodiments are configured to separate the assumed uncontrollable non-HVAC electrical consumption from the centrally controllable HVAC electrical consumption. This allows better control over the aggregate (HVAC and non-HVAC) power profile, rather than only predicting the aggregate.

These and other embodiments illustratively use disaggregation to implement a control model for the HVAC system, and utilize feedback from the smart thermostat to determine building and/or heat pump thermodynamic properties. For example, feedback from the thermostat can be used to determine demand response duration. The HVAC system is illustratively controlled to improve thermal comfort and reduce energy costs.

Additionally or alternatively, illustrative embodiments can centrally control an aggregation of heat pumps, and/or reduce the peak load.

Numerous other advantages of illustrative embodiments are described elsewhere herein. The particular advantages of certain illustrative embodiments as noted above need not be present in other embodiments.

The particular system configurations and other features as shown in the figures are non-limiting and should be considered illustrative examples only. Numerous other types of system configurations, algorithms and models can be used in other embodiments. Those skilled in the art will also recognize that alternative processing operations and associated system entity configurations can be used in other embodiments.

It is therefore possible that other embodiments may include additional or alternative system elements, relative to the entities of the illustrative embodiments. Accordingly, the particular system configurations and associated algorithm implementations can be varied in other embodiments.

A given processing device or other component of an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA or other programmable logic circuit, a CPU, a TPU, a GPU, an ALU, a DSP, or other similar processing device component, as well as other types and arrangements of processing circuitry, in any combination. For example, at least a portion of the functionality of at least one heat pump related algorithm provided by one or more processing devices as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, flash memory, magnetic memory, optical memory, or other types of storage devices in any combination.

As mentioned previously, articles of manufacture comprising such processor-readable storage media are considered embodiments of the invention. The term "article of manufacture" as used herein should be understood to exclude transitory, propagating signals. Other types of computer program products comprising processor-readable storage media can be implemented in other embodiments.

In addition, embodiments of the invention may be implemented in the form of integrated circuits comprising processing circuitry configured to implement processing operations associated with implementation of heat pump related algorithms.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory. A given such network can illustratively include, for example, a global computer network such as the Internet, a WAN, a LAN, a satellite network, a telephone or cable network, a cellular network such as a 3G, 4G or 5G network, a wireless network implemented using a wireless protocol such as Bluetooth, WiFi or WiMAX, or various portions or combinations of these and other types of communication networks.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

A given processing platform implementing one or more heat pump related algorithms as disclosed herein can alternatively comprise a single processing device, such as a computer, mobile telephone or handheld device. It is also possible in some embodiments that one or more such system elements can run on or be otherwise supported by cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality disclosed herein can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

It should again be emphasized that the embodiments of the invention as described herein are intended to be illustrative only. Other embodiments of the invention can be implemented utilizing a wide variety of different types and arrangements of information processing systems, networks and processing devices than those utilized in the particular illustrative embodiments described herein, and in numerous alternative processing contexts. In addition, the particular assumptions made herein in the context of describing certain embodiments need not apply in other embodiments. These and numerous other alternative embodiments will be readily apparent to those skilled in the art.

What is claimed is:

1. An apparatus comprising:
at least one processing device comprising a processor coupled to a memory;
the at least one processing device being configured:
to obtain information characterizing operation of a heat pump at a particular energy usage location; and
to process the obtained information in a reinforcement learning agent to generate at least one control signal for controlling the heat pump;
wherein the reinforcement learning agent is implemented at least in part utilizing behavioral cloning of a model predictive control process; and
wherein the behavioral cloning of the model predictive control process comprises a constraint-informed parameter grouping (CIPG) phase, a training data generation phase and a model training phase.

2. The apparatus of claim 1 wherein the particular energy usage location comprises one of a residence of a residential user and a business of a commercial user.

3. The apparatus of claim 1 wherein the at least one processing device is implemented in a cloud-based processing platform configured to communicate with the particular energy usage location over one or more networks.

4. The apparatus of claim 1 wherein the at least one processing device is implemented in at least one of a smart meter, a smart thermostat or other type of programmable thermostat, and a smart-home controller of the particular energy usage location.

5. The apparatus of claim 1 wherein the CIPG phase determines a plurality of grouped parameters comprising at least a first grouping that includes thermodynamic properties of a building model of the particular energy usage location and one or more additional groupings comprising at least one of future disturbances and previous control signals generated by the reinforcement learning agent.

6. The apparatus of claim 5 wherein the one or more additional groupings are each indexed over a specified time horizon of the model predictive control process.

7. The apparatus of claim 1 wherein the training data generation phase implements a dataset aggregation algorithm guided at least in part by solutions determined by the model predictive control process.

8. The apparatus of claim 1 wherein the model training phase comprises training a reverse-time recurrent neural network (RT-RNN) of the reinforcement learning agent.

9. The apparatus of claim 1 wherein the reinforcement learning agent implements an RT-RNN comprising at least one of gated recurrent units (GRU) and long short-term memory (LSTM).

10. A non-transitory processor-readable storage medium having stored therein program code of one or more software programs, wherein the program code when executed by at least one processing device causes said at least one processing device:
   to obtain information characterizing operation of a heat pump at a particular energy usage location; and
   to process the obtained information in a reinforcement learning agent to generate at least one control signal for controlling the heat pump;
   wherein the reinforcement learning agent is implemented at least in part utilizing behavioral cloning of a model predictive control process; and
   wherein the behavioral cloning of the model predictive control process comprises a constraint-informed parameter grouping (CIPG) phase, a training data generation phase and a model training phase.

11. The non-transitory processor-readable storage medium of claim 10 wherein the CIPG phase determines a plurality of grouped parameters comprising at least a first grouping that includes thermodynamic properties of a building model of the particular energy usage location and one or more additional groupings comprising at least one of future disturbances and previous control signals generated by the reinforcement learning agent.

12. The non-transitory processor-readable storage medium of claim 10 wherein the training data generation phase implements a dataset aggregation algorithm guided at least in part by solutions determined by the model predictive control process.

13. The non-transitory processor-readable storage medium of claim 10 wherein the model training phase comprises training a reverse-time recurrent neural network (RT-RNN) of the reinforcement learning agent.

14. A method comprising:
   obtaining information characterizing operation of a heat pump at a particular energy usage location; and
   processing the obtained information in a reinforcement learning agent to generate at least one control signal for controlling the heat pump;
   wherein the reinforcement learning agent is implemented at least in part utilizing behavioral cloning of a model predictive control process;
   wherein the behavioral cloning of the model predictive control process comprises a constraint-informed parameter grouping (CIPG) phase, a training data generation phase and a model training phase; and
   wherein the method is performed by at least one processing device comprising a processor coupled to a memory.

15. The method of claim 14 wherein the CIPG phase determines a plurality of grouped parameters comprising at least a first grouping that includes thermodynamic properties of a building model of the particular energy usage location and one or more additional groupings comprising at least one of future disturbances and previous control signals generated by the reinforcement learning agent.

16. The method of claim 15 wherein the one or more additional groupings are each indexed over a specified time horizon of the model predictive control process.

17. The method of claim 14 wherein the training data generation phase implements a dataset aggregation algorithm guided at least in part by solutions determined by the model predictive control process.

18. The method of claim 14 wherein the model training phase comprises training a reverse-time recurrent neural network (RT-RNN) of the reinforcement learning agent.

19. The method of claim 14 wherein the at least one processing device is implemented in at least one of:
   a cloud-based processing platform configured to communicate with the particular energy usage location over one or more networks;
   a smart meter;
   a smart thermostat or other type of programmable thermostat; and
   a smart-home controller of the particular energy usage location.

20. The method of claim 14 wherein the reinforcement learning agent implements an RT-RNN comprising at least one of gated recurrent units (GRU) and long short-term memory (LSTM).

* * * * *